United States Patent
Amano et al.

(10) Patent No.: US 10,291,425 B2
(45) Date of Patent: May 14, 2019

(54) METHOD FOR CONTROLLING TERMINAL APPARATUS THAT REMOTELY CONTROLS AIR CONDITIONER, NON-TRANSITORY RECORDING MEDIUM STORING PROGRAM EXECUTED BY TERMINAL APPARATUS, RECOMMEND METHOD EXECUTED BY TERMINAL APPARATUS, AND TERMINAL APPARATUS

(71) Applicant: Panasonic Intellectual Property Corporation of America, Torrance, CA (US)

(72) Inventors: Hiroshi Amano, Osaka (JP); Toshihisa Nakano, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 227 days.

(21) Appl. No.: 14/722,159

(22) Filed: May 27, 2015

(65) Prior Publication Data

US 2015/0345815 A1    Dec. 3, 2015

Related U.S. Application Data

(60) Provisional application No. 62/004,202, filed on May 29, 2014.

(30) Foreign Application Priority Data

Jul. 29, 2014   (JP) ................................. 2014-153937

(51) Int. Cl.
*F24F 11/00*    (2018.01)
*H04L 12/28*    (2006.01)
(Continued)

(52) U.S. Cl.
CPC .......... *H04L 12/2818* (2013.01); *F24F 11/30* (2018.01); *F24F 11/62* (2018.01);
(Continued)

(58) Field of Classification Search
CPC .............................................. F24F 2011/0035
(Continued)

(56) References Cited

U.S. PATENT DOCUMENTS

| | | | |
|---|---|---|---|
| 2008/0178615 A1* | 7/2008 | Yoon | F24F 3/06 62/79 |
| 2011/0238222 A1 | 9/2011 | Nikovski et al. | |
| 2013/0166073 A1* | 6/2013 | Pine | F24F 11/0034 700/276 |

FOREIGN PATENT DOCUMENTS

| | | |
|---|---|---|
| EP | 2372263 | 10/2011 |
| EP | 2607802 | 6/2013 |

(Continued)

OTHER PUBLICATIONS

Toshiba, "Building management Controls" Toshiba, Jan. 12, 2010, 40 Pgs (Year: 2010).*

(Continued)

*Primary Examiner* — Emilio J Saavedra
(74) *Attorney, Agent, or Firm* — Greenblum & Bernstein, P.L.C.

(57) ABSTRACT

The present application discloses a method for controlling a terminal apparatus that is used for an appliance control system for executing a remote operation on a plurality of air conditioners from a car. The method includes a first judgment step of causing a computer of the terminal apparatus to judge, based on setting information stored in a memory of the terminal apparatus, whether or not the plurality of air conditioners include a plurality of target appliances to be operated that are subjected to the remote operation; a second (Continued)

judgment step of causing the computer to judge whether or not the car exists in a control region; a first display step of causing a display of the terminal apparatus to display a start instruction image; an output step of causing the computer to output control data for starting the remote operation to the network; and a second display step of causing the display to display a plurality of notification images indicating that the control data has been transmitted to the plurality of target appliances to be operated.

14 Claims, 67 Drawing Sheets

(51) Int. Cl.
    *G05B 15/02*     (2006.01)
    *F24F 11/30*     (2018.01)
    *F24F 11/62*     (2018.01)
    *F24F 120/12*     (2018.01)
    *F24F 11/56*     (2018.01)
    *F24F 11/52*     (2018.01)

(52) U.S. Cl.
    CPC .............. *G05B 15/02* (2013.01); *F24F 11/52* (2018.01); *F24F 11/56* (2018.01); *F24F 2120/12* (2018.01)

(58) Field of Classification Search
    USPC .......................................................... 700/276
    See application file for complete search history.

(56) References Cited

FOREIGN PATENT DOCUMENTS

| JP | 2002-064881 | | 2/2002 |
|---|---|---|---|
| JP | 2002-101474 | | 4/2002 |
| JP | 2005-295160 | | 10/2005 |
| JP | 2007-051799 | | 3/2007 |
| JP | 2007051799 A | * | 3/2007 |

OTHER PUBLICATIONS

Extended European Search Report from European Patent Office (EPO) dated Jan. 5, 2016 for the related European Patent Application No. 15169446.0.

* cited by examiner

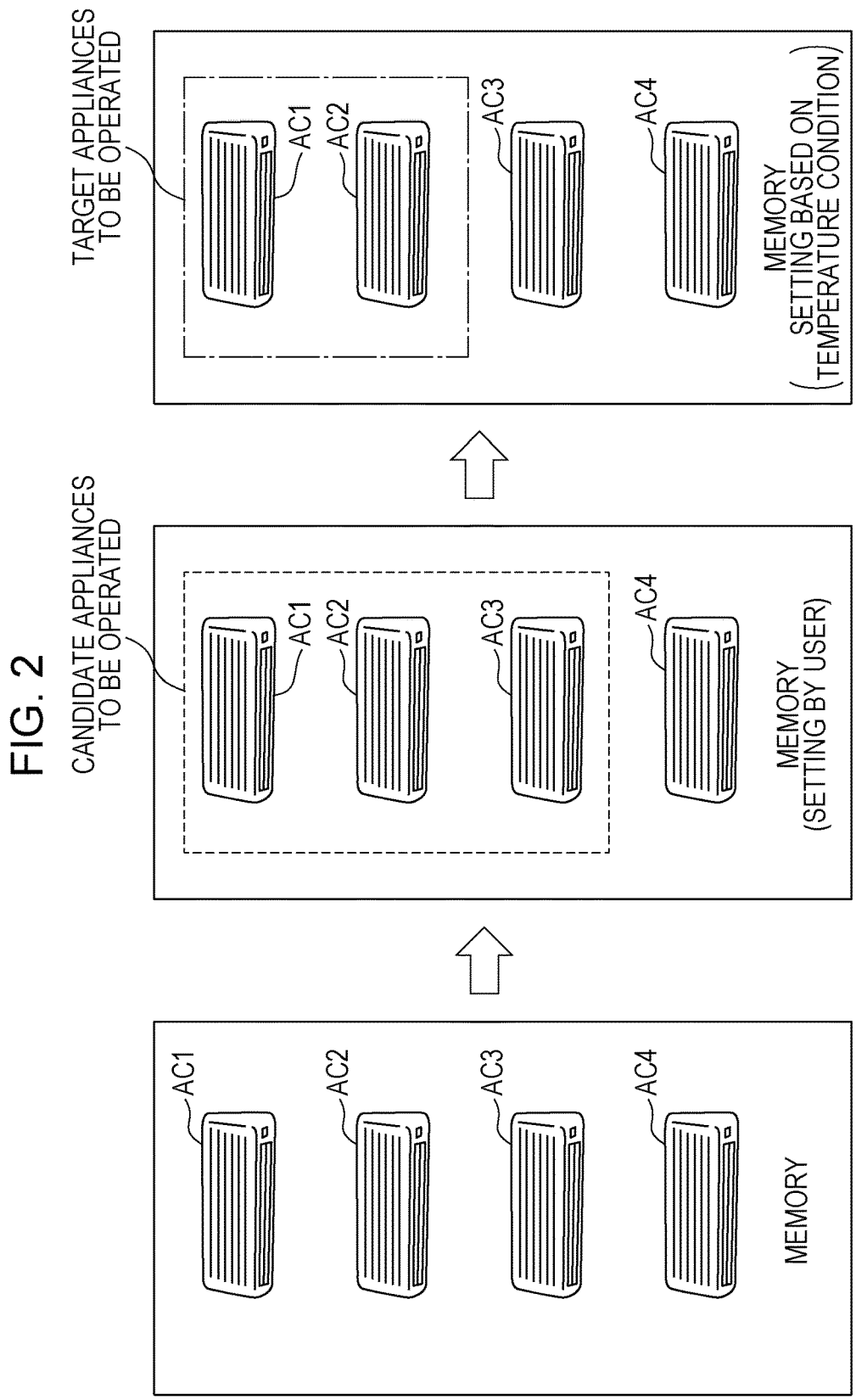

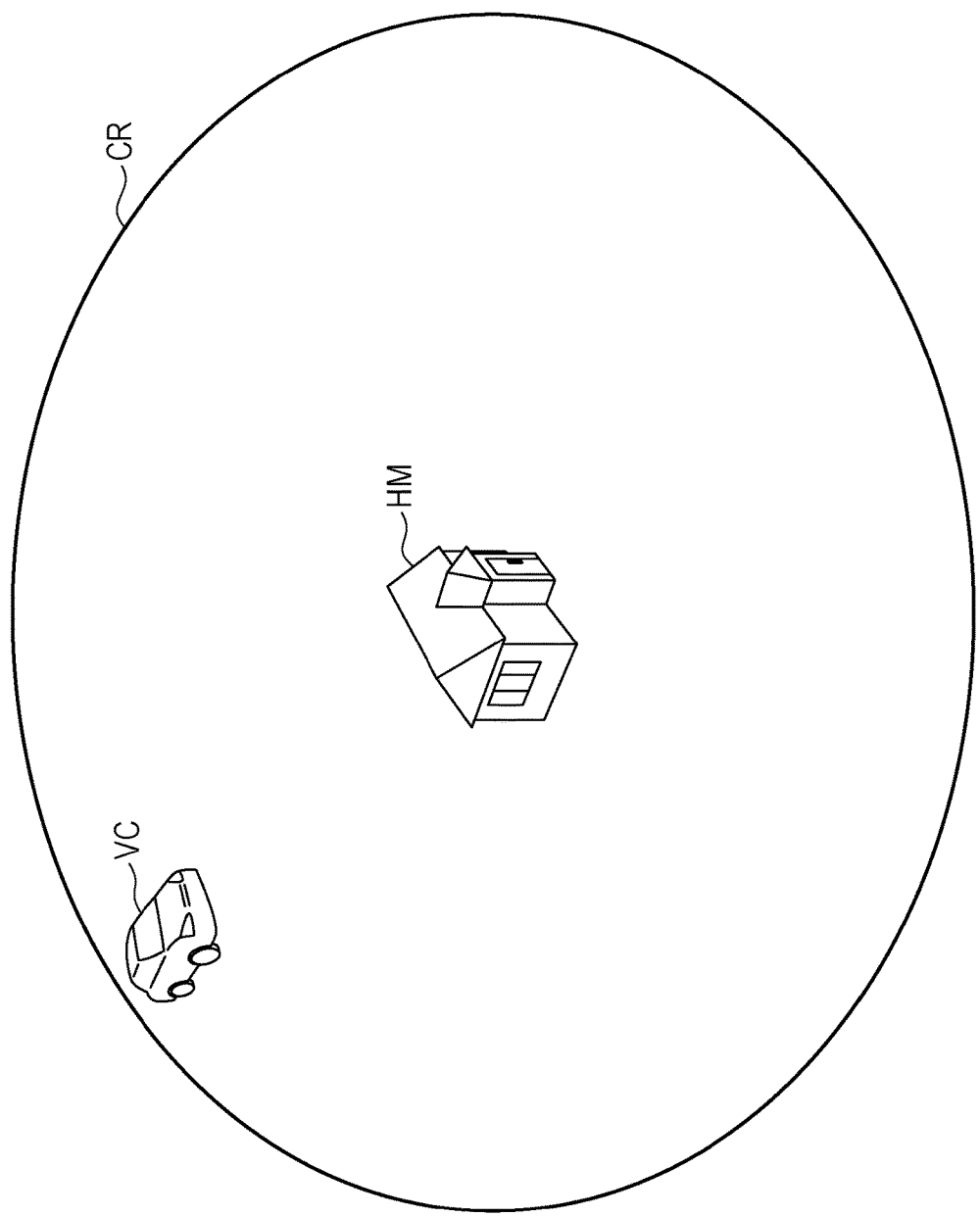

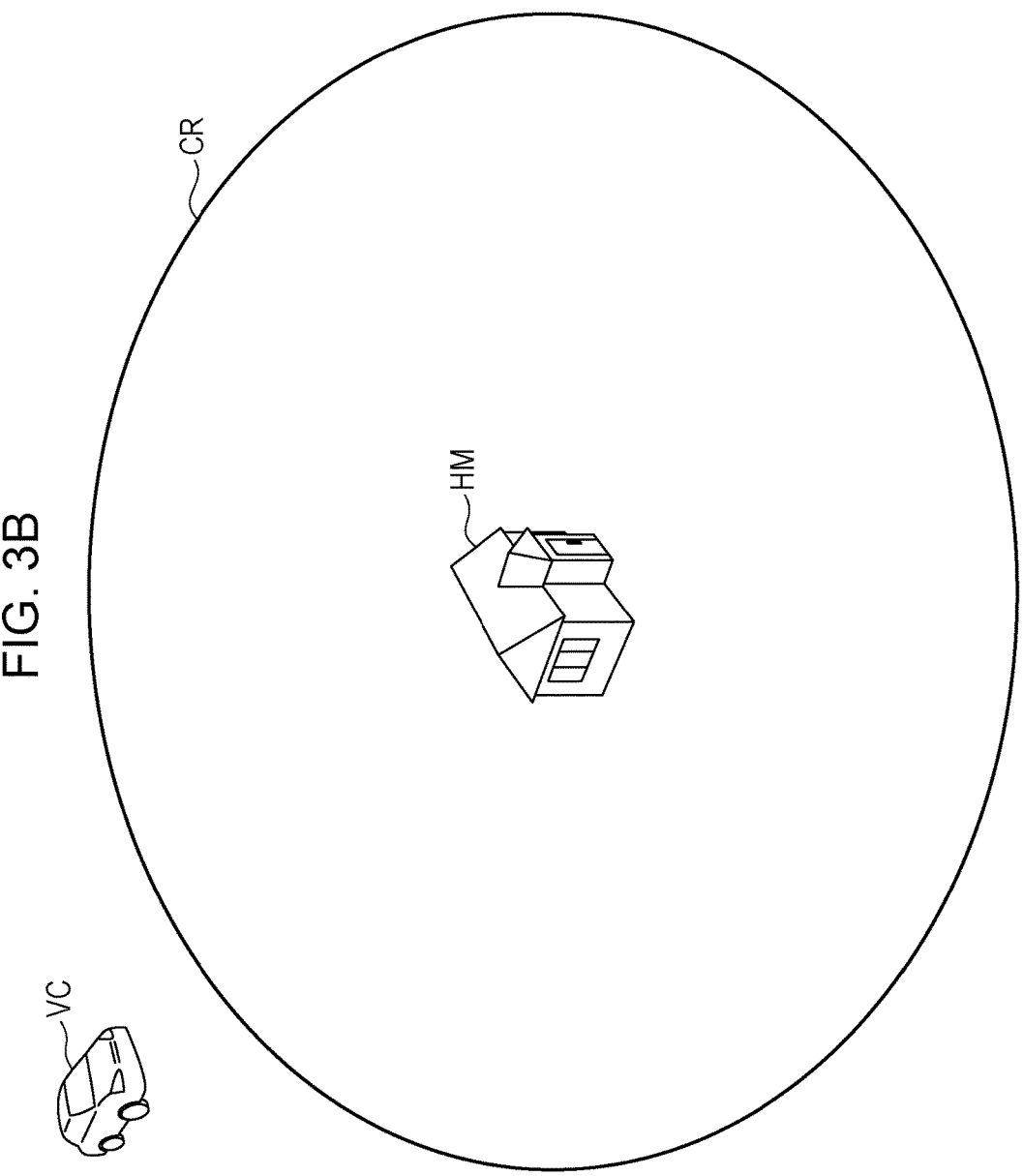

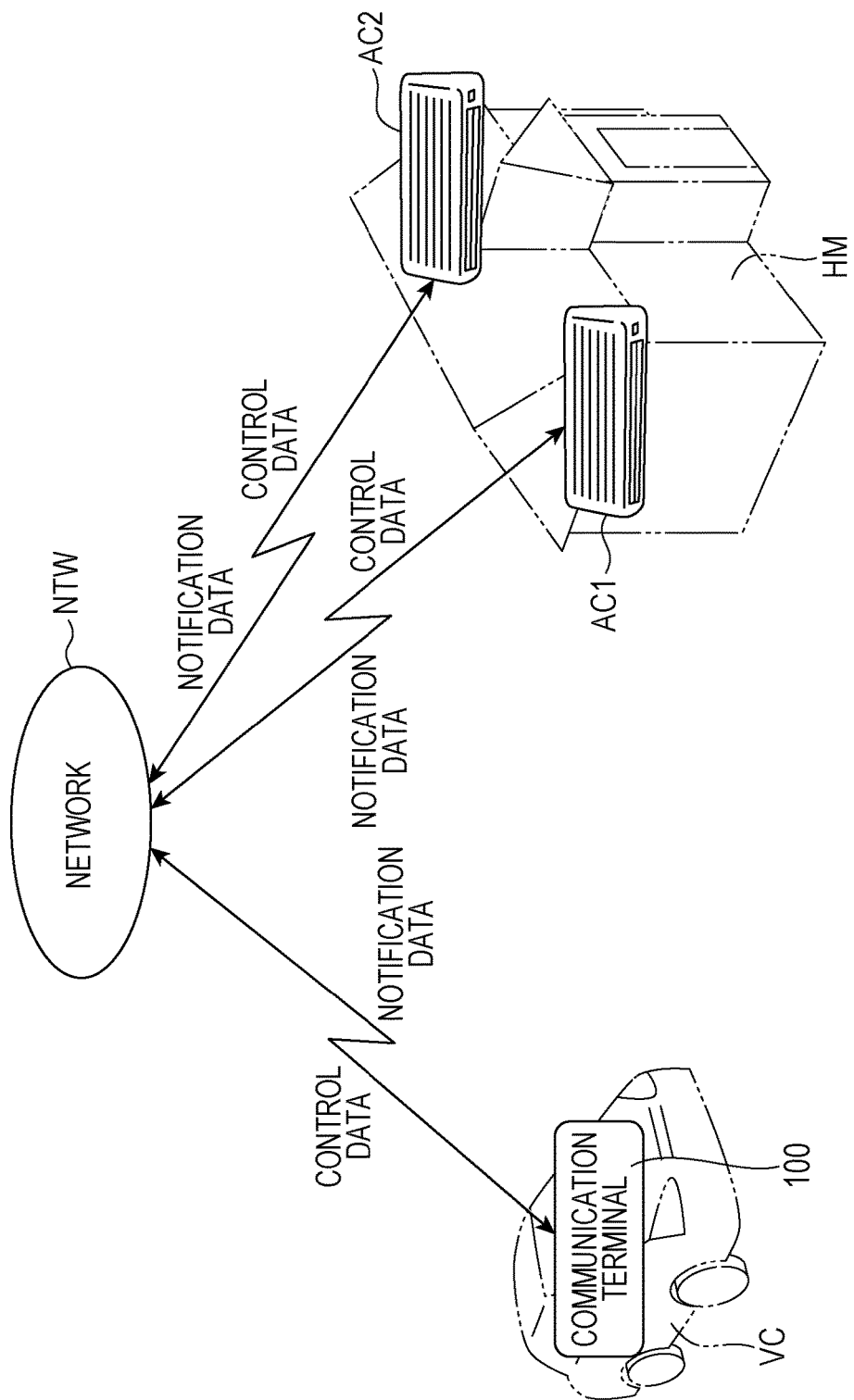

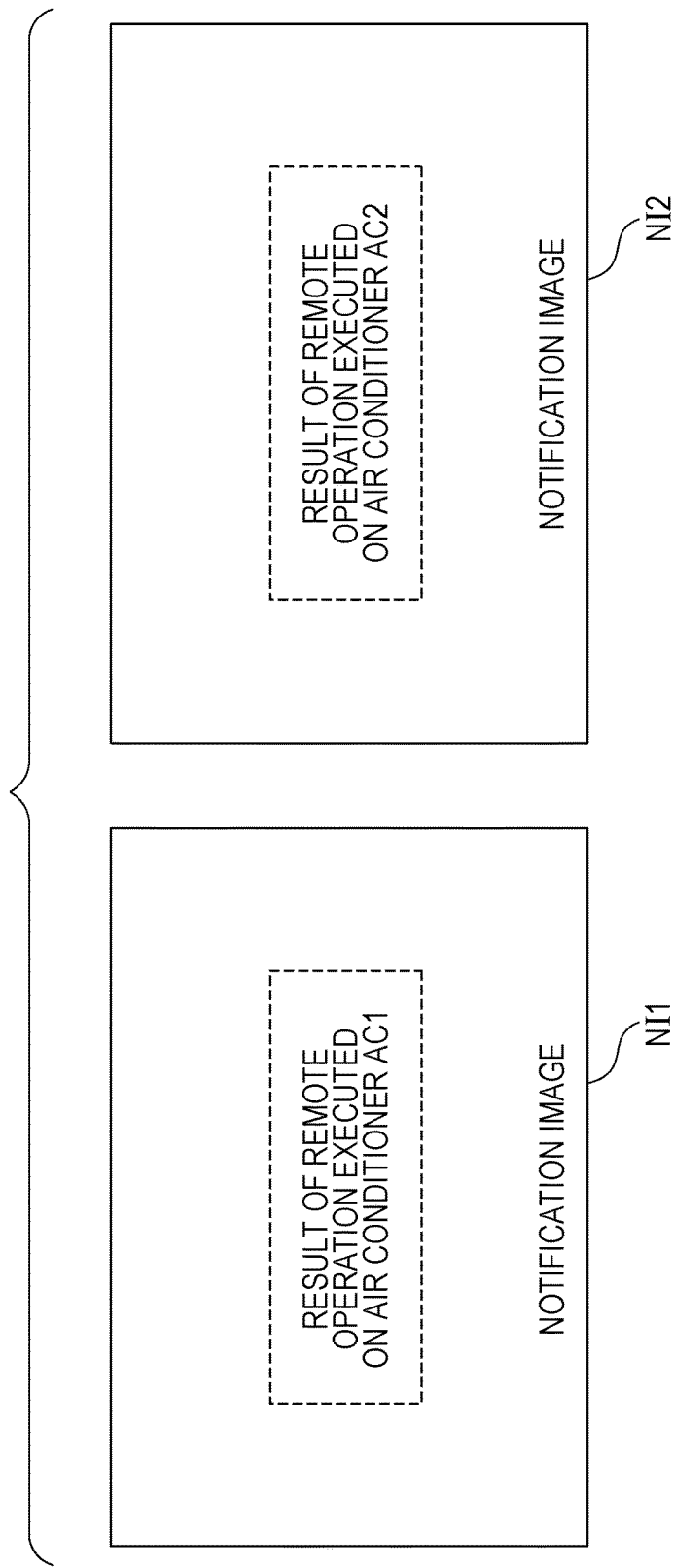

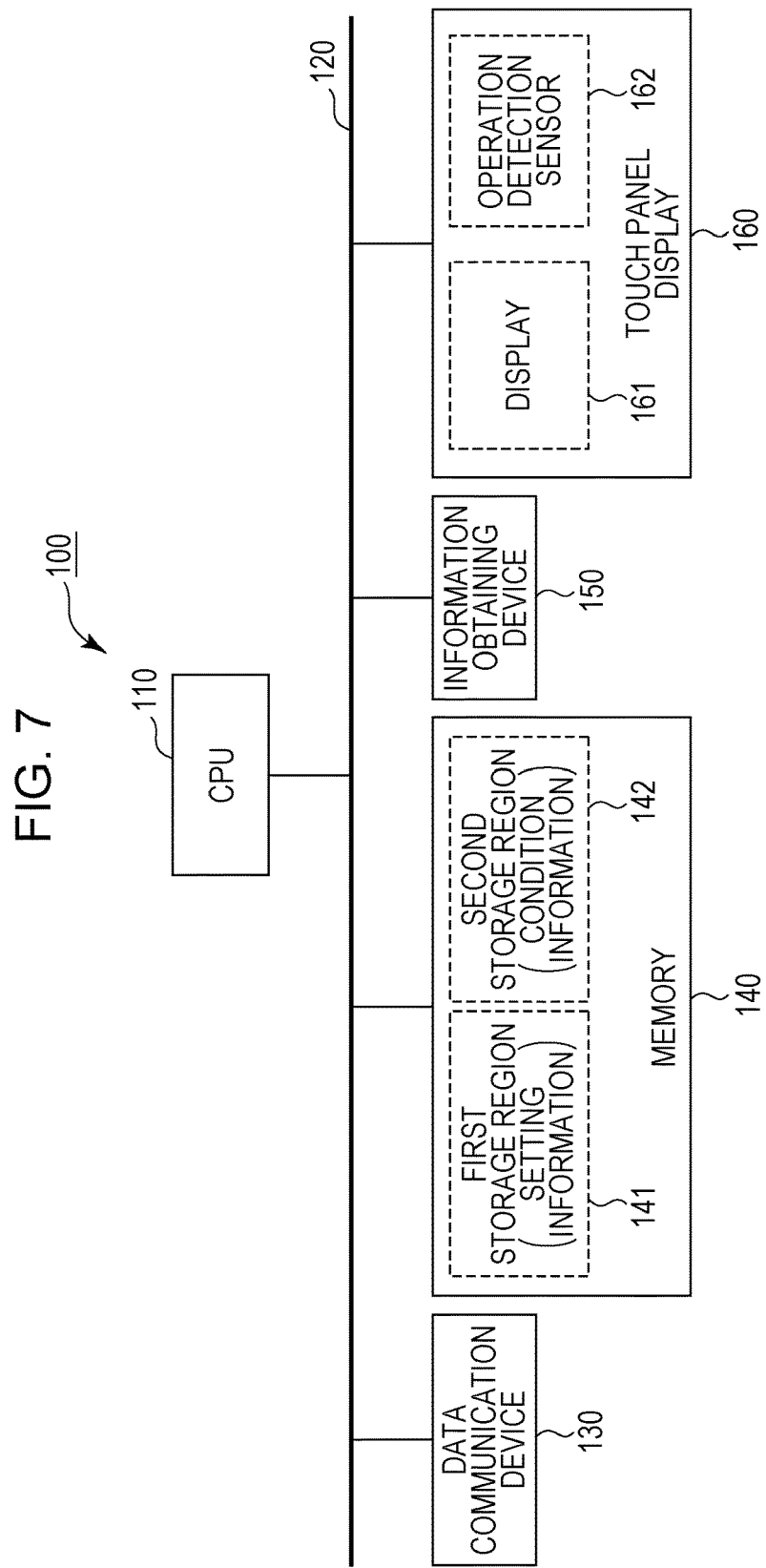

FIG. 8E

Air conditioner settings [Return] —IB16

Air conditioner in living room

[Comfortable home upon arrival] — IB14
[Forgotten turn-off prevention] — IB15

FIG. 8F

Comfortable home upon arrival [Return] —IB22

Setting of comfortable home upon arrival

Comfortable home upon arrival is recommended
Press ON button to set comfortable home upon arrival. [ON] —IB21

When outside temperature is set value, screen for operating air conditioner is displayed.

[15°C or less]  [25°C or more] 

| USER ID | AIR CONDITIONER | SETTING AS CANDIDATE APPLIANCE TO BE OPERATED | START CONDITION | |
|---|---|---|---|---|
| | | | UPPER-LIMIT TEMPERATURE | LOWER-LIMIT TEMPERATURE |
| 32456389 | 01 (LIVING ROOM) | SET | 25°C | 10°C |
| | 02 (KITCHEN) | SET | 25°C | 10°C |
| | 03 (BED ROOM) | SET | 30°C | 5°C |
| | 04 (CHILD'S ROOM 1) | NOT SET | — | — |
| | 05 (CHILD'S ROOM 2) | SET | 25°C | 10°C |

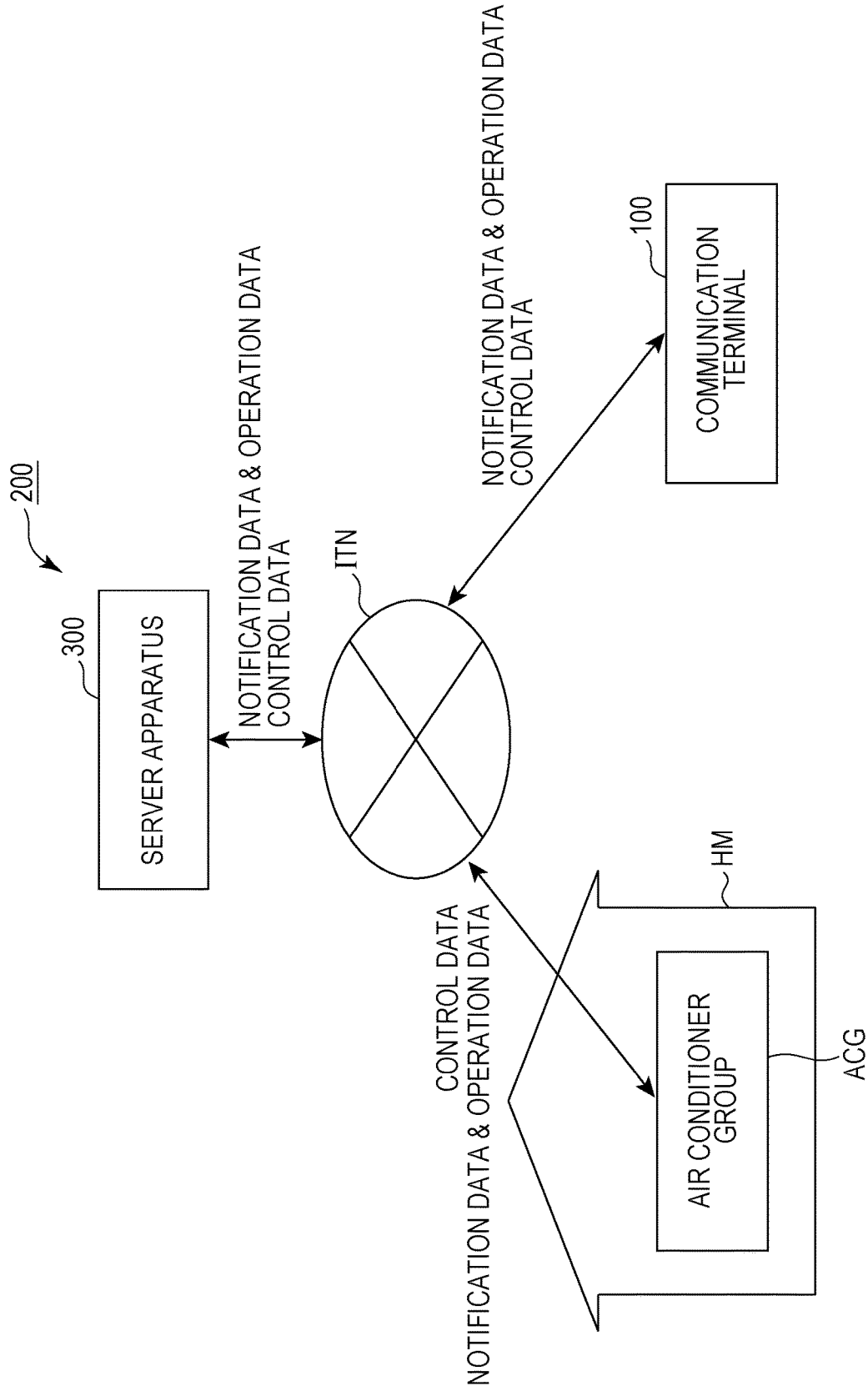

Turn on registered air conditioners?

Cancel — IB26
Yes — IB27

Setting has been transmitted to air conditioner in living room in auto operation mode Close — IB28
Operation status — IB29

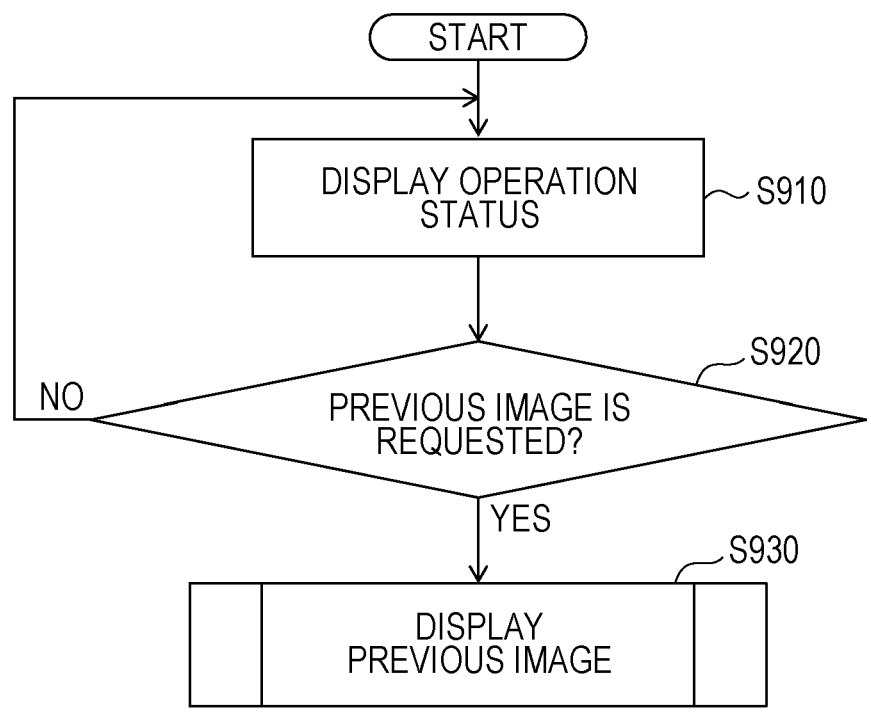

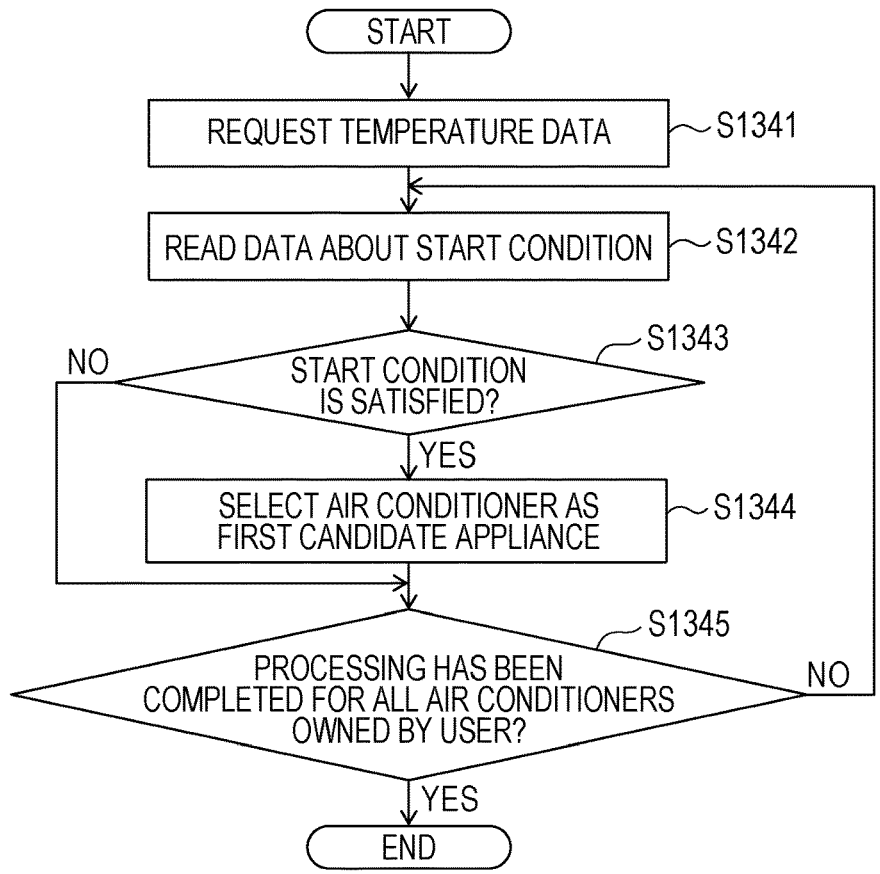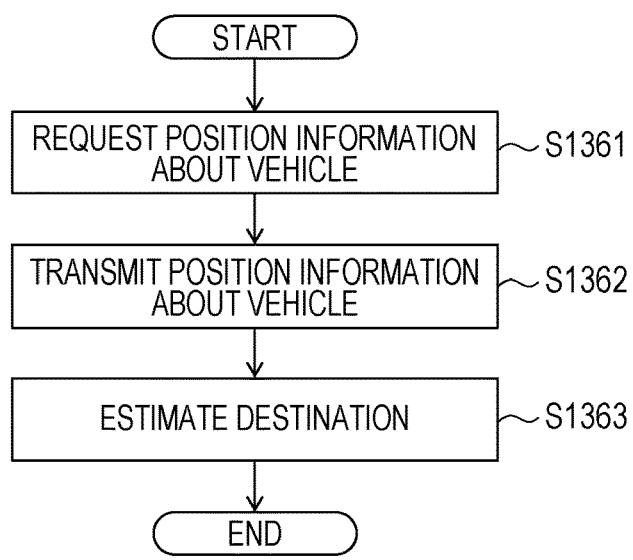

FIG. 38A

| USER ID | FIRST CANDIDATE APPLIANCE |
|---|---|
| 32456389 | LIVING ROOM |
| | KITCHEN |
| | CHILD'S ROOM 2 |

FIG. 38B

| USER ID | TARGET APPLIANCE TO BE OPERATED |
|---|---|
| 32456389 | LIVING ROOM |
| | KITCHEN |

FIG. 46

| USER ID | AIR CONDITIONER | SETTING AS CANDIDATE APPLIANCE TO BE OPERATED | START CONDITION | | PRIORITY |
| --- | --- | --- | --- | --- | --- |
| | | | UPPER-LIMIT TEMPERATURE | LOWER-LIMIT TEMPERATURE | |
| 32456389 | 01 (LIVING ROOM) | SET | 25°C | 10°C | 1 |
| | 02 (KITCHEN) | SET | 25°C | 10°C | 2 |
| | 03 (BED ROOM) | SET | 30°C | 5°C | 3 |
| | 04 (CHILD'S ROOM 1) | NOT SET | — | — | 4 |
| | 05 (CHILD'S ROOM 2) | SET | 25°C | 10°C | 5 |

FIG. 54

| USER ID | AIR CONDITIONER | SETTING AS CANDIDATE APPLIANCE TO BE OPERATED | PRIORITY |
|---|---|---|---|
| 32456389 | 01 (LIVING ROOM) | SET | 1 |
| | 02 (KITCHEN) | SET | 2 |
| | 03 (BED ROOM) | NOT SET | 3 |
| | 04 (CHILD'S ROOM 1) | SET | 4 |
| | 05 (CHILD'S ROOM 2) | SET | 5 |

| USER ID | TARGET APPLIANCE TO BE OPERATED |
|---|---|
| 32456389 | LIVING ROOM |
| | CHILD'S ROOM 1 |

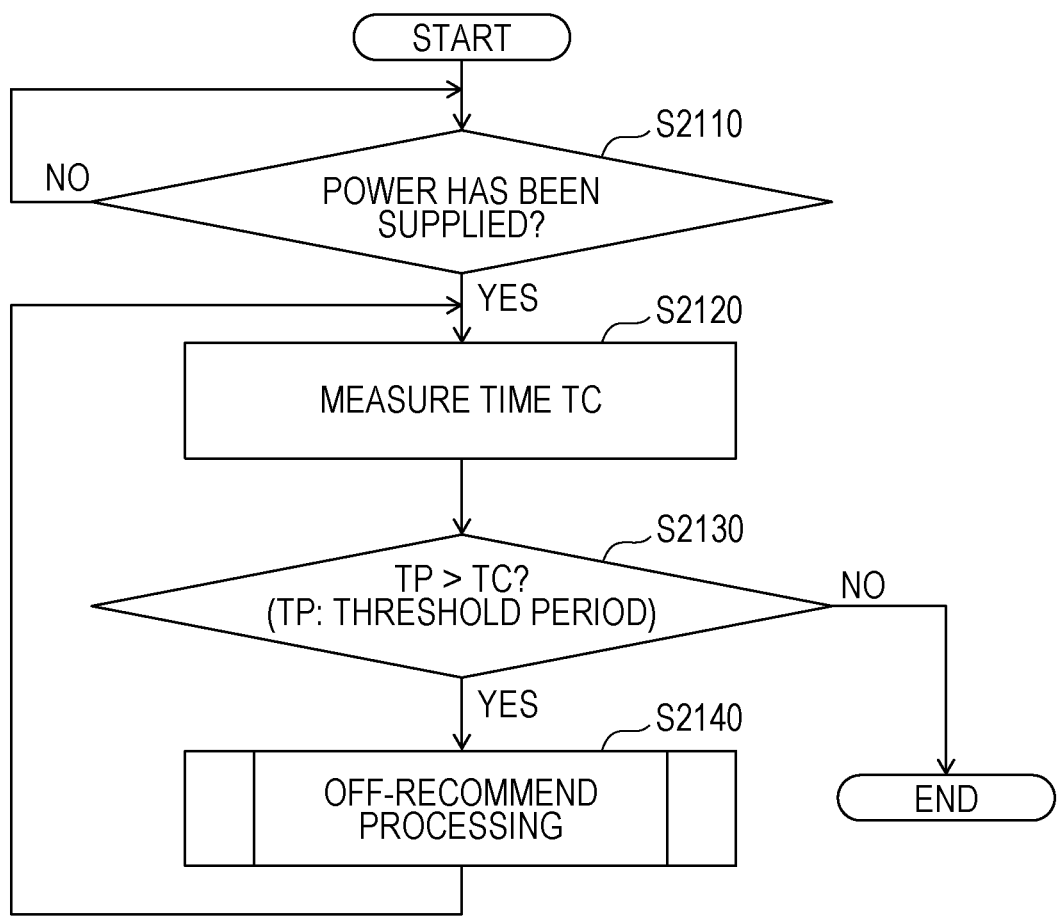

METHOD FOR CONTROLLING TERMINAL APPARATUS THAT REMOTELY CONTROLS AIR CONDITIONER, NON-TRANSITORY RECORDING MEDIUM STORING PROGRAM EXECUTED BY TERMINAL APPARATUS, RECOMMEND METHOD EXECUTED BY TERMINAL APPARATUS, AND TERMINAL APPARATUS

BACKGROUND

1. Technical Field

The present disclosure relates to a technique of remotely operating an air conditioner installed in a building from a car.

2. Description of the Related Art

The recent advances of communication technologies have enabled a user to remotely operate a home appliance installed in a building from a car (see Japanese Unexamined Patent Application Publication No. 2002-64881). According to Japanese Unexamined Patent Application Publication No. 2002-64881, a user in a car operates a communication terminal to call a home server installed in a user's home. The user then makes a reservation setting for an operation of a home appliance in the home by using the called home server. As a result, the user is able to remotely control the home appliance.

SUMMARY

In general, many users each own a plurality of air conditioners. The technique disclosed in Japanese Unexamined Patent Application Publication No. 2002-64881 enables a user to remotely control an air conditioner, but the user is requested to perform various operations to remotely control a single air conditioner. If the user wants to operate a plurality of air conditioners, the user is requested to perform a large amount of operations.

Thus, a non-limiting exemplary embodiment of the present disclosure provides a technique that enables a user to easily and remotely operate a plurality of air conditioners.

In one general aspect, the techniques disclosed here feature a method for controlling a terminal apparatus that includes a display and that is used for an appliance control system for executing, from a car via a network, remote control on an air conditioner installed in a building. The terminal apparatus includes a memory storing setting information specifying a plurality of air conditioners designated as targets of the remote control. The method includes causing a computer of the terminal apparatus to judge, in response to input of status information indicating that a certain period has not elapsed since power-on of the car, by using the setting information, whether or not there exists an air conditioner designated as a target of the remote control; causing the computer to, in a case where there exist at least two or more air conditioners designated as targets of the remote control, obtain first position information indicating a current position of the car and second position information indicating a position of the building, and judge whether or not the position indicated by the first position information is within a certain region relative to the position indicated by the second position information; causing the computer to, in a case where the position indicated by the first position information is within the certain region relative to the position indicated by the second position information, output, via the display of the terminal apparatus, one common piece of display data prompting a certain remote operation for the at least two or more air conditioners, the one common piece of display data including one common instruction portion for starting the certain remote operation; and causing the computer to, in a case where selection of the one common instruction portion is detected, output control data for executing the certain remote operation on the at least two or more air conditioners to the network, and individually output, via an output unit of the terminal apparatus, for the at least two or more air conditioners, pieces of notification data indicating that the control data has been output for each of the at least two or more air conditioners.

These general and specific aspects may be implemented using a system, a method, and a computer program, and any combination of systems, methods, and computer programs.

The present disclosure enables a user to easily and remotely operate a plurality of air conditioners.

Additional benefits and advantages of the disclosed embodiments will be apparent from the specification and Figures. The benefits and/or advantages may be individually provided by the various embodiments and features of the specification and Figures, and need not all be provided in order to obtain one or more of the same.

BRIEF DESCRIPTION OF THE DRAWINGS

FIG. 2 is a conceptual diagram illustrating the processing in step S110 of the flowchart illustrated in FIG. 1 (first embodiment);

FIG. 3A is a conceptual diagram illustrating the processing in step S120 of the flowchart illustrated in FIG. 1 (first embodiment);

FIG. 3B is a conceptual diagram illustrating the processing in step S120 of the flowchart illustrated in FIG. 1 (first embodiment);

FIG. 5 is a conceptual diagram illustrating communication between a communication terminal and air conditioners (first embodiment);

FIG. 6 is a conceptual diagram illustrating the processing in step S150 of the flowchart illustrated in FIG. 1 (first embodiment);

FIG. 7 is a schematic block diagram illustrating an exemplary hardware configuration of the communication terminal illustrated in FIG. 5 (second embodiment);

FIG. 8E illustrates an exemplary image used by the user to set a plurality of candidate appliances to be operated and a start condition of a remote operation (third embodiment);

FIG. 8F illustrates an exemplary image used by the user to set a plurality of candidate appliances to be operated and a start condition of a remote operation (third embodiment);

FIG. 11 is a table showing setting data stored in a memory of the terminal apparatus illustrated in FIG. 7 (third embodiment);

FIG. 14 is a conceptual diagram of a control system including the communication terminal (fifth embodiment);

FIG. 21 is a schematic flowchart illustrating processing of the communication terminal that is executed when the image illustrated in FIG. 15D is displayed (sixth embodiment);

FIG. 35 is a schematic flowchart illustrating the processing in step S1340 of the flowchart illustrated in FIG. 34 (seventeenth embodiment);

FIG. 36 is a schematic flowchart illustrating the processing in step S1360 of the flowchart illustrated in FIG. 34 (seventeenth embodiment);

FIG. 38A is a table showing data about air conditioners stored in a first storage unit of the communication terminal illustrated in FIG. 30 (eighteenth embodiment);

FIG. 38B is a table showing air conditioners that have been determined as target appliances to be operated through image display judgment processing (eighteenth embodiment);

FIG. 46 is a table showing data stored in the first storage unit of the communication terminal illustrated in FIG. 30 (twenty-fourth embodiment);

FIG. 54 is a table showing exemplary data generated through operations performed on the images illustrated in FIGS. 53A and 53B (thirtieth embodiment);

FIG. 60 is a schematic flowchart illustrating start processing of off-recommend processing (thirty-third embodiment);

DETAILED DESCRIPTION

Figure 1:
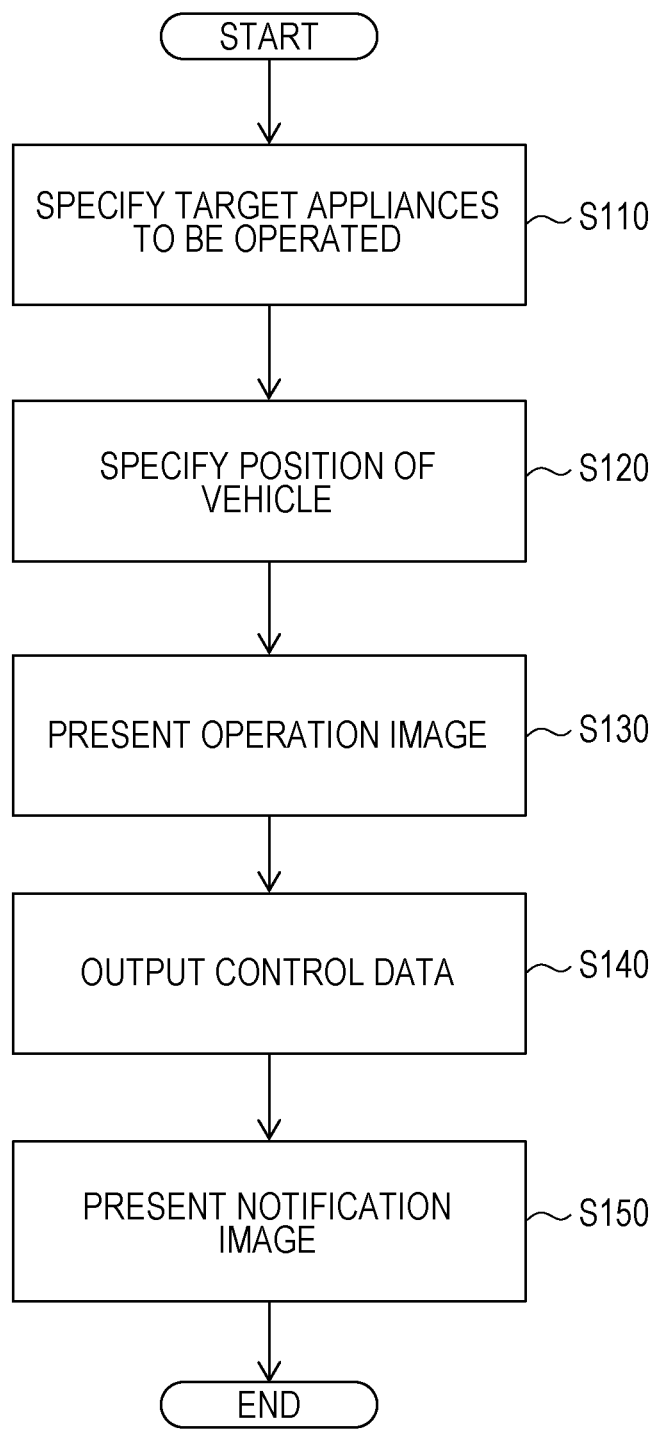
FIG. 1 is a schematic flowchart illustrating processing executed by a control system that remotely operates, from a car via a network, a plurality of air conditioners installed in a building (first embodiment)

Hereinafter, a description will be given of various embodiments regarding a technique of remotely operating an air conditioner installed in a building from a car, with reference to the attached drawings. The technique of remotely operating an air conditioner installed in a building from a car is clearly understandable from the following description.

Issues Found Out by Inventors

The inventors have studied the technique disclosed in the above-mentioned Japanese Unexamined Patent Application Publication No. 2002-64881, and found out issues involved in the technique disclosed in Japanese Unexamined Patent Application Publication No. 2002-64881. The issues involved in the technique disclosed in Japanese Unexamined Patent Application Publication No. 2002-64881 will be described below.

According to Japanese Unexamined Patent Application Publication No. 2002-64881, a user (for example, a driver) operates a communication terminal in a car to access a home server. The user then makes a reservation setting for a home appliance via the home server.

When a time specified by the reservation setting approaches, the home server transmits confirmation image data to the communication terminal. The confirmation image data is used to determine whether or not the user allows the target home appliance to execute an operation specified by the reservation setting. If the user approves the execution of the operation, a permission signal of permitting the operation of the target home appliance is transmitted from the communication terminal to the home server. In response to the permission signal, the home server generates a control signal for executing the operation specified by the reservation setting. The control signal is transmitted from the home server to the target home appliance.

When the home appliance appropriately receives the control signal, the home appliance generates a notification signal indicating that the home appliance is appropriately operating in accordance with the control signal. The notification signal is transmitted from the home appliance to the home server. The home server transfers the notification signal to the communication terminal.

The technique disclosed in Japanese Unexamined Patent Application Publication No. 2002-64881 is also available for remotely operating a plurality of air conditioners. For example, a user is able to remotely operate a first air conditioner and a second air conditioner, which adjusts the temperature of a room different from a room where the temperature is adjusted by the first air conditioner.

The user is able to set a first time as a preset time for the first air conditioner. The user is able to set a second time, which is different from the first time, as a preset time for the second air conditioner.

When the first time approaches, the home server transmits confirmation image data to the communication terminal. The confirmation image data is used to determine whether or not the user allows the first air conditioner to execute an operation specified by a reservation setting. When the second time approaches, the home server transmits confirmation image data to the communication terminal. The confirmation image data is used to determine whether or not the user allows the second air conditioner to execute an operation specified by a reservation setting. Thus, the user needs to operate the communication terminal every time confirmation image data is transmitted.

Many users do not want to frequently operate a communication terminal in a car. The users may want to finish an operation on the communication terminal in a short time while the car is stopped at a red light. The technique disclosed in Japanese Unexamined Patent Application Publication No. 2002-64881 does not satisfy such users' needs.

On the basis of the above-described considerations, the inventors have conceived of individual aspects of the present disclosure.

An aspect of the present disclosure is a method for controlling a terminal apparatus that includes a display and that is used for an appliance control system for executing, from a car via a network, remote control on an air conditioner installed in a building. The terminal apparatus includes a memory storing setting information specifying a plurality of air conditioners designated as targets of the remote control. The method includes causing a computer of the terminal apparatus to judge, in response to input of status information indicating that a certain period has not elapsed since power-on of the car, by using the setting information, whether or not there exists an air conditioner designated as a target of the remote control; causing the computer to, in a case where there exist at least two or more air conditioners designated as targets of the remote control, obtain first position information indicating a current position of the car and second position information indicating a position of the building, and judge whether or not the position indicated by the first position information is within a certain region relative to the position indicated by the second position information; causing the computer to, in a case where the position indicated by the first position information is within the certain region relative to the position indicated by the second position information, output, via the display of the terminal apparatus, one common piece of display data prompting a certain remote operation for the at least two or more air conditioners, the one common piece of display data including one common instruction portion for starting the certain remote operation; and causing the computer to, in a case where selection of the one common instruction portion is detected, output control data for executing the certain remote operation on the at least two or more air conditioners to the network, and individually output, via an output unit of the terminal apparatus, for the at least two or more air conditioners, pieces of notification data indicating that the control data has been output for each of the at least two or more air conditioners.

According to this aspect, even in the case of starting a remote operation for a plurality of air conditioners, only one common piece of display data is output to the display of the terminal apparatus. A user is able to provide an instruction to execute a remote operation on the plurality of air conditioners only by selecting the one common instruction portion included in the one common piece of display data. In other words, the user only has to perform one input operation and does not need to perform input operations many times while driving, and thus the degree of safety increases.

Further, after the instruction to execute a remote operation on the plurality of air conditioners has been provided, notifications are individually output for the plurality of air conditioners. That is, operations for the plurality of air conditioners are simultaneously executed, and thus the user is correctly notified which air conditioner normally operates and which air conditioner does not normally operate.

In an aspect of the present disclosure, the method further includes causing the computer to, in a case where selection of the one common instruction portion is not detected within a certain period from when the one common piece of display data is output, stop detecting selection of the one common instruction portion and start a re-notification timer, and prevent the one common piece of display data from being output again before a timeout of the re-notification timer occurs.

According to this aspect, in a case where the car is moving in a certain region, for example, sequential output of the same pieces of display data is prevented. Accordingly, output of common display data is appropriately controlled, and efficient control can be executed.

In an aspect of the present disclosure, the method further includes causing the computer to obtain operation statuses from the at least two or more air conditioners after the control data for executing the certain remote operation on the at least two or more air conditioners has been output to the network, and individually output, via the output unit of the terminal apparatus, the operation statuses for the at least two or more air conditioners.

In an aspect of the present disclosure, the setting information includes in advance a fixed order for the plurality of air conditioners, and the method further includes causing the computer to output the pieces of notification data for the at least two or more air conditioners in accordance with the fixed order.

An aspect of the present disclosure is a non-transitory computer readable recording medium storing a program executed by a terminal apparatus that includes a display and that is used for an appliance control system for executing, from a car via a network, remote control on an air conditioner installed in a building. The terminal apparatus includes a memory storing setting information specifying a plurality of air conditioners designated as targets of the remote control. The program causes a computer of the terminal apparatus to judge, in response to input of status information indicating that a certain period has not elapsed since power-on of the car, by using the setting information, whether or not there exists an air conditioner designated as a target of the remote control; in a case where there exist at least two or more air conditioners designated as targets of the remote control, obtain first position information indicating a current position of the car and second position information indicating a position of the building, and judge whether or not the position indicated by the first position information is within a certain region relative to the position indicated by the second position information; in a case where the position indicated by the first position information is within the certain region relative to the position indicated by the second position information, output, via the display of the terminal apparatus, one common piece of display data prompting a certain remote operation for the at least two or more air conditioners, the one common piece of display data including one common instruction portion for starting the certain remote operation; and in a case where selection of the one common instruction portion is detected, output control data for executing the certain remote operation on the at least two or more air conditioners to the network, and individually output, via an output unit of the terminal apparatus, for the at least two or more air conditioners, pieces of notification data indicating that the control data has been output for each of the at least two or more air conditioners.

An aspect of the present disclosure is a recommend method in an appliance control system for executing, from a car via a network, remote control on an air conditioner installed in a building. The recommend method includes judging, in response to input of status information indicating that a certain period has not elapsed since power-on of the car, by using a first memory storing setting information specifying a plurality of air conditioners designated as targets of the remote control, whether or not there exist the plurality of air conditioners designated as targets of the remote control; in a case where there exist at least two or more air conditioners designated as targets of the remote control, obtaining first position information indicating a current position of the car and second position information indicating a position of the building, and judging whether or not the position indicated by the first position information is within a certain region relative to the position indicated by the second position information; in a case where the position indicated by the first position information is within the certain region relative to the position indicated by the second position information, outputting, via a display of the terminal apparatus, one common piece of display data prompting a certain remote operation for the at least two or more air conditioners, the one common piece of display data including one common instruction portion for starting the certain remote operation; and in a case where selection of the one common instruction portion is detected, outputting control data for executing the certain remote operation on the at least two or more air conditioners to the network, and individually outputting, via an output unit of the terminal apparatus, for the at least two or more air conditioners, pieces of notification data indicating that the control data has been output for each of the at least two or more air conditioners.

An aspect of the present disclosure is a terminal apparatus that is used for an appliance control system for executing, from a car via a network, remote control on an air conditioner installed in a building. It is judged, in response to input of status information indicating that a certain period has not elapsed since power-on of the car, by using a first memory storing setting information specifying a plurality of air conditioners designated as targets of the remote control, whether or not there exist the plurality of air conditioners designated as targets of the remote control. In a case where there exist at least two or more air conditioners designated as targets of the remote control, first position information indicating a current position of the car and second position information indicating a position of the building are obtained, and it is judged whether or not the position indicated by the first position information is within a certain region relative to the position indicated by the second position information. In a case where the position indicated by the first position information is within the certain region relative to the position indicated by the second position information, one common piece of display data prompting a certain remote operation for the at least two or more air conditioners is output via a display of the terminal apparatus, the one common piece of display data including one common instruction portion for starting the certain remote operation. In a case where selection of the one common instruction portion is detected, control data for executing the certain remote operation on the at least two or more air conditioners is output to the network, and pieces of notification data indicating that the control data has been output for each of the at least two or more air conditioners are individually output for the at least two or more air conditioners via an output unit of the terminal apparatus.

First Embodiment

As described above, according to the technique disclosed in Japanese Unexamined Patent Application Publication No. 2002-64881, a user is requested to perform frequent operations. In a first embodiment, a description will be given of a technique that allows a user to easily perform remote operations on a plurality of air conditioners.

FIG. 1 is a schematic flowchart illustrating processing executed by a control system that remotely operates, from a car via a network, a plurality of air conditioners installed in a building. With reference to FIG. 1, a description will be given of the processing executed by the control system. In this embodiment, an appliance control system is exemplified by the control system that executes various processing operations in accordance with the flowchart in FIG. 1.

The flowchart in FIG. 1 is preferably available for activating a plurality of air conditioners. In the following description, the processing according to the flowchart in FIG. 1 is referred to as "on-recommend processing". In this embodiment, a recommend method is exemplified by the on-recommend processing described below.

In step S110, the control system specifies a plurality of target appliances to be remotely operated. After that, step S120 is executed.

In step S120, the control system specifies a position of a vehicle. If the position of the vehicle satisfies a certain condition, step S130 is executed.

In step S130, the control system presents an operation image to a user. When the user performs a certain operation on the operation image, step S140 is executed.

In step S140, the control system generates control data in response to the operation performed by the user. The control data is output from a communication terminal to a network. In this embodiment, a terminal apparatus is exemplified by the communication terminal. The communication terminal may be an in-vehicle apparatus installed in a vehicle (for example, a car navigation system). Alternatively, the communication terminal may be a mobile terminal carried by the user (for example, a smartphone). Alternatively, the communication terminal may be another apparatus capable of outputting control data from a vehicle to a network. The principle of this embodiment is not limited by a specific communication terminal. After the control data has been output from the communication terminal to the network, step S150 is executed.

In step S150, the control data is output from the network to the plurality of target appliances to be operated. The plurality of target appliances to be operated each generate a notification signal representing the receipt of the control data. The notification signals are output from the individual target appliances to be operated to the communication terminal via the network. In response to the notification signals, the communication terminal generates notification images indicating that the control data has been transmitted to each of the plurality of target appliances to be operated. Accordingly, the user is able to determine whether or not a remote operation has been appropriately executed by seeing the notification images.

FIG. 2 is a conceptual diagram illustrating the processing in step S110. With reference to FIGS. 1 and 2, a description will be given of the processing in step S110. In this embodiment, a first judgment step is exemplified by step S110.

A memory of the communication terminal stores, in advance, information about a plurality of air conditioners AC1, AC2, AC3, and AC4 owned by the user. The user presets, in the memory, one or more candidate appliances to be remotely operated using the control system. If the user designates a plurality of air conditioners as candidate appliances to be operated, the processing in step S110 is continued. FIG. 2 illustrates that the user has set the air conditioners AC1, AC2, and AC3 as candidate appliances to be operated. In this embodiment, setting information is exemplified by information representing the air conditioners AC1, AC2, and AC3 that are set as candidate appliances to be operated. The candidate appliances to be operated may be set in accordance with a user's need. Therefore, the principle of this embodiment is not limited by a specific setting of candidate appliances to be operated.

The memory also stores information about temperature conditions that are defined for the individual air conditioners AC1, AC2, and AC3 set as candidate appliances to be operated, as well as the information about the candidate appliances to be operated. The temperature conditions define start conditions under which the air conditioners AC1, AC2, and AC3 are activated. For example, the user may set a lower-limit temperature of 20° C. and an upper-limit temperature of 30° C. as a temperature condition for the air conditioner AC1. The user may set a lower-limit temperature of 22° C. and an upper-limit temperature of 33° C. as a temperature condition for the air conditioner AC2. The user may set a lower-limit temperature of 18° C. and an upper-limit temperature of 35° C. as a temperature condition for the air conditioner AC3. In this embodiment, condition information is exemplified by the information about temperature conditions.

A computer of the communication terminal (for example, a central processing unit (CPU)) compares an outside temperature with a temperature represented by a temperature condition. The outside temperature may be a temperature outside a vehicle. Alternatively, the outside temperature may be a temperature outside the rooms where the plurality of air conditioners AC1, AC2, AC3, and AC4 are installed. The principle of this embodiment is not limited by a specific position at which an outside temperature is measured.

FIG. 2 illustrates that the air conditioners AC1 and AC2 are selected, by the computer, as target appliances to be operated. If information about an outside temperature obtained by the computer represents 34° C., the computer selects the air conditioners AC1 and AC2 as target appliances to be operated. The air conditioners AC1 and AC2 operate in a cooling mode under the control executed by the control system. That is, the above-described setting of an upper-limit temperature is used as a start condition of starting operation in the cooling mode.

If information about an outside temperature obtained by the computer represents 18° C., the computer selects the air conditioners AC1 and AC2 as target appliances to be operated. The air conditioners AC1 and AC2 operate in a heating mode under the control executed by the control system. That is, the above-described setting of a lower-limit temperature is used as a start condition of starting operation in the heating mode. In this embodiment, a set temperature is exemplified by the above-described upper-limit temperature and lower-limit temperature. The upper-limit temperature and lower-limit temperature may be determined according to user's preference. Thus, the principle of this embodiment is not limited by specific values of the upper-limit temperature and lower-limit temperature.

FIGS. 3A and 3B are conceptual diagrams illustrating the processing in step S120. With reference to FIGS. 1 to 3B, a description will be given of the processing in step S120. In this embodiment, a second judgment step is exemplified by step S120.

As illustrated in FIG. 2, when the computer of the communication terminal selects a plurality of air conditioners (the air conditioners AC1 and AC2) as target appliances to be operated, step S120 is executed.

As illustrated in FIGS. 3A and 3B, the control system presets a control region CR surrounding a building HM in which the air conditioners AC1, AC2, AC3, and AC4 are installed. The area and shape of the control region CR may be determined by the user. Alternatively, the area and shape of the control region CR may be determined by the control system. The principle of this embodiment is not limited by a specific area and a specific shape of the control region CR.

The computer of the communication terminal obtains position information about the position of a vehicle VC. The obtainment of the position information may depend on a global positioning system (GPS) technique that is used for a general car navigation system. The principle of this embodiment is not limited by a specific technique for obtaining position information. In this embodiment, a car is exemplified by the vehicle VC.

FIG. 3A illustrates that the vehicle VC exists in the control region CR. FIG. 3B illustrates that the vehicle VC exists in a region outside the control region CR. The computer of the communication terminal judges, on the basis of the position information, whether or not the vehicle VC exists in the control region CR.

Figure 4:
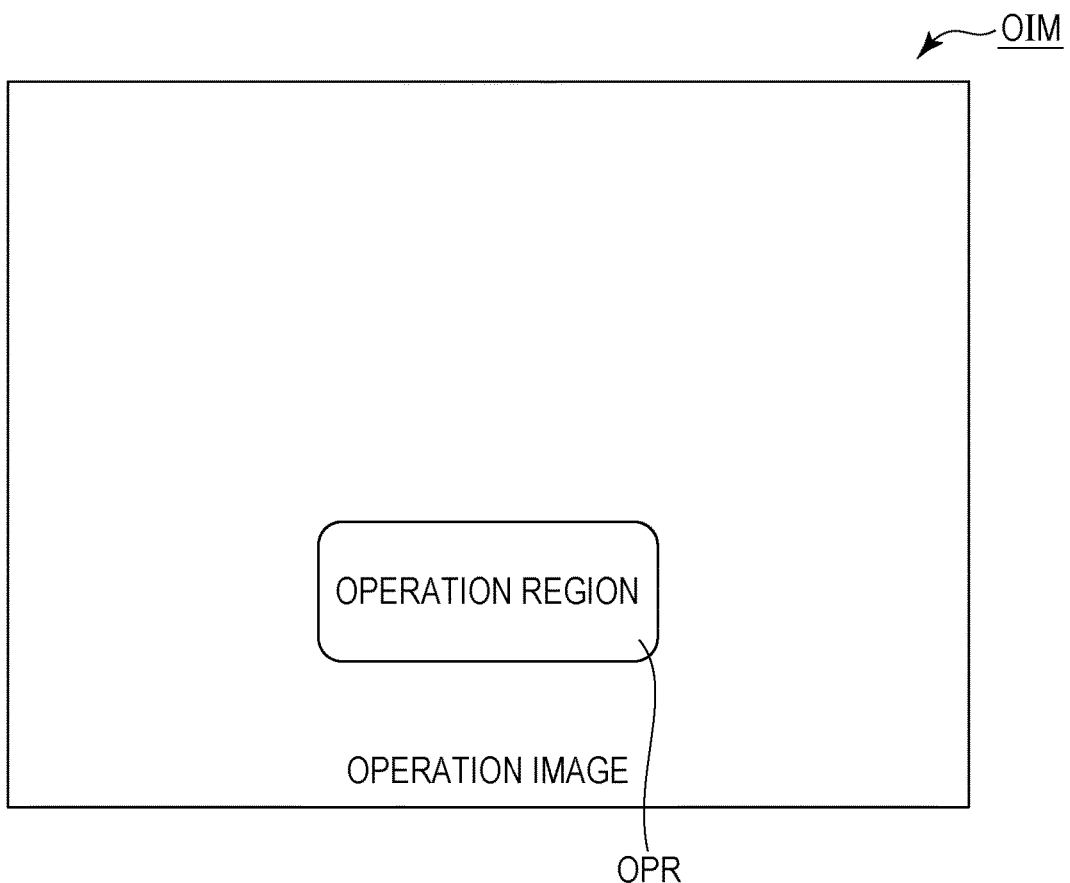
FIG. 4 is a conceptual diagram illustrating the processing in step S130 of the flowchart illustrated in FIG. 1 (first embodiment)

FIG. 4 is a conceptual diagram illustrating the processing in step S130. With reference to FIGS. 1, 2, 3A and 4, a description will be given of the processing in step S130. In this embodiment, a first display step is exemplified by step S130.

As illustrated in FIG. 3A, when the computer of the communication terminal judges that the vehicle VC exists in the control region CR, step S130 is executed.

In step S130, a touch panel display of the communication terminal displays an operation image OIM for providing an instruction to start a remote operation for the air conditioners AC1 and AC2 selected as target appliances to be operated. The operation image OIM includes an operation region OPR, which is operated by the user. The operation region OPR may be a general icon button. The principle of this embodiment is not limited by a specific design of the image displayed as the operation region OPR. In this embodiment, a display is exemplified by the touch panel display of the communication terminal. A start instruction image is exemplified by the operation image OIM.

The user is able to provide an instruction to start a remote operation to both the air conditioners AC1 and AC2 by operating the operation region OPR. Thus, the user is able to provide an instruction to start a remote operation to the air conditioners AC1 and AC2 with a smaller amount of operations than in the related art. In this embodiment, an instruction image region is exemplified by the operation region OPR.

FIG. 5 is a conceptual diagram illustrating communications between a communication terminal 100 and the air conditioners AC1 and AC2. With reference to FIGS. 1, 4, and 5, a description will be given of the processing in step S140. In this embodiment, an output step is exemplified by step S140.

When the user operates the operation region OPR, the computer of the communication terminal 100 in the vehicle VC generates control data for starting a remote operation for the air conditioners AC1 and AC2 selected as target appliances to be operated. The control data is output from the communication terminal 100 to a network NTW. The control data may be subjected to certain signal processing over the network NTW. Alternatively, the control data may be directly transmitted to the air conditioners AC1 and AC2 via the network NTW. The principle of this embodiment is not limited by specific signal processing executed on the control data over the network NTW.

The network NTW transmits the control data to each of the air conditioners AC1 and AC2. When the air conditioner AC1 receives the control data, the air conditioner AC1 generates notification data representing the receipt of the control data. The notification data is transmitted from the air conditioner AC1 to the network NTW. When the air conditioner AC2 receives the control data, the air conditioner AC2 generates notification data representing the receipt of the control data. The notification data is transmitted from the air conditioner AC2 to the network NTW. The pieces of notification data transmitted from the air conditioners AC1 and AC2 are transferred from the network NTW to the communication terminal 100.

If the network NTW does not receive notification data from the air conditioner AC1, the network NTW may generate notification data indicating that transmission of the control data to the air conditioner AC1 has failed. If the network NTW does not receive notification data from the air conditioner AC2, the network NTW may generate notification data indicating that transmission of the control data to the air conditioner AC2 has failed. In these cases, notification data indicating that transmission of the control data has failed is transmitted from the network NTW to the communication terminal 100. Accordingly, the communication terminal 100 is able to grasp a result of the transmission of the control data.

FIG. 6 is a conceptual diagram illustrating the processing in step S150. With reference to FIGS. 1, 5, and 6, a description will be given of the processing in step S150. In this embodiment, a second display step is exemplified by step S150.

The computer of the communication terminal 100 generates notification images NI1 and NI2 in accordance with the pieces of notification data transmitted from the network NTW. The computer of the communication terminal 100 generates the notification image NI1 representing a result of transmission of the control data to the air conditioner AC1 in accordance with the notification data corresponding to the air conditioner AC1. The computer of the communication terminal 100 generates the notification image NI2 representing a result of transmission of the control data to the air conditioner AC2 in accordance with the notification data corresponding to the air conditioner AC2. Thus, the communication terminal 100 displays the plurality of notification images NI1 and NI2, unlike the operation image.

Second Embodiment

The processing described above in relation to the first embodiment can be executed by various communication terminals. In a second embodiment, a description will be given of an exemplary communication terminal.

FIG. 7 is a schematic block diagram illustrating an exemplary hardware configuration of the communication terminal 100 described above in relation to the first embodiment. With reference to FIGS. 1 to 7, a description will be given of an exemplary hardware configuration of the communication terminal 100.

The communication terminal 100 includes a CPU 110, a bus 120, a data communication device 130, a memory 140, an information obtaining device 150, and a touch panel display 160. The CPU 110 is connected to the data communication device 130, the memory 140, the information obtaining device 150, and the touch panel display 160 via the bus 120. The CPU 110 executes a program of controlling the data communication device 130, the memory 140, the information obtaining device 150, and the touch panel display 160. In this embodiment, a computer is exemplified by the CPU 110.

The data communication device 130 is used to transmit control data and receive notification data described above with reference to FIG. 5. In addition, the data communication device 130 may receive information representing a temperature in the building HM from the air conditioner AC1, AC2, AC3, or AC4. The data communication device 130 may be designed on the basis of a general communication technique for transmitting and receiving data. The principle of this embodiment is not limited by a specific structure of the data communication device 130.

The memory 140 includes a first storage region 141 and a second storage region 142. The first storage region 141 is used to store information specifying the air conditioners AC1, AC2, AC3, and AC4 described above with reference to FIG. 2. In addition, the first storage region 141 is used to store information about the setting of candidate appliances to be operated described above with reference to FIG. 2. The second storage region 142 is used to store information about the temperature conditions described above with reference to FIG. 2. The second storage region 142 may be provided in a memory element different from the one provided with the first storage region 141. The principle of this embodiment is not limited by a specific structure of the memory 140. In this embodiment, a first memory is exemplified by the first storage region 141. A second memory is exemplified by the second storage region 142.

The memory 140 may store other information in addition to the above-described information. For example, the memory 140 may store information about the position of the building HM.

The information obtaining device 150 may be a GPS device that obtains position information about the position of the vehicle VC. In addition, a temperature sensor that detects a temperature outside the vehicle VC may be used as the information obtaining device 150.

The touch panel display 160 includes a display 161 and an operation detection sensor 162. The display 161 displays the operation image OIM described above with reference to FIG. 4. In addition, the display 161 displays the plurality of notification images NI1 and NI2 described above with reference to FIG. 6. The operation detection sensor 162 detects a user operation performed in the operation region OPR described above with reference to FIG. 4.

Instead of the touch panel display 160, a display device that is used exclusively for displaying the operation image OIM and the plurality of notification images NI1 and NI2, and an input device that is used exclusively for accepting a user operation may be used.

The CPU 110 executes a program for carrying out the processing described above with reference to FIG. 1. The program may be stored in the memory 140 in advance. Alternatively, the program may be called by the CPU 110 from another storage medium.

In step S110 described above with reference to FIG. 1, the program causes the CPU 110 to read information from the first storage region 141 and information from the second storage region 142. In addition, the program causes the CPU 110 to obtain information about an outside temperature. The CPU 110 may obtain information about an outside temperature via the data communication device 130. Alternatively, the CPU 110 may obtain information about an outside temperature from the information obtaining device 150.

The CPU 110 is able to find out, from the information read from the first storage region 141, that the user has set the air conditioners AC1, AC2, and AC3 as candidate appliances to be remotely operated (see FIG. 2). The CPU 110 is able to find out, from the information read from the second storage region 142, information about temperatures that are set as start conditions of starting a remote operation for the air conditioners AC1, AC2, and AC3.

The program causes the CPU 110 to compare the information about an outside temperature with the information about the temperatures that are set as start conditions. As a result, the CPU 110 is able to determine to handle the air conditioners AC1 and AC2 as target appliances to be operated.

In step S120 described above with reference to FIG. 1, the program causes the CPU 110 to obtain, from the information obtaining device 150, information about the position of the vehicle VC. The program causes the CPU 110 to read, from the memory 140, information about the position of the building HM. The program then causes the CPU 110 to compare the information about the position of the vehicle VC with the information about the position of the building HM. As a result, the CPU 110 is able to judge whether or not the vehicle VC exists within the control region CR (see FIGS. 3A and 3B).

If the CPU 110 judges that the vehicle VC exists within the control region CR, the program causes the CPU 110 to generate image data representing the operation image OIM described above with reference to FIG. 4 (step S130 described above with reference to FIG. 1). The image data is output from the CPU 110 to the touch panel display 160. The touch panel display 160 displays the operation image OIM on the display 161 in accordance with the image data.

When the user operates the operation region OPR in the operation image OIM, the operation detection sensor 162 generates a detection signal indicating that the user has operated the operation region OPR. The detection signal is output from the operation detection sensor 162 to the CPU 110.

When the CPU 110 receives the detection signal, the program causes the CPU 110 to generate control data (step S140 described above with reference to FIG. 1). The control data is output from the CPU 110 to the data communication device 130. After that, as described above with reference to FIG. 5, the control data is transmitted to the air conditioners AC1 and AC2 via the network NTW.

As described above with reference to FIG. 5, the network NTW transmits pieces of notification data. The data communication device 130 receives the pieces of notification data. The pieces of notification data are output from the data communication device 130 to the CPU 110.

When the CPU 110 receives the pieces of notification data, the program causes the CPU 110 to generate pieces of image data representing the notification images NI1 and NI2. The pieces of image data are output from the CPU 110 to the touch panel display 160. The touch panel display 160 displays, on the display 161, the notification images NI1 and NI2 (step S150 described above with reference to FIG. 1).

Third Embodiment

As described above in relation to the first embodiment, the user sets a plurality of candidate appliances to be operated in order to specify a target appliance to be operated. In addition, the user sets a temperature defining a start condition of a remote operation for each of the plurality of candidate appliances to be operated. In a third embodiment, a description will be given of an exemplary method for setting a plurality of candidate appliances to be operated and a start condition.

Figure 8A:
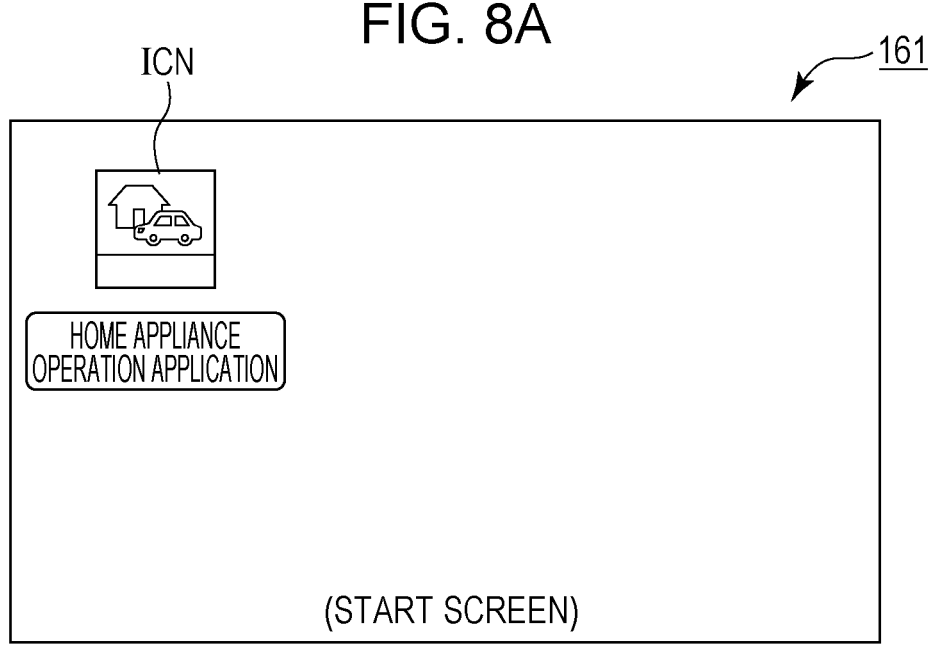
FIG. 8A illustrates an exemplary image used by a user to set a plurality of candidate appliances to be operated and a start condition of a remote operation (third embodiment)

FIGS. 8A to 8F illustrate exemplary images used by the user to set a plurality of candidate appliances to be operated and a start condition of a remote operation. With reference to FIGS. 7 to 8F, a description will be given of an exemplary method for setting a plurality of candidate appliances to be operated and a start condition.

When an application program is installed in the communication terminal 100, an icon ICN illustrated in FIG. 8A is displayed on the display 161. When the user double-clicks the icon ICN, the display 161 displays the image illustrated in FIG. 8B.

Figure 8B:
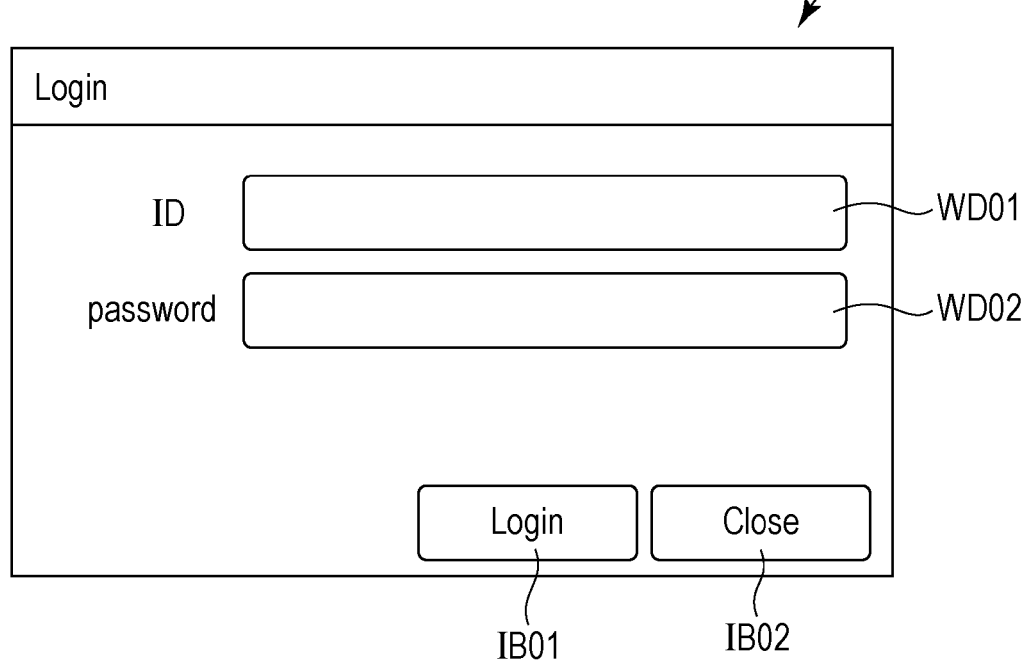
FIG. 8B illustrates an exemplary image used by the user to set a plurality of candidate appliances to be operated and a start condition of a remote operation (third embodiment)

The image illustrated in FIG. 8B includes two input windows WD01 and WD02 and two icon buttons IB01 and IB02. The image illustrated in FIG. 8B is used to authenticate the user. A unique identification number is assigned to the user in advance. In addition, the user sets a password for using the application program in advance. Thus, a third party is not able to use the application program without permission.

The user inputs the identification number into the input window WD01. In addition, the user inputs the password into the input window WD02. After that, when the user presses the icon button IB01, the display 161 displays the image illustrated in FIG. 8C. When the user presses the icon button IB02, the display 161 displays the image illustrated in FIG. 8A again.

Figure 8C:
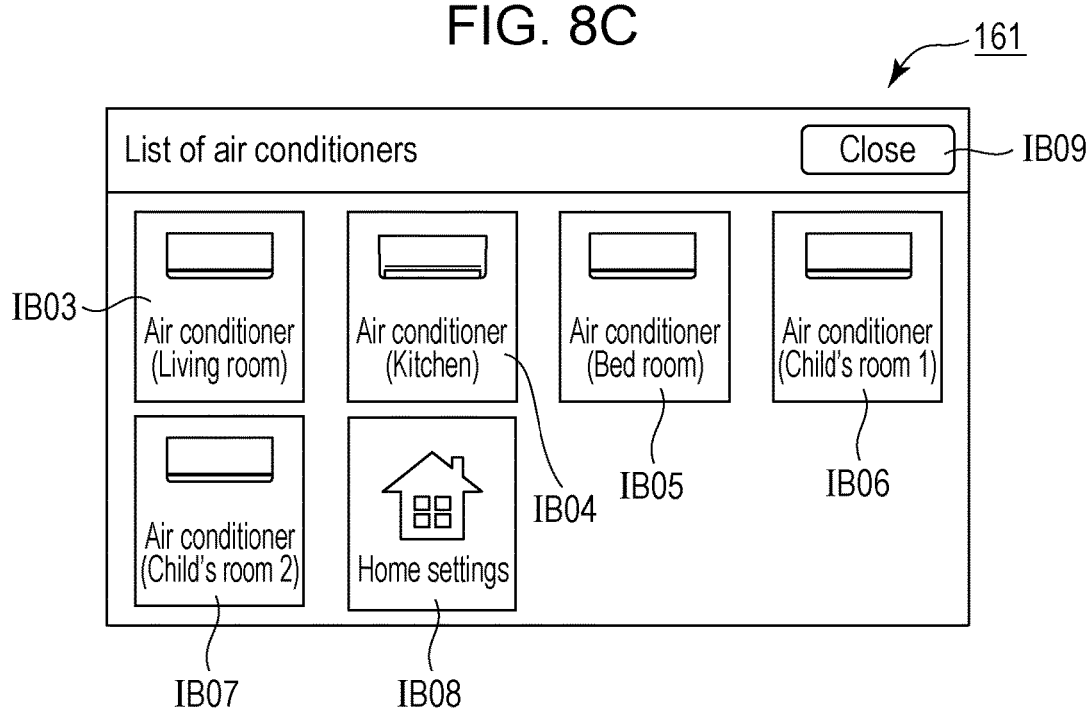
FIG. 8C illustrates an exemplary image used by the user to set a plurality of candidate appliances to be operated and a start condition of a remote operation (third embodiment)

The image illustrated in FIG. 8C includes seven icon buttons IB03, IB04, IB05, IB06, IB07, IB08, and IB09. The five icon buttons IB03, IB04, IB05, IB06, and IB07 respectively represents a plurality of air conditioners owned by the user. FIG. 8C illustrates that the user owns five air conditioners.

One of the five air conditioners is installed in a living room. Another one of the five air conditioners is installed in a kitchen. Another one of the five air conditioners is installed in a bed room. Another one of the five air conditioners is installed in one of two child's rooms. The other one of the five air conditioners is installed in the other child's room. The user is able to make various settings for the five air conditioners by operating the five icon buttons IB03, IB04, IB05, IB06, and IB07. When the user presses the icon button IB03, the display 161 displays the image illustrated in FIG. 8D. As a result, the user is able to set an operation of the air conditioner installed in the living room.

Figure 8D:
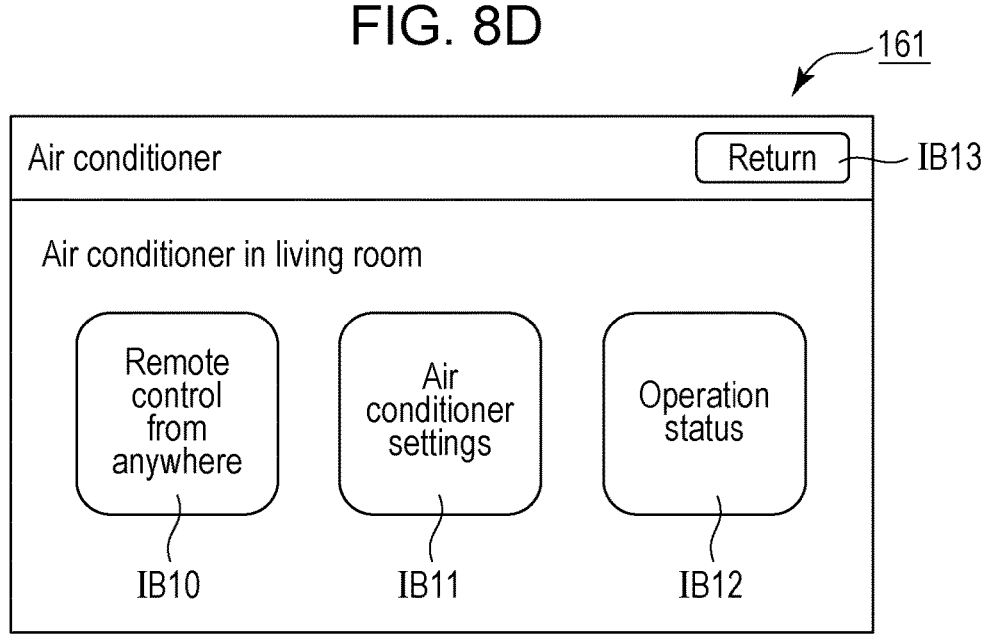
FIG. 8D illustrates an exemplary image used by the user to set a plurality of candidate appliances to be operated and a start condition of a remote operation (third embodiment)

The image illustrated in FIG. 8D includes four icon buttons IB10, IB11, IB12, and IB13. When the user presses the icon button IB11, the display 161 displays an image with which the user selects one of a setting about on-recommend processing and a setting about off-recommend processing (see FIG. 8E). In the following description, the term "off-recommend processing" means the processing for turning off an air conditioner through a remote operation executed from the communication terminal 100.

The image illustrated in FIG. 8E includes three icon buttons IB14, IB15, and IB16. When the user presses the icon button IB14, an image for setting a plurality of candidate appliances to be operated and a start condition (see FIG. 8F) is displayed.

The image illustrated in FIG. 8F includes two display windows WD03 and WD04 and six icon buttons IB17, IB18, IB19, IB20, IB21, and IB22. The display window WD03 displays the above-described lower-limit temperature. When the user presses the icon button IB17, the value of the lower-limit temperature increases. When the user presses the icon button IB18, the value of the lower-limit temperature decreases. The display window WD04 displays the above-described upper-limit temperature. When the user presses the icon button IB19, the value of the upper-limit temperature increases. When the user presses the icon button IB20, the value of the upper-limit temperature decreases. Thus, the user is able to set a start condition by operating the icon buttons IB17, IB18, IB19, and IB20. FIG. 8F illustrates that the air conditioner in the living room is activated in response to a remote operation from the communication terminal 100 when the outside temperature becomes 15° C. or less or when the outside temperature becomes 25° C. or more.

The user is able to determine a candidate appliance to be operated, as well as a start condition, by using the image illustrated in FIG. 8F. If the user presses the icon button IB21, the air conditioner in the living room is registered as a candidate appliance to be operated. If the user does not press the icon button IB21, the air conditioner in the living room is not handled as a candidate appliance to be operated.

Figure 9:
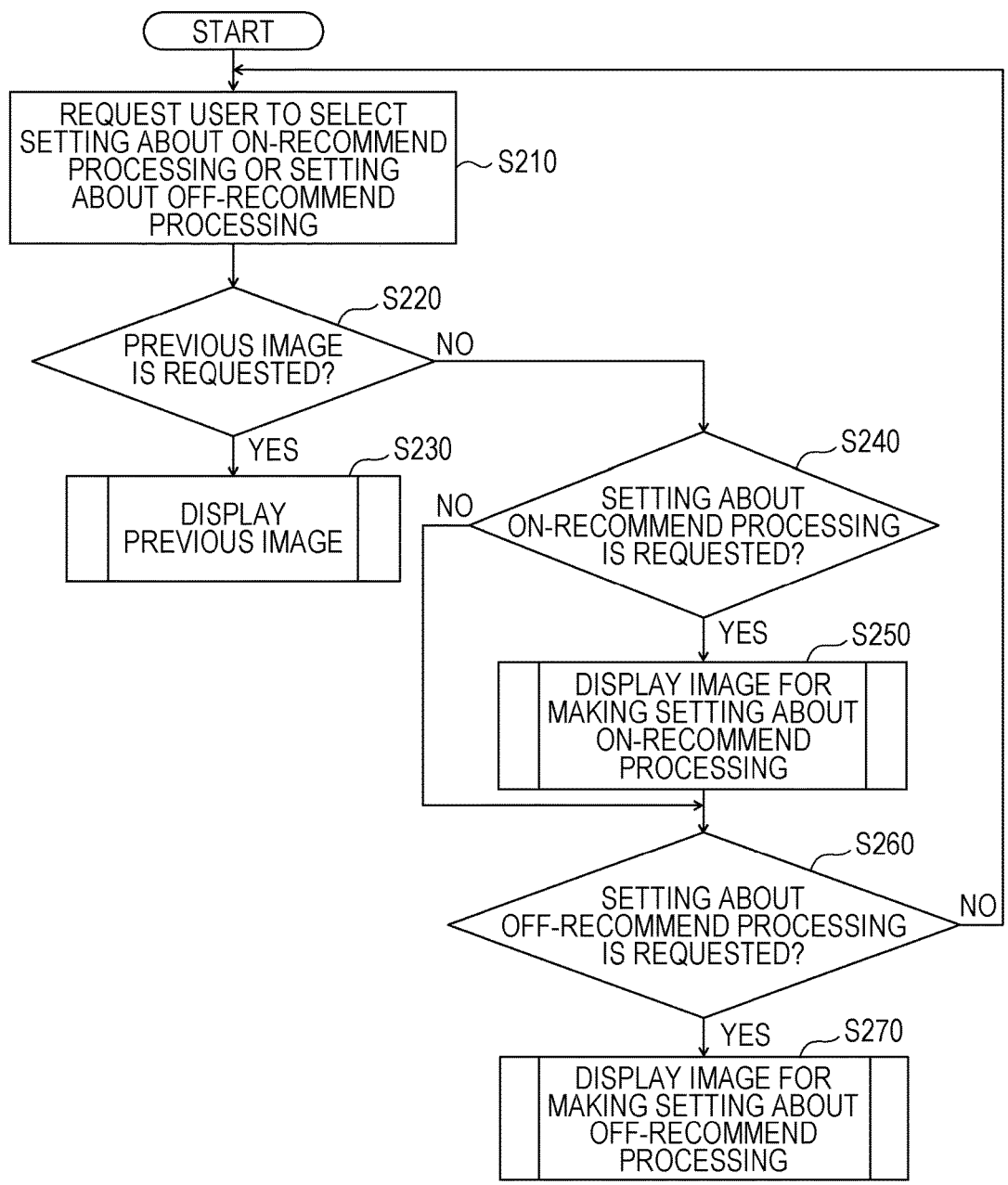
FIG. 9 is a schematic flowchart illustrating processing of a touch panel display that is executed when the image illustrated in FIG. 8E is displayed (third embodiment)

FIG. 9 is a schematic flowchart illustrating processing of the touch panel display 160 that is executed when the image illustrated in FIG. 8E is displayed. With reference to FIGS. 7 and 8D to 9, a description will be given of the processing of the touch panel display 160.

In step S210, the display 161 displays the image illustrated in FIG. 8E. As a result, the user is requested to make a setting about on-recommend processing or a setting about off-recommend processing. After that, step S220 is executed.

In step S220, the touch panel display 160 judges whether or not the user requests display of the previously displayed image (that is, the image illustrated in FIG. 8D). If the user presses the icon button IB16, step S230 is executed. Otherwise, step S240 is executed.

In step S230, the display 161 displays the image illustrated in FIG. 8D. After that, the user performs a certain operation on the image illustrated in FIG. 8D.

In step S240, the touch panel display 160 judges whether or not the user requests a setting about on-recommend processing. If the user presses the icon button IB14, step S250 is executed. Otherwise, step S260 is executed.

In step S250, the display 161 displays the image illustrated in FIG. 8F. After that, the user performs a certain operation on the image illustrated in FIG. 8F.

In step S260, the touch panel display 160 judges whether or not the user requests a setting about off-recommend processing. If the user presses the icon button IB15, step S270 is executed. Otherwise, step S210 is executed.

In step S270, the display 161 displays an image for making a setting about off-recommend processing. The user makes a certain setting on the image for making a setting about off-recommend processing.

Figure 10:
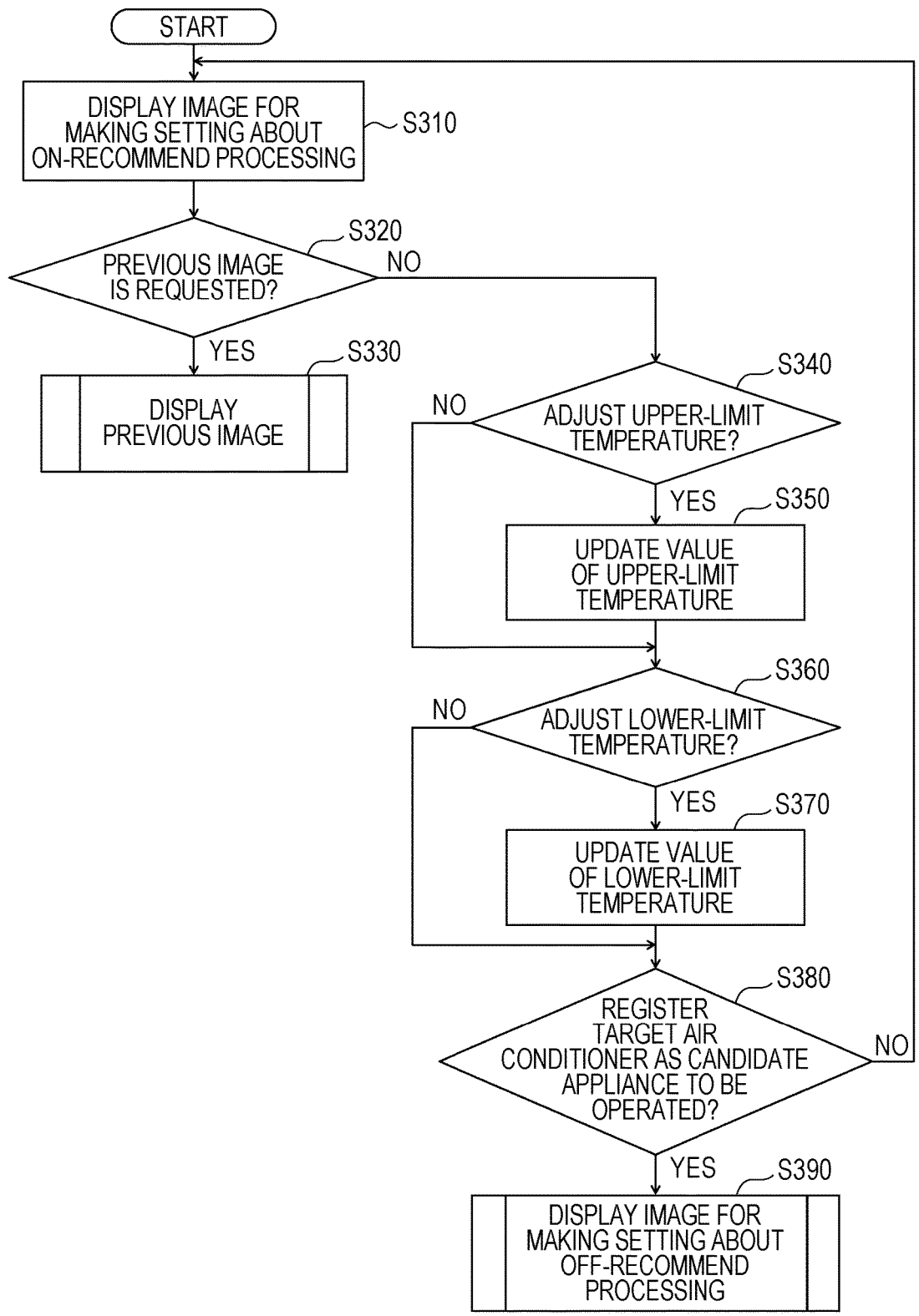
FIG. 10 is a schematic flowchart illustrating processing of the touch panel display that is executed when the image illustrated in FIG. 8F is displayed (third embodiment)

FIG. 10 is a schematic flowchart illustrating processing of the touch panel display 160 that is executed when the image illustrated in FIG. 8F is displayed. With reference to FIGS. 7 and 8E to 10, a description will be given of the processing of the touch panel display 160.

Step S310 is executed after step S250 described above with reference to FIG. 9. In step S310, the display 161 displays the image illustrated in FIG. 8F. After that, step S320 is executed.

In step S320, the touch panel display 160 judges whether or not the user requests display of the previously displayed image (that is, the image illustrated in FIG. 8E). If the user presses the icon button IB22, step S330 is executed. Otherwise, step S340 is executed.

In step S330, the display 161 displays the image illustrated in FIG. 8E. After that, the user performs a certain operation in accordance with the flowchart described above with reference to FIG. 9.

In step S340, the touch panel display 160 judges whether or not the user is going to adjust the upper-limit temperature. If the user is going to adjust the upper-limit temperature, the user presses the icon button IB19 or the icon button IB20. After that, step S350 is executed. Otherwise, step S360 is executed.

In step S350, the display 161 updates the value in the display window WD04 in response to pressing of the icon button IB19 or the icon button IB20. After that, step S360 is executed.

In step S360, the touch panel display 160 judges whether or not the user is going to adjust the lower-limit temperature. If the user is going to adjust the lower-limit temperature, the user presses the icon button IB17 or the icon button IB18. After that, step S370 is executed. Otherwise, step S380 is executed.

In step S370, the display 161 updates the value in the display window WD03 in response to pressing of the icon button IB17 or the icon button IB18. After that, step S380 is executed.

In step S380, it is judged whether or not the user is going to register the target air conditioner as a candidate appliance to be operated. If the user is going to register the target air conditioner as a candidate appliance to be operated, the user presses the icon button IB21. After that, step S390 is executed. Otherwise, step S310 is executed.

In step S390, the display 161 displays an image for making a setting about off-recommend processing. The user makes a certain setting on the image for making a setting about off-recommend processing.

FIG. 11 is a table showing setting data stored in the memory 140. With reference to FIGS. 7, 10, and 11, a description will be given of the setting data stored in the memory 140.

As a result of the processing described above with reference to FIGS. 9 and 10, the memory 140 is able to store the setting data illustrated in FIG. 11. FIG. 11 illustrates that the user sets the air conditioners installed in the living room, kitchen, bed room, and child's room 2 as candidate appliances to be operated, whereas the user does not set the air conditioner installed in the child's room 1 as a candidate appliance to be operated, in step S380 described above with reference to FIG. 10. Thus, the air conditioners installed in the living room, kitchen, bed room, and child's room 2 may be targets of the remote operation described above in relation to the first embodiment, whereas the air conditioner installed in the child's room 1 is excluded from the targets of the remote operation described above in relation to the first embodiment.

FIG. 11 illustrates that the user sets an upper-limit temperature of 25° C. for the air conditioners installed in the living room, kitchen, and the child's room 2, whereas the user sets an upper-limit temperature of 30° C. for the air conditioner installed in the bed room in step S340 described above with reference to FIG. 10. Thus, if the outside temperature exceeds 25° C., the air conditioners installed in the living room, kitchen, and child's room 2 operate in a cooling mode under the remote operation described above in relation to the first embodiment. If the outside temperature exceeds 30° C., all the air conditioners set as candidate appliances to be operated operate in the cooling mode under the remote operation described above in relation to the first embodiment.

FIG. 11 illustrates that the user sets a lower-limit temperature of 10° C. for the air conditioners installed in the living room, kitchen, and the child's room 2, whereas the user sets a lower-limit temperature of 5° C. for the air conditioner installed in the bed room in step S360 described above with reference to FIG. 10. Thus, if the outside temperature is under 10° C., the air conditioners installed in the living room, kitchen, and child's room 2 operate in a heating mode under the remote operation described above in relation to the first embodiment. If the outside temperature is under 5° C., all the air conditioners set as candidate appliances to be operated operate in the heating mode under the remote operation described above in relation to the first embodiment.

Fourth Embodiment

As described above in relation to the first embodiment, the user sets the position of a target building in order to judge whether or not a vehicle exists in a control region. In a fourth embodiment, a description will be given of an exemplary method for setting the position of a building.

Figure 12:
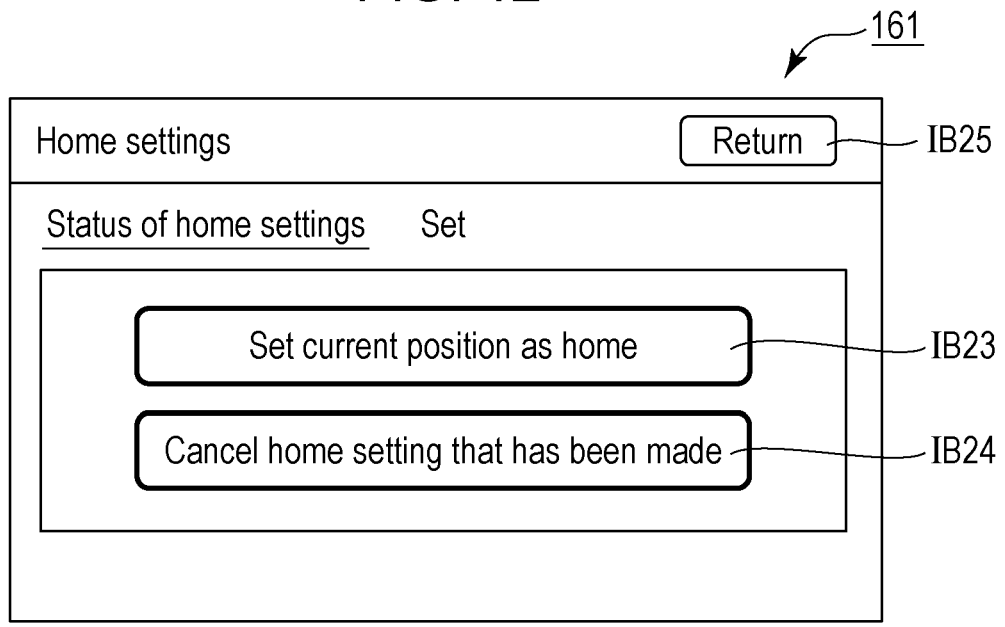
FIG. 12 illustrates an exemplary image used by the user to set the position of a building (fourth embodiment)

FIG. 12 illustrates an exemplary image used by the user to set the position of the building HM. With reference to FIGS. 3A, 7, 8C, and 12, a description will be given of an exemplary method for setting the position of the building HM.

The user is able to display, on the display 161, the image illustrated in FIG. 8C by using the method described above in relation to the third embodiment. When the user presses the icon button IB08, the display 161 displays the image illustrated in FIG. 12.

The image illustrated in FIG. 12 includes three icon buttons IB23, IB24, and IB25. The user is able to set the position of the building HM by pressing the icon button IB23. When the user presses the icon button IB23, the touch panel display 160 may determine the position of the communication terminal 100 at the time when the icon button IB23 is pressed to be the position of the building HM in conjunction with the GPS device used as the information obtaining device 150.

The user is able to cancel the setting about the position of the building HM set in the above-described manner by pressing the icon button IB24. When the user presses the icon button IB25, the display 161 displays the image illustrated in FIG. 8C.

Figure 13:
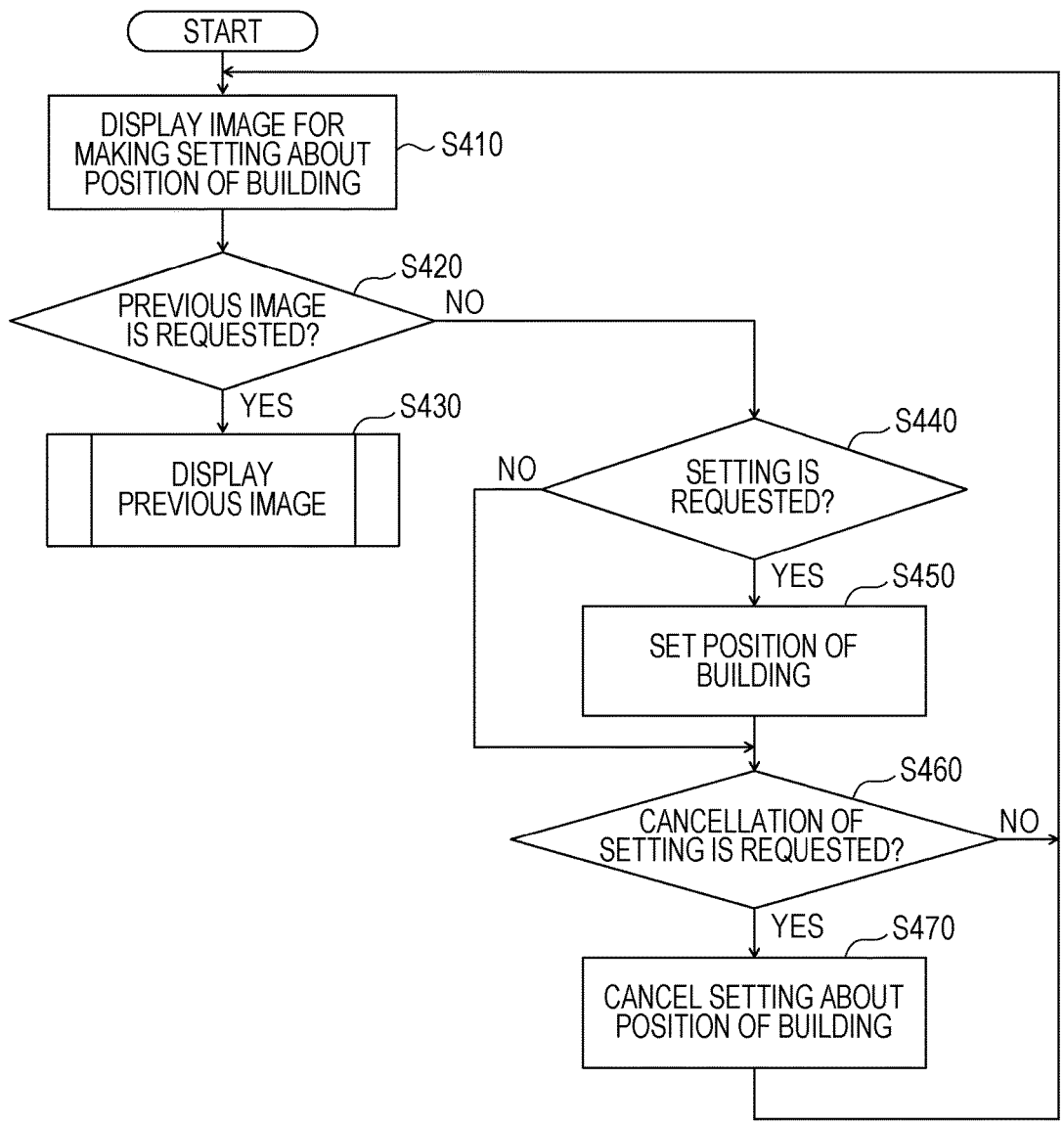
FIG. 13 is a schematic flowchart illustrating processing of the touch panel display that is executed when the image illustrated in FIG. 12 is displayed (fourth embodiment)

FIG. 13 is a schematic flowchart illustrating processing of the touch panel display 160 that is executed when the image illustrated in FIG. 12 is displayed. With reference to FIGS. 3A, 7, 8C, 12, and 13, a description will be given of the processing of the touch panel display 160.

In step S410, the display 161 displays the image illustrated in FIG. 12. After that, step S420 is executed.

In step S420, the touch panel display 160 judges whether or not the user requests display of the previously displayed image (that is, the image illustrated in FIG. 8C). If the user presses the icon button IB25, step S430 is executed. Otherwise, step S440 is executed.

In step S430, the display 161 displays the image illustrated in FIG. 8C. After that, the user performs a certain operation on the image illustrated in FIG. 8C.

In step S440, the touch panel display 160 judges whether or not the user requests setting of the position of the building HM. If the user wants to set the position of the building HM, the user presses the icon button IB23. After that, step S450 is executed. Otherwise, step S460 is executed.

In step S450, the touch panel display 160 may register, as the position of the building HM, the position of the communication terminal 100 at the time when the icon button IB23 is pressed. Information about the position of the building HM is output from the touch panel display 160 to the memory 140. After that, step S460 is executed.

In step S460, the touch panel display 160 judges whether or not the user requests cancellation of the setting about the position of the building HM. If the user wants to cancel the setting about the position of the building HM, the user presses the icon button IB24. After that, step S470 is executed. Otherwise, step S410 is executed.

In step S470, the CPU 110 erases information about the position of the building HM from the memory 140. As a result, the setting of the position of the building HM is appropriately canceled. After that, step S410 is executed.

Fifth Embodiment

As described above in relation to the first embodiment, the communication terminal receives notification data from an air conditioner. If the communication terminal obtains, in addition to the notification data, operation data representing the status of the operation of the air conditioner after control data is received, the user is able to determine whether or not the air conditioner is appropriately operating under the above-described remote operation. In a fifth embodiment, a description will be given of a control system capable of transmitting, as notification data, operation data representing a status of an operation of an air conditioner from the air conditioner to the communication terminal.

FIG. 14 is a conceptual diagram of a control system 200 including the communication terminal 100. With reference to FIG. 14, a description will be given of the control system 200.

The control system 200 includes a server apparatus 300 in addition to the communication terminal 100, which has been described above in relation to the first embodiment. The server apparatus 300 is connected to the communication terminal 100 so as to be able to communicate with the communication terminal 100 via an Internet communication network ITN. The control data described above in relation to the first embodiment is transmitted from the communication terminal 100 to the server apparatus 300 via the Internet communication network ITN.

After that, the control data is transmitted from the server apparatus 300 to an air conditioner group ACG via the Internet communication network ITN. The air conditioner group ACG includes a plurality of air conditioners installed in the building HM. Each of the plurality of air conditioners that has received the control data operates in accordance with the control data.

Each of the plurality of air conditioners that operates in accordance with the control data generates notification data representing the receipt of the control data. The pieces of notification data representing the receipt of the control data are transmitted from the air conditioner group ACG to the server apparatus 300 via the Internet communication network ITN. After that, the server apparatus 300 transmits the pieces of notification data to the communication terminal 100.

FIGS. 15A to 15D illustrate exemplary images that are presented to the user by the communication terminal 100. With reference to FIGS. 1, 4, 7, and 14 to 15D, a description will be given of the images presented to the user by the communication terminal 100.

Figure 15A:
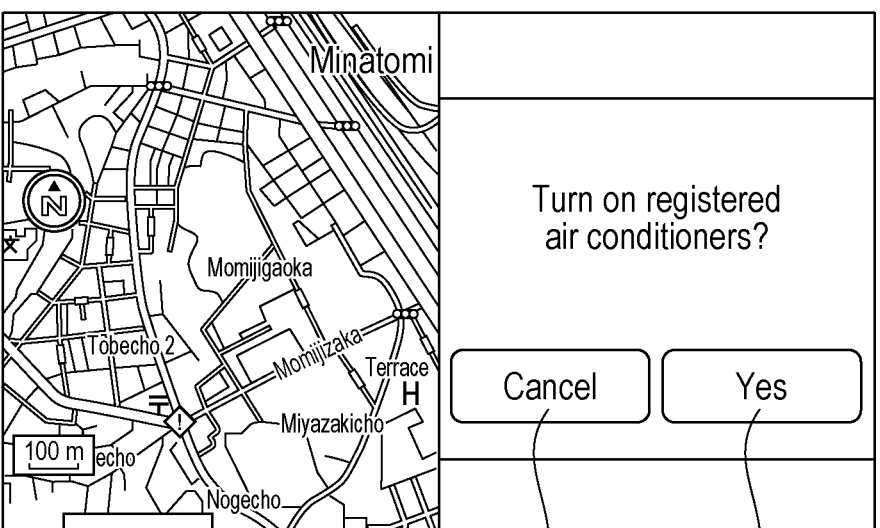
FIG. 15A illustrates an exemplary image that is presented to the user by the communication terminal illustrated in FIG. 7 (fifth embodiment)

In step S130 described above with reference to FIG. 1, the display 161 displays the image illustrated in FIG. 15A. The image illustrated in FIG. 15A corresponds to the operation image OIM described above with reference to FIG. 4.

The image illustrated in FIG. 15A includes two icon buttons IB26 and IB27. The icon buttons IB26 and IB27 correspond to the operation region OPR described above with reference to FIG. 4.

If the user presses the icon button IB26, the communication terminal 100 may suspend the processing illustrated in FIG. 1. When the user presses the icon button IB27, the CPU 110 generates control data. As described above with reference to FIG. 14, the control data is transmitted to the air conditioner group ACG via the server apparatus 300 (step S140 in FIG. 1).

The control data is received by a plurality of air conditioners specified as target appliances to be operated in step S110 described above with reference to FIG. 1. Each of the plurality of air conditioners specified as target appliances to be operated then generates notification data. The pieces of notification data are transmitted to the communication terminal 100 via the server apparatus 300, as described above with reference to FIG. 14.

Figure 15B:
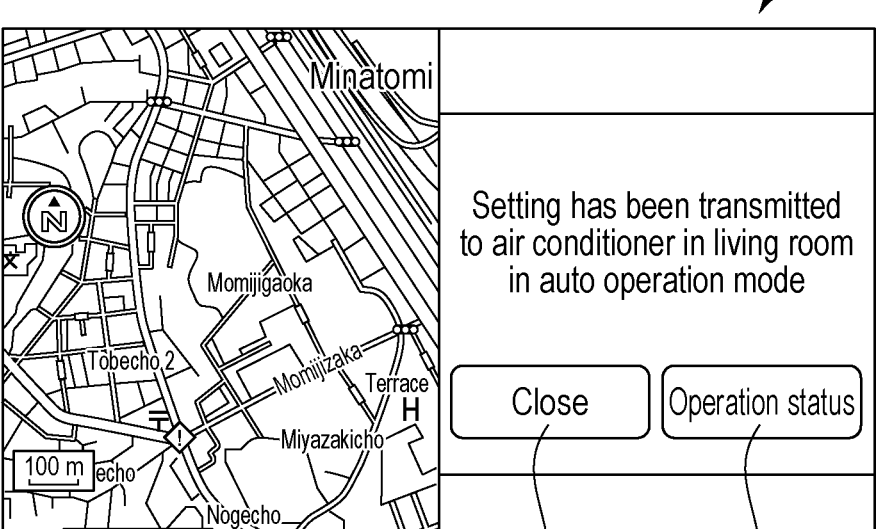
FIG. 15B illustrates an exemplary image that is presented to the user by the communication terminal illustrated in FIG. 7 (fifth embodiment)
Figure 15C:
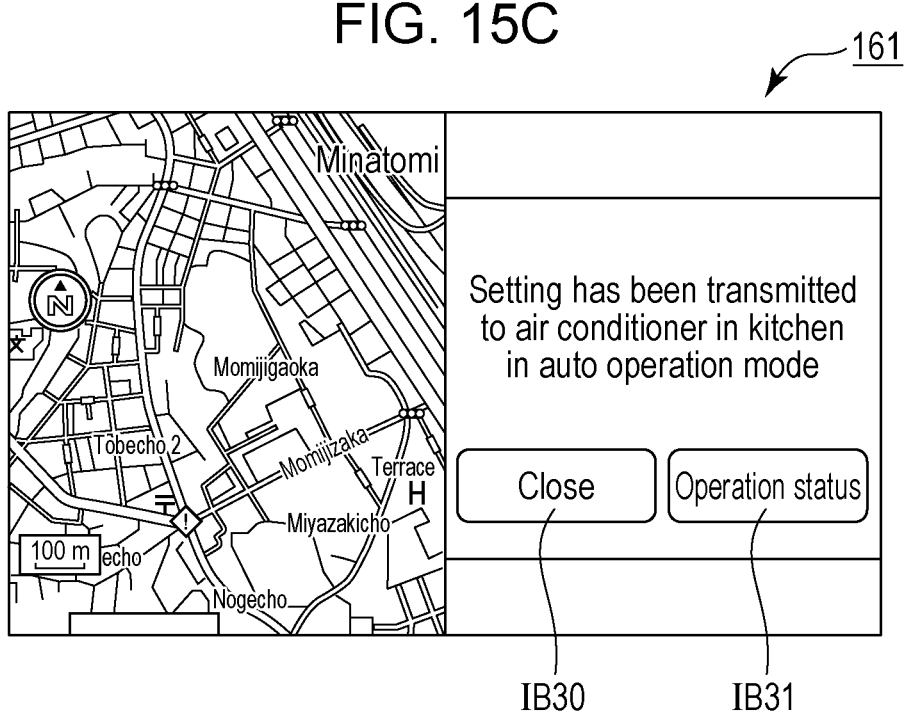
FIG. 15C illustrates an exemplary image that is presented to the user by the communication terminal illustrated in FIG. 7 (fifth embodiment)

When the communication terminal 100 receives the pieces of notification data from the individual air conditioners specified as target appliances to be operated, the display 161 sequentially displays the images illustrated in FIGS. 15B and 15C. FIG. 15B illustrates an image corresponding to the air conditioner installed in the living room. FIG. 15C illustrates an image corresponding to the air conditioner installed in the kitchen.

The image illustrated in FIG. 15B includes icon buttons IB28 and IB29. When the user presses the icon button IB28, the display 161 displays the image illustrated in FIG. 15C. When the user presses the icon button IB29, the communication terminal 100 requests the air conditioner installed in the living room to make a notification about the operation status. The air conditioner installed in the living room generates operation data representing the operation status. The operation data is then transmitted from the air conditioner installed in the living room to the communication terminal 100. As a result, the display 161 displays detailed information about the operation of the air conditioner installed in the living room (see FIG. 15D).

The image illustrated in FIG. 15C includes icon buttons IB30 and IB31. When the user presses the icon button IB30, the communication terminal 100 ends the processing illustrated in FIG. 1. When the user presses the icon button IB31, the display 161 displays detailed information about the operation of the air conditioner installed in the kitchen.

Figure 15D:
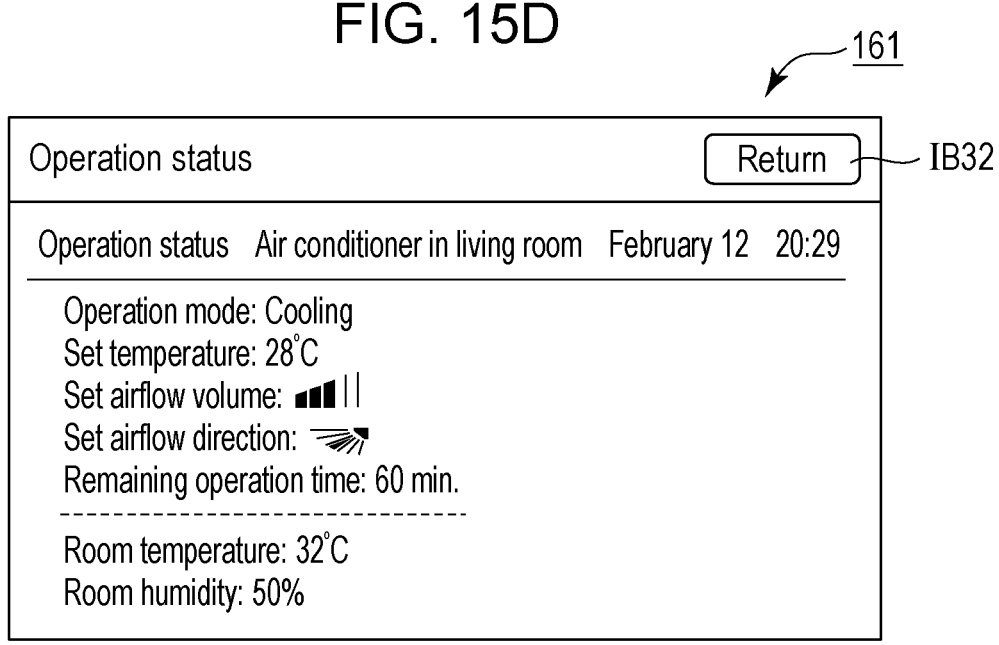
FIG. 15D illustrates an exemplary image that is presented to the user by the communication terminal illustrated in FIG. 7 (fifth embodiment)

The image illustrated in FIG. 15D represents detailed information about the operation of the air conditioner installed in the living room. The image illustrated in FIG. 15D indicates that the air conditioner in the living room is operating in the cooling mode. The image illustrated in FIG. 15D includes information representing a set temperature, a set airflow volume, a set airflow direction, a current temperature of the living room, and a current humidity of the living room. Thus, the user is able to visually determine that the air conditioner operating in the living room is appropriately operating.

The image illustrated in FIG. 15D includes an icon button IB32. When the user presses the icon button IB32, the display 161 displays the image illustrated in FIG. 15B again.

Sixth Embodiment

A general air conditioner is able to operate in various operation modes (for example, a cooling mode, a heating mode, an automatic mode, and a dry mode). If the user is allowed to change the setting of individual operation modes from a vehicle, the user is able to enjoy a comfortable environment upon entering a building. In a sixth embodiment, a description will be given of a communication terminal that allows the user in a vehicle to change the setting of an operation mode of an air conditioner.

Figure 16A:
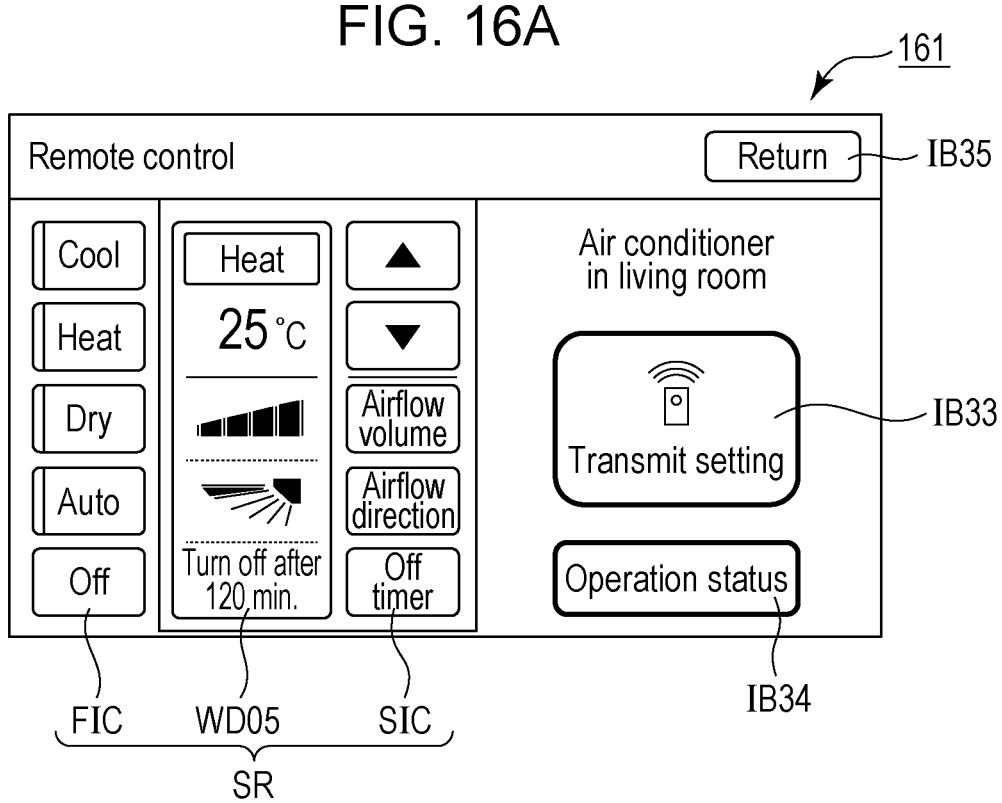
FIG. 16A illustrates an exemplary image that is presented to the user by the communication terminal illustrated in FIG. 7 (sixth embodiment)
Figure 16B:
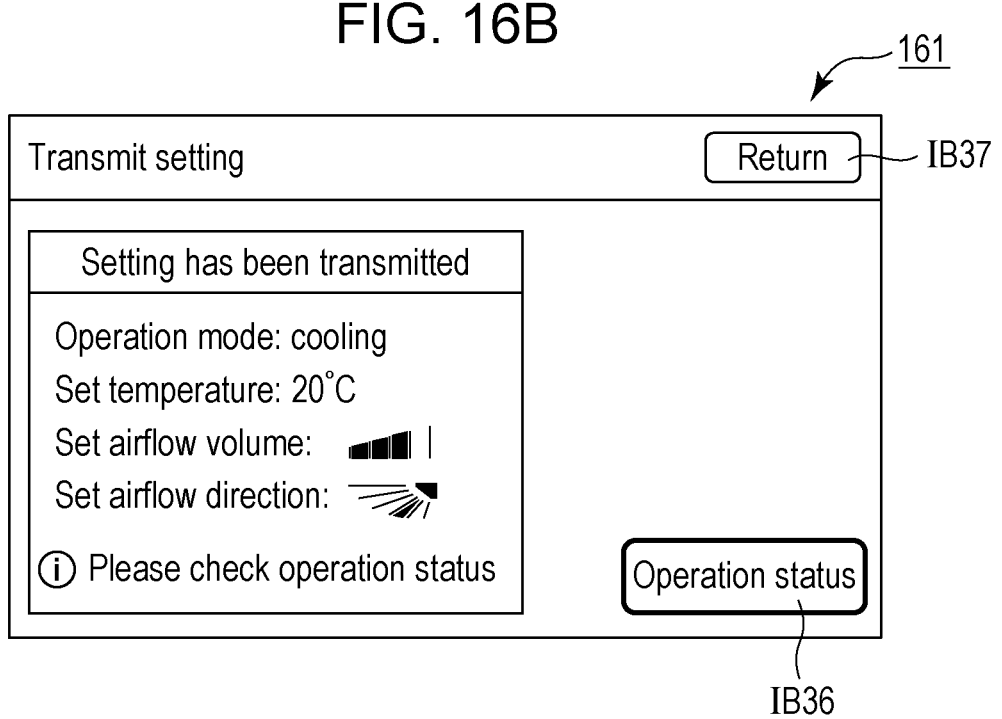
FIG. 16B illustrates an exemplary image that is presented to the user by the communication terminal illustrated in FIG. 7 (sixth embodiment)

FIGS. 16A and 16B illustrate images that are presented to the user by the communication terminal 100. With reference to FIGS. 7, 8C, 8D, 14, 15D, 16A, and 16B, a description will be given of the communication terminal 100 that allows the user to change the operation mode of an air conditioner.

The user is able to display the image illustrated in FIG. 8C by using the method described above in relation to the third embodiment. When the user presses the icon button IB03, the display 161 displays the image illustrated in FIG. 8D. After that, if the user presses the icon button IB10, the display 161 displays the image illustrated in FIG. 16A.

The image illustrated in FIG. 16A includes a setting region SR and three icon buttons IB33, IB34, and IB35. The setting region SR includes a first icon column FIC, a second icon column SIC, and a display window WD05. The first icon column FIC and the second icon column SIC each include a plurality of icon buttons for changing the setting of the operation mode. The user is able to change the setting of the operation mode by operating these icon buttons. Information about the setting of the operation mode is displayed on the display window WD05. Thus, the user is able to visually check the setting of the operation mode. Data about the setting of the operation mode is stored in the memory 140.

When the user presses the icon button IB33, the information about the setting of the operation mode is transmitted from the communication terminal 100 to the air conditioner group ACG via the server apparatus 300. As a result, the target air conditioner changes the setting of the operation mode.

When the user presses the icon button IB34, the display 161 displays the image illustrated in FIG. 15D. When the user presses the icon button IB35, the display 161 displays the image illustrated in FIG. 8D again.

When receiving the information about the setting of the operation mode, the target air conditioner generates notification data indicating that data has been appropriately transmitted from the communication terminal 100. The notification data is transmitted from the air conditioner group ACG to the communication terminal 100 via the server apparatus 300. As a result, the data communication device 130 receives the notification data.

When the data communication device 130 receives the notification data, the CPU 110 causes the display 161 to display the image illustrated in FIG. 16B. As a result, the user is able to determine that communication of the information about the setting of the operation mode has been appropriately executed.

The image illustrated in FIG. 16B includes two icon buttons IB36 and IB37. When the user presses the icon button IB36, the display 161 displays the image illustrated in FIG. 15D. When the user presses the icon button IB37, the display 161 displays the image illustrated in FIG. 16A again.

Figure 17:
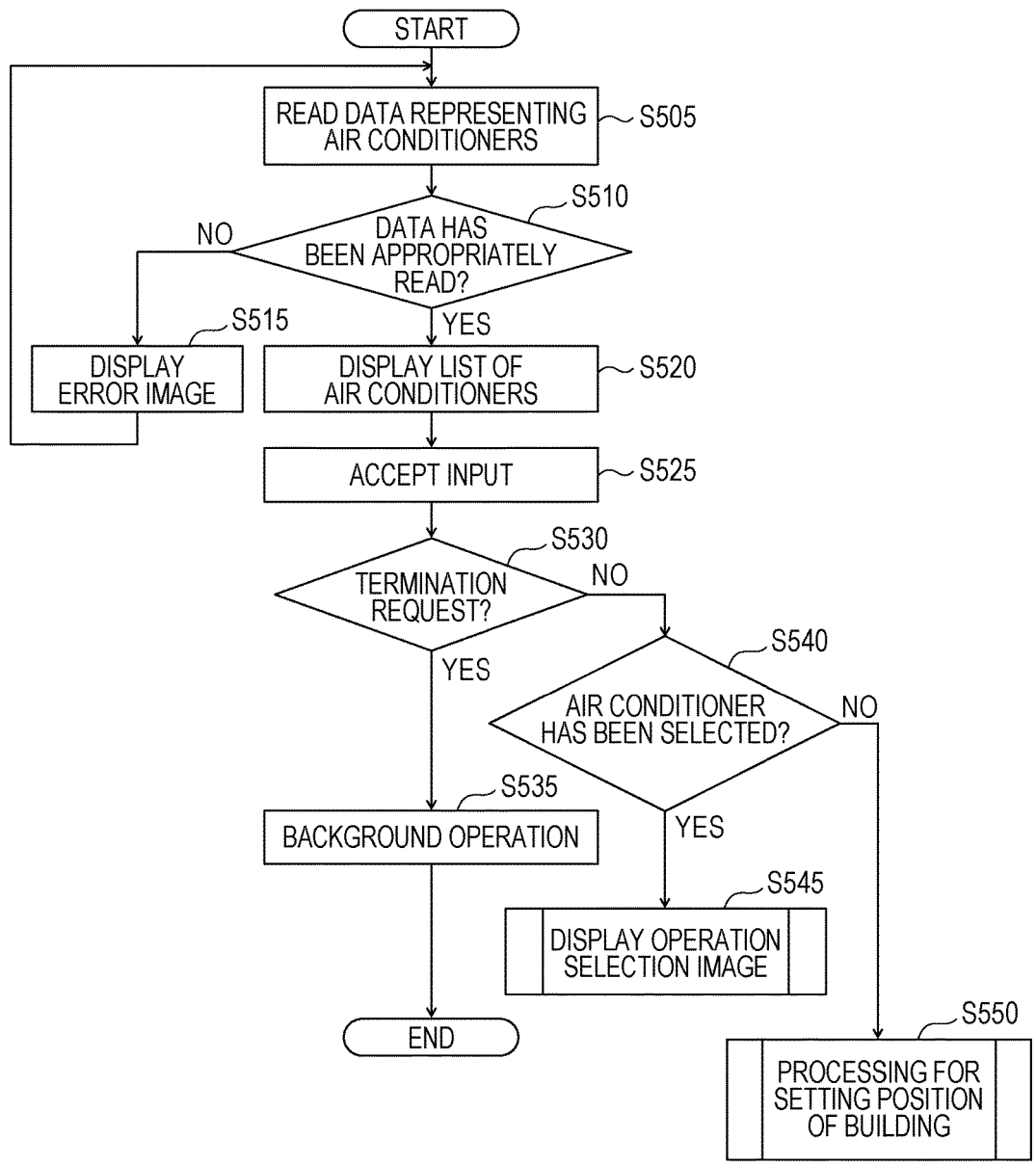
FIG. 17 is a schematic flowchart illustrating processing of the communication terminal that is executed when the image illustrated in FIG. 8C is displayed (sixth embodiment)

FIG. 17 is a schematic flowchart illustrating processing of the communication terminal 100 that is executed when the image illustrated in FIG. 8C is displayed. With reference to FIGS. 7, 8B, 8C, 11, 13, and 17, a description will be given of the processing of the communication terminal 100.

When the user inputs the identification number and the password on the image illustrated in FIG. 8B, step S505 is started. In step S505, the CPU 110 executes processing for reading the data described above with reference to FIG. 11 from the memory 140. After that, step S510 is executed.

In step S510, the CPU 110 judges whether or not the data described above with reference to FIG. 11 has been appropriately read. If the CPU 110 fails in reading the data, step S515 is executed. Otherwise, step S520 is executed.

In step S515, the CPU 110 causes the display 161 to display an error image indicating that the data has not appropriately been read. After that, step S505 is executed.

In step S520, the CPU 110 causes the display 161 to display the image described above with reference to FIG. 8C. After that, step S525 is executed.

In step S525, the user presses one of the icon buttons IB03 to IB09 on the image described above with reference to FIG. 8C. After that, step S530 is executed.

In step S530, the touch panel display 160 judges whether or not the icon button IB09 has been pressed. If the user has pressed the icon button IB09, step S535 is executed. Otherwise, step S540 is executed.

In step S535, the touch panel display 160 generates a notification signal indicating that the icon button IB09 has bee pressed. The notification signal is output from the touch panel display 160 to the CPU 110. The CPU 110 executes a certain background operation in response to the notification signal and ends the processing.

In step S540, the touch panel display 160 judges whether any one of the icon buttons IB03 to IB07 has been pressed or the icon button IB08 has been pressed. If the user has pressed any one of the icon buttons IB03 to IB07, step S545 is executed. Otherwise, step S550 is executed.

In step S545, the display 161 displays an operation selection image for the air conditioner corresponding to the pressed icon button (one of the icon buttons IB03 to IB07). FIG. 8D illustrates the image displayed on the display 161 upon pressing of the icon button IB03.

In step S550, the processing described above with reference to FIG. 13 is executed.

Figure 18:
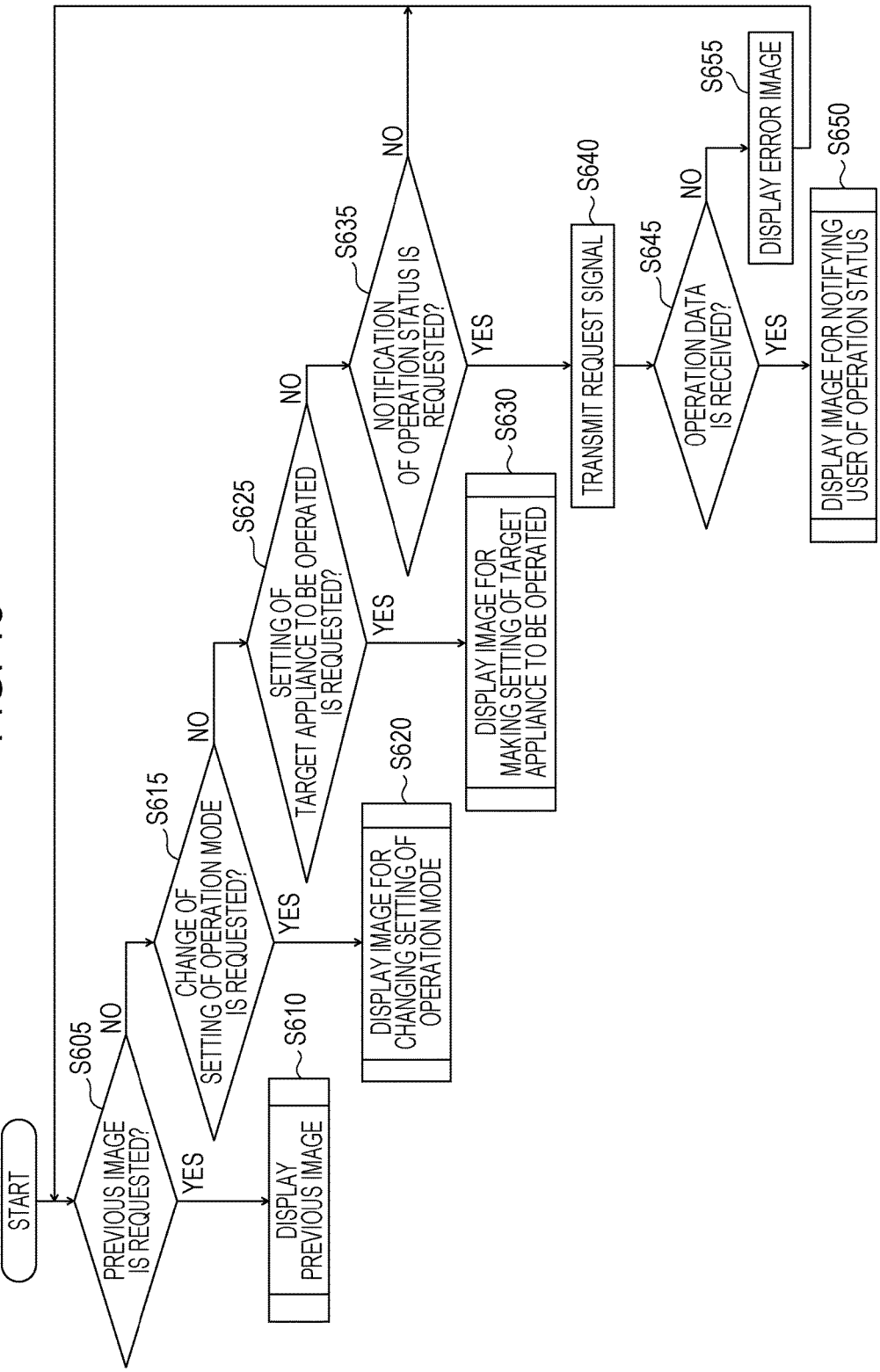
FIG. 18 is a schematic flowchart illustrating processing of the communication terminal that is executed when the image illustrated in FIG. 8D is displayed (sixth embodiment)

FIG. 18 is a schematic flowchart illustrating processing of the communication terminal 100 that is executed when the image illustrated in FIG. 8D is displayed. With reference to FIGS. 7, 8C to 8E, 14, 15D, 16A, 17, and 18, a description will be given of the processing of the communication terminal 100.

Upon the start of step S545 described above with reference to FIG. 17, step S605 is executed. In step S605, the touch panel display 160 judges whether or not the user has pressed the icon button IB13 (see FIG. 8D). If the user has pressed the icon button IB13, step S610 is executed. Otherwise, step S615 is executed.

In step S610, the display 161 displays the image illustrated in FIG. 8C. After that, the user executes a certain operation in accordance with the flowchart described above with reference to FIG. 17.

In step S615, the touch panel display 160 judges whether or not the user has pressed the icon button IB10 (see FIG. 8D). If the user wants to change the setting of the operation mode described above with reference to FIG. 16A, the user presses the icon button IB10. After that, step S620 is executed. Otherwise, step S625 is executed.

In step S620, the display 161 displays the image illustrated in FIG. 16A. After that, the user changes the setting of the operation mode on the image illustrated in FIG. 16A.

In step S625, the touch panel display 160 judges whether or not the user has pressed the icon button IB11 (see FIG. 8D). If the user wants to perform the processing of registering a target appliance to be operated, which has been described above in relation to the third embodiment, the user presses the icon button IB11. After, that, step S630 is executed. Otherwise, step S635 is executed.

In step S630, the display 161 displays the image illustrated in FIG. 8E. If the user presses the icon button IB14, the user is able to perform the processing of registering a target appliance to be operated, which has been described above in relation to the third embodiment, in order to perform on-recommend processing. If the user presses the icon button IB15, the user is able to execute registration processing for off-recommend processing.

In step S635, the touch panel display 160 judges whether or not the user has pressed the icon button IB12 (see FIG. 8D). If the user wants to check the operation status of the air conditioner, the user presses the icon button IB12. After that, step S640 is executed. Otherwise, step S605 is executed.

In step S640, the touch panel display 160 generates a notification signal indicating that the user has pressed the icon button IB12. The notification signal is output from the touch panel display 160 to the CPU 110. In response to the notification signal, the CPU 110 generates a request signal for requesting notification of the operation status. The request signal is output from the CPU 110 to the data communication device 130. After that, the request signal is transmitted from the data communication device 130 to the air conditioner group ACG via the server apparatus 300. After that, step S645 is executed.

In step S645, if the air conditioner appropriately receives the request signal, the air conditioner generates operation data. After that, as described above with reference to FIG. 14, the operation data is transmitted to the communication terminal 100 via the server apparatus 300. In this case, the data communication device 130 notifies the CPU 110 of the receipt of the operation data. After that, step S650 is executed. If the air conditioner does not appropriately receive the request signal, or if the operation data is not appropriately transmitted, step S655 is executed.

In step S650, the CPU 110 causes the display 161 to display the image illustrated in FIG. 15D. As a result, the user is able to visually check the operation status of the air conditioner.

In step S655, the CPU 110 causes the display 161 to display an error image indicating that communication of the operation data has failed. After that, step S605 is executed.

Figure 19:
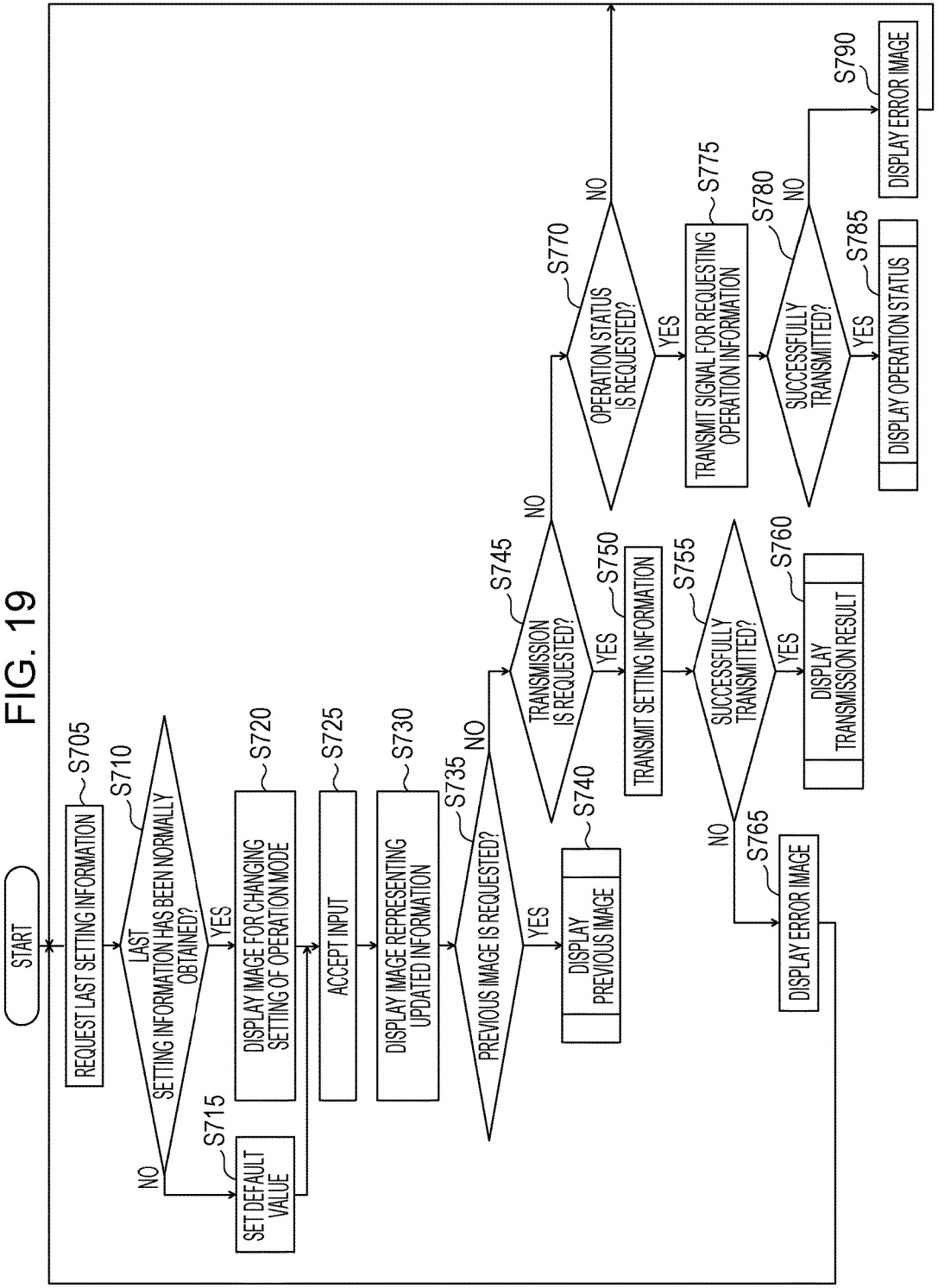
FIG. 19 is a schematic flowchart illustrating processing of the communication terminal that is executed when the image illustrated in FIG. 16A is displayed (sixth embodiment)

FIG. 19 is a schematic flowchart illustrating processing of the communication terminal 100 that is executed when the image illustrated in FIG. 16A is displayed. With reference to FIGS. 7, 8D, 14, 15D, 16A, 16B, 18, and 19, a description will be given of the processing of the communication terminal 100.

Upon the start of step S620 described above with reference to FIG. 18, step S705 is executed. In step S705, the CPU 110 requests, to the memory 140, the information that is set the last time for the operation mode. After that, step S710 is executed.

In step S710, if the memory 140 does not store the information that is set the last time for the operation mode, step S715 is executed. If the memory 140 stores the information that is set the last time for the operation mode, the CPU 110 is able to obtain the information that is set the last time for the operation mode. After that, step S720 is executed.

In step S715, the CPU 110 sets a default value. The CPU 110 generates image data using the default value. The image data is output from the CPU 110 to the touch panel display 160. The touch panel display 160 displays the image illustrated in FIG. 16A on the display 161. In this case, the image expressed by the default value is displayed on the display window WD05. After that, step S720 is executed.

In step S720, the CPU 110 causes the display 161 to display the image illustrated in FIG. 16A. In this case, the image generated based on the information that is set the last time for the operation mode is displayed on the display window WD05.

In step S725, the user operates the first icon column FIC and/or the second icon column SIC, so as to change the setting of the operation mode. After that, step S730 is executed.

In step S730, the display 161 displays the updated setting of the operation mode. After that, step S735 is executed.

In step S735, the touch panel display 160 judges whether or not the user has pressed the icon button IB35. If the user has pressed the icon button IB35, step S740 is executed. Otherwise, step S745 is executed.

In step S740, the display 161 displays the image illustrated in FIG. 8D. After that, the user performs a certain operation in accordance with the flowchart described above with reference to FIG. 18.

In step S745, the touch panel display 160 judges whether or not the user has pressed the icon button IB33. If the user has pressed the icon button IB33, step S750 is executed. Otherwise, step S770 is executed.

In step S750, the CPU 110 transmits, from the data communication device 130, the information set by the user using the touch panel display 160. After that, step S755 is executed.

In step S755, if the air conditioner receives, from the data communication device 130, the information set by the user using the touch panel display 160, the air conditioner generates notification data indicating that the information has been appropriately transmitted. The notification data is transmitted from the air conditioner group ACG to the communication terminal 100 via the server apparatus 300. If the data communication device 130 receives the notification data, the CPU 110 judges that the communication of the information set by the user using the touch panel display 160 has succeeded. In this case, step S760 is executed. Otherwise, step S765 is executed.

In step S760, the CPU 110 causes the display 161 to display the image illustrated in FIG. 16B. The user performs a certain operation on the image illustrated in FIG. 16B.

In step S765, the CPU 110 causes the display 161 to display an error image indicating that the communication of the information set by the user using the touch panel display 160 has failed. After that, step S705 is executed.

In step S770, the touch panel display 160 judges whether or not the user has pressed the icon button IB34 (see FIG. 16A). If the user has pressed the icon button IB34, step S775 is executed. Otherwise, step S705 is executed.

In step S775, the CPU 110 generates a request signal for requesting operation information. The request signal is output from the CPU 110 to the data communication device 130. The data communication device 130 transmits the request signal. After that, step S780 is executed.

In step S780, if the air conditioner receives the request signal from the data communication device 130, the air conditioner generates operation data representing the operation status. As described above with reference to FIG. 14, the operation data is transmitted from the air conditioner group ACG to the communication terminal 100 via the server apparatus 300. If the data communication device 130 receives the operation data, the CPU 110 judges that communication of the request signal has succeeded. In this case, step S785 is executed. Otherwise, step S790 is executed.

In step S785, the CPU 110 causes the display 161 to display the image illustrated in FIG. 15D. The user performs a certain operation on the image illustrated in FIG. 15D.

In step S790, the CPU 110 causes the display 161 to display an error image indicating that the operation status request processing has failed. After that, step S705 is executed.

Figure 20:
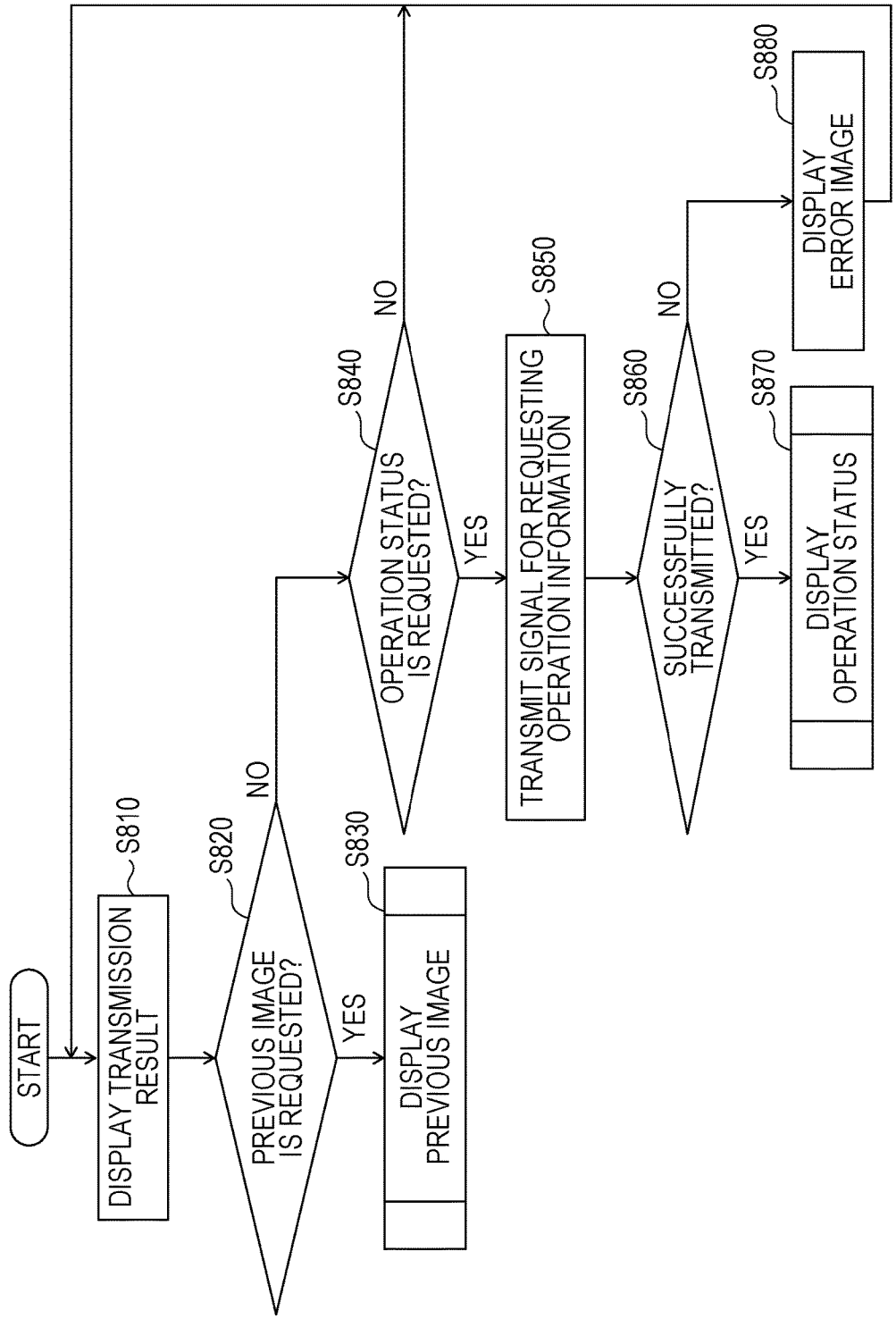
FIG. 20 is a schematic flowchart illustrating processing of the communication terminal that is executed when the image illustrated in FIG. 16B is displayed (sixth embodiment)

FIG. 20 is a schematic flowchart illustrating processing of the communication terminal 100 that is executed when the image illustrated in FIG. 16B is displayed. With reference to FIGS. 7, 14, 15D, 16A, 16B, 19, and 20, a description will be given of the processing of the communication terminal 100.

Upon the start of step S760 described above with reference to FIG. 19, step S810 is executed. In step S810, the display 161 displays the image illustrated in FIG. 16B. After that, step S820 is executed.

In step S820, the touch panel display 160 judges whether or not the user has pressed the icon button IB37 (see FIG. 16B). If the user has pressed the icon button IB37, step S830 is executed. Otherwise, step S840 is executed.

In step S830, the display 161 displays the image illustrated in FIG. 16A. After that, the user performs a certain operation in accordance with the flowchart described above with reference to FIG. 19.

In step S840, the touch panel display 160 judges whether or not the user has pressed the icon button IB36. If the user has pressed the icon button IB36, step S850 is executed. Otherwise, step S810 is executed.

In step S850, the CPU 110 generates a request signal for requesting operation information. The request signal is output from the CPU 110 to the data communication device 130. The data communication device 130 transmits the request signal. After that, step S860 is executed.

In step S860, if the air conditioner receives the request signal from the data communication device 130, the air conditioner generates operation data representing the operation status. As described above with reference to FIG. 14, the operation data is transmitted from the air conditioner group ACG to the communication terminal 100 via the server apparatus 300. If the data communication device 130 receives the operation data, the CPU 110 judges that communication of the request signal has succeeded. In this case, step S870 is executed. Otherwise, step S880 is executed.

In step S870, the CPU 110 causes the display 161 to display the image illustrated in FIG. 15D. The user performs a certain operation on the image illustrated in FIG. 15D.

In step S880, the CPU 110 causes the display 161 to display an error image indicating that the operation status request processing has failed. After that, step S810 is executed.

FIG. 21 is a schematic flowchart illustrating processing of the communication terminal 100 that is executed when the image illustrated in FIG. 15D is displayed. With reference to FIGS. 7, 8D, 15B to 16B, and 21, a description will be given of the processing of the communication terminal 100.

When the icon button IB12 illustrated in FIG. 8D, the icon button IB29 illustrated in FIG. 15B, the icon button IB31 illustrated in FIG. 15C, the icon button IB34 illustrated in FIG. 16A, or the icon button IB36 illustrated in FIG. 16B is pressed by the user, step S910 is executed. In step S910, the display 161 displays the image illustrated in FIG. 15D. After that, step S920 is executed.

In step S920, the touch panel display 160 judges whether or not the user has pressed the icon button IB37. If the user has pressed the icon button IB37, step S930 is executed. Otherwise, step S910 is executed.

In step S930, the display 161 displays one of the images illustrated in FIGS. 8D, 15B, 15C, 16A, and 16B. After that, the user performs a certain operation on the displayed image.

Seventh Embodiment

The application program described above in relation to the third embodiment requires processing for authenticating the user every time the user starts the application program. The user may find it inconvenient to perform an input operation for authentication processing. In a seventh embodiment, a description will be given of an application program that allows the user to omit an input operation for authentication processing.

Figure 22A:
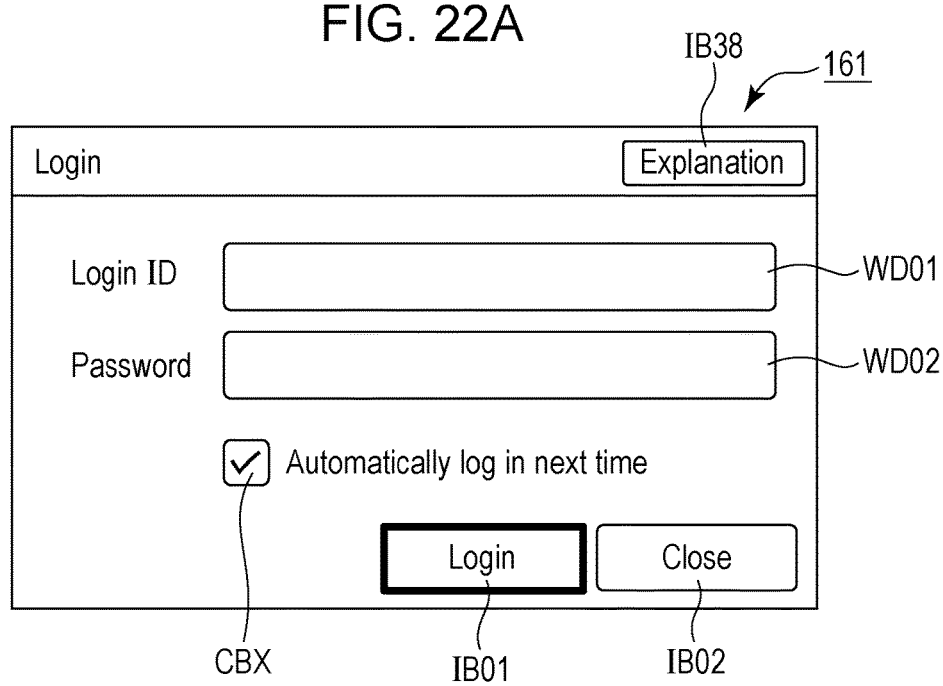
FIG. 22A illustrates an exemplary image that is displayed on a display when the user uses an application program (seventh embodiment)
Figure 22B:
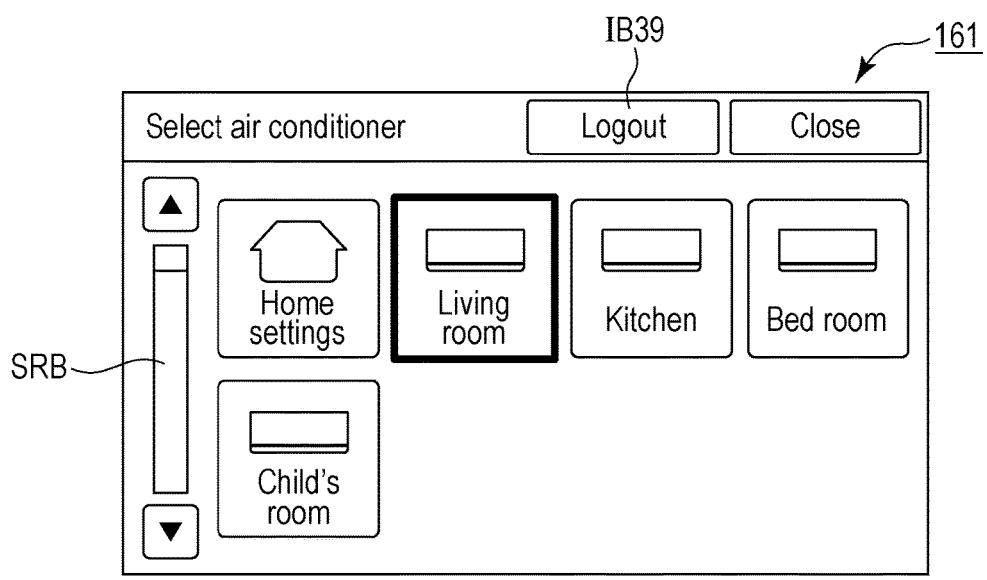
FIG. 22B illustrates an exemplary image that is displayed on the display when the user uses the application program (seventh embodiment)

FIGS. 22A and 22B illustrate exemplary images that are displayed on the display 161 when the user uses the application program. With reference to FIGS. 7 to 8C, 22A, and 22B, a description will be given of the application program.

When the user double-clicks the icon ICN in the image illustrated in FIG. 8A, the display 161 displays the image illustrated in FIG. 22A. Like the image illustrated in FIG. 8B, the image illustrated in FIG. 22A includes the input windows WD01 and WD02 and the icon buttons IB01 and IB02.

The image illustrated in FIG. 22A includes an icon button IB38 and a check box CBX. When the user presses the icon button IB38, the display 161 displays an explanation about an operation to be performed on the image illustrated in FIG. 22A. Thus, the user is able to easily use the application program. If the user checks the check box CBX, the user is able to display the image illustrated in FIG. 22B on the display 161 without displaying the image illustrated in FIG. 22A in the subsequent use. That is, the display 161 is able to directly change the image displayed thereon from the image illustrated in FIG. 8A to the image illustrated in FIG. 22B.

The image illustrated in FIG. 22B includes, in addition to the icon buttons in the image illustrated in FIG. 8C, a scroll bar SRB and an icon button IB39 used by the user to log out. If the user owns many air conditioners, the user is able to display icon buttons representing target air conditioners on the display 161 by operating the scroll bar SRB. The user is able to end the application program by pressing the icon button IB39.

Eighth Embodiment

Different from change of a setting for an operation mode of an air conditioner and checking of an operation status of an air conditioner, the setting of an air conditioner (the setting for specifying a candidate appliance to be operated) described above in relation to the third embodiment is not frequently performed. Thus, an application program may be designed so that the user visually recognizes that an icon button used for a setting to specify a candidate appliance to be operated belongs to a category that is different from a category including an icon button used to change the setting for an operation mode of an air conditioner and an icon button used to check an operation status. In an eighth embodiment, a description will be given of an application program that allows the user to visually recognize that an icon button used for a setting to specify a candidate appliance to be operated belongs to a category that is different from a category including an icon button used to change the setting for an operation mode of an air conditioner and an icon button used to check an operation status.

Figure 23:
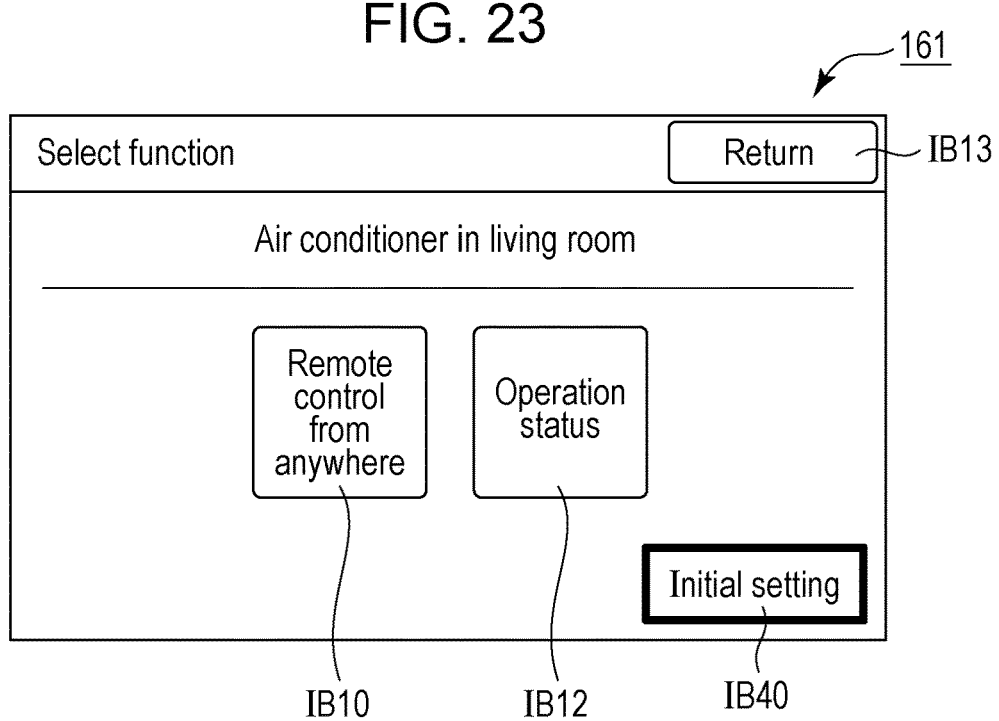
FIG. 23 illustrates an exemplary image that is displayed on the display when the user uses an application program (eighth embodiment)

FIG. 23 illustrates an exemplary image that is displayed on the display 161 when the user uses the application program. With reference to FIGS. 7, 8D, 8E, and 23, a description will be given of the application program.

Like the image illustrated in FIG. 8D, the image illustrated in FIG. 23 includes the icon buttons IB10, IB12, and IB13. The image illustrated in FIG. 23 includes an icon button IB40 instead of the icon button IB11 in the image illustrated in FIG. 8D. The icon button IB40 is displayed below the icon buttons IB10 and IB12. In addition, the icon button IB40 is different from the icon buttons IB10 and IB12 in shape and size. The characters "initial setting" are written on the icon button IB40, and thus the user is able to visually recognize that the icon button IB40 need not be frequently used. When the user presses the icon button IB40, the display 161 displays the image illustrated in FIG. 8E.

Ninth Embodiment

An application program may be designed so that the user is able to make a setting of a candidate appliance to be operated and to cancel the setting on one screen. In a ninth embodiment, a description will be given of an application program that allows the user to make a setting of a candidate appliance to be operated and to cancel the setting on one screen.

Figure 24:
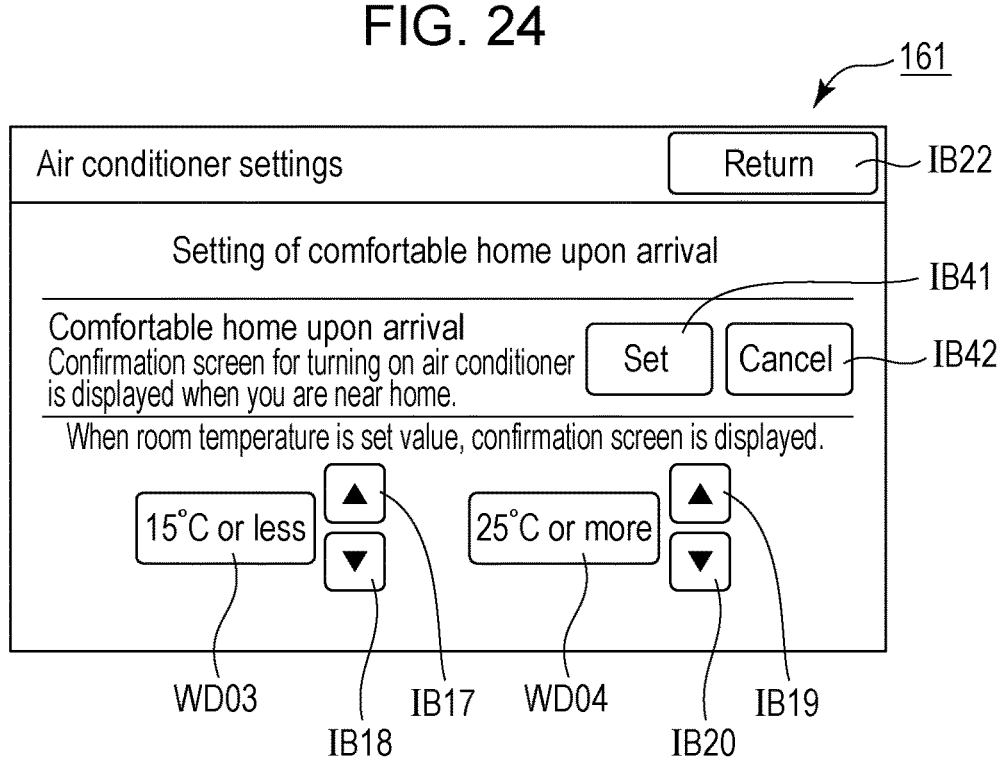
FIG. 24 illustrates an exemplary image that is displayed on the display when the user uses an application program (ninth embodiment)

FIG. 24 illustrates an exemplary image that is displayed on the display 161 when the user uses the application program. With reference to FIGS. 7, 8F, 11, and 24, a description will be given of the application program.

Like the image illustrated in FIG. 8F, the image illustrated in FIG. 24 includes the display windows WD03 and WD04 and the icon buttons IB17, IB18, IB19, IB20, and IB22. The image illustrated in FIG. 24 includes icon buttons IB41 and IB42 instead of the icon button IB21 in the image illustrated in FIG. 8F. When the user presses the icon button IB41, the target air conditioner is registered as a candidate appliance to be operated. Data indicating that the target air conditioner has been registered as a candidate appliance to be operated is stored in the memory 140. When the user presses the icon button IB42, the registration of the target air conditioner as a candidate appliance to be operated is cancelled. In this case, the data stored in the memory 140 (see FIG. 11) is updated so that the registration of the target air conditioner as a candidate appliance to be operated is erased.

Tenth Embodiment

As described above in relation to the fourth embodiment, the user is able to register the position of a target building by using the application program. The application program may allow the user to set a control region around the position of the target building, as well as the position of the target building. In a tenth embodiment, a description will be given of an application program that allows the user to set a control region, as well as the position of the target building.

Figure 25:
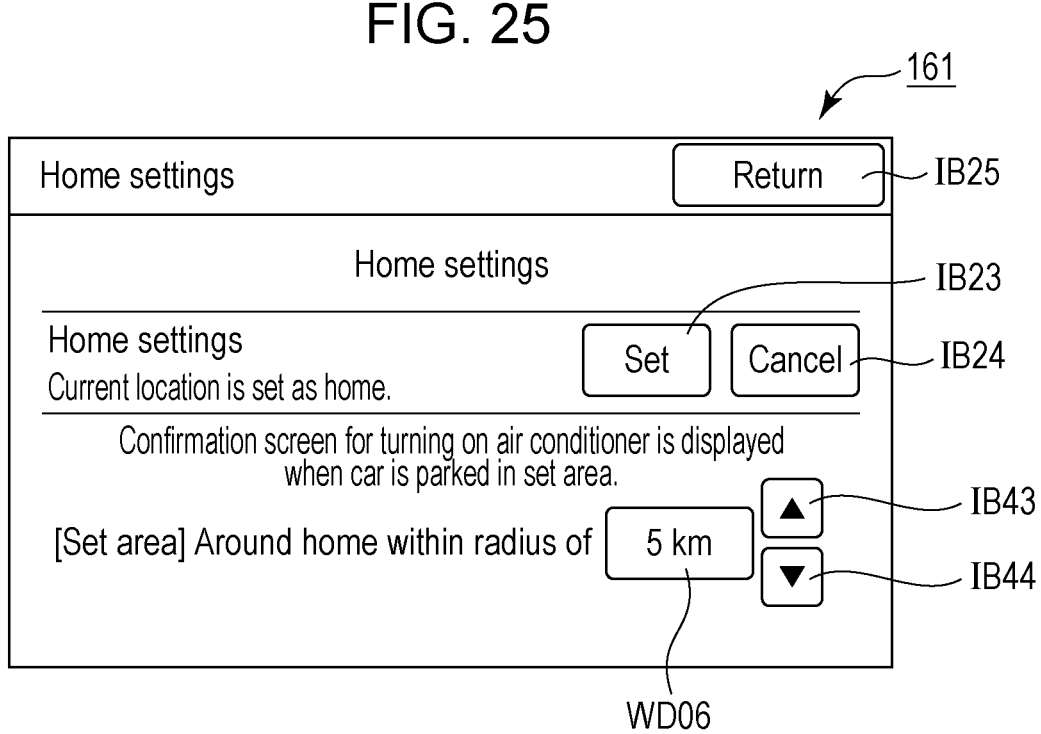
FIG. 25 illustrates an exemplary image that is displayed on the display when the user uses an application program (tenth embodiment)

FIG. 25 illustrates an exemplary image that is displayed on the display 161 when the user uses the application program. With reference to FIGS. 3A, 7, 12, and 25, a description will be given of the application program.

Like the image illustrated in FIG. 12, the image illustrated in FIG. 25 includes the icon buttons IB23, IB24, and IB25. The image illustrated in FIG. 25 further includes icon buttons IB43 and IB44 and a display window WD06.

The user is able to set a circular control region CR around the position of the building HM by operating the icon buttons IB43 and IB44. The radius of the control region CR is displayed on the display window WD06.

After that, when the user presses the icon button IB23, information representing the position of the building HM and information representing the circular control region CR around the building HM are stored in the memory 140. When the user presses the icon button IB24, the information representing the position of the building HM and the information representing the circular control region CR around the building HM are erased from the memory 140.

Eleventh Embodiment

The communication terminal described above in relation to the fifth embodiment displays only once an image for asking the user whether or not to execute a remote operation. If the communication terminal asks the user a plurality of times whether or not to execute a remote operation, a remote operation against user's intention is less likely to occur. In an eleventh embodiment, a description will be given of a communication terminal that asks the user a plurality of times whether or not to execute a remote operation.

FIGS. 26A to 26D illustrate exemplary images that are presented to the user by the communication terminal 100. With reference to FIGS. 1, 14, 15B, and 26A to 26D, a description will be given of the communication terminal 100.

Figure 26A:
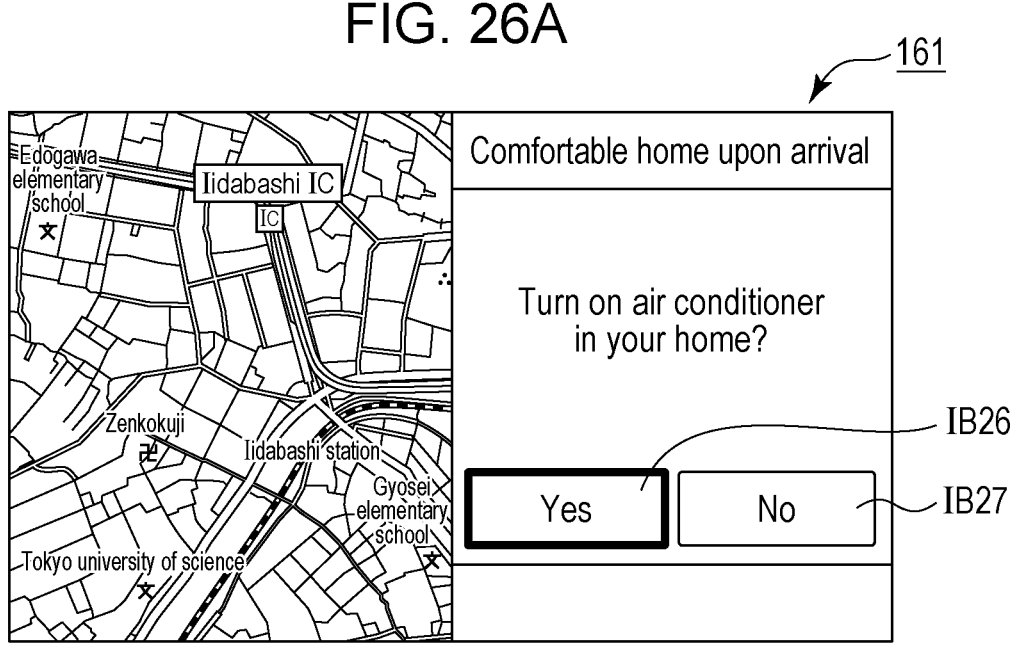
FIG. 26A illustrates an exemplary image that is presented to the user by the communication terminal illustrated in FIG. 7 (eleventh embodiment)

As in the fifth embodiment, the communication terminal 100 presents the image illustrated in FIG. 26A to the user. When the user presses the icon button IB26, the communication terminal 100 presents the image illustrated in FIG. 26B to the user.

Figure 26B:
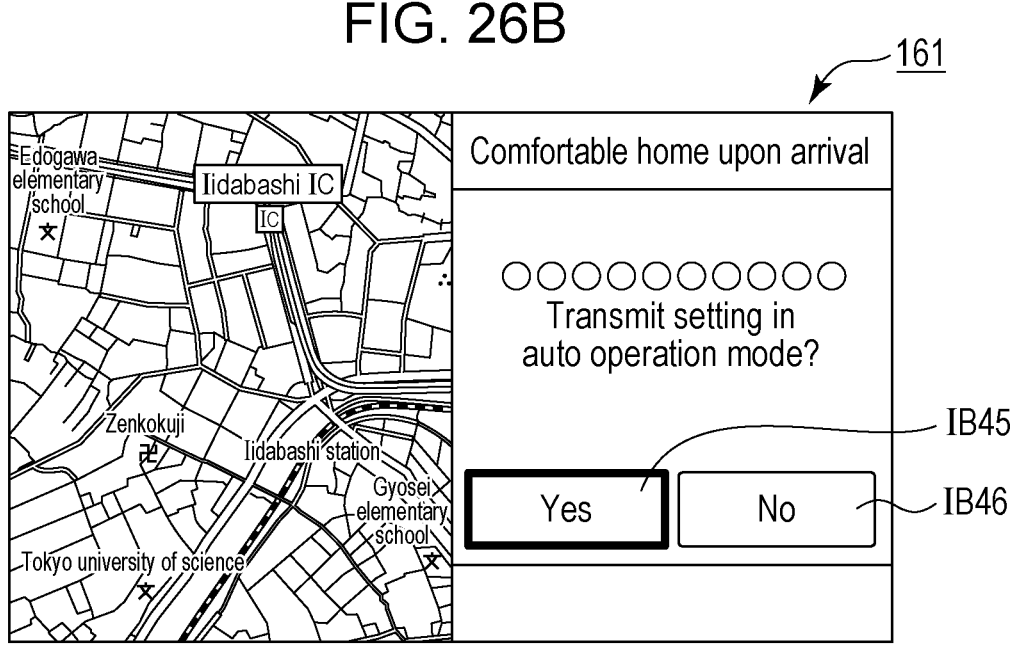
FIG. 26B illustrates an exemplary image that is presented to the user by the communication terminal illustrated in FIG. 7 (eleventh embodiment)

The image illustrated in FIG. 26B includes two icon buttons IB45 and IB46. When the user presses the icon button IB45, the communication terminal 100 transmits control data. When the user presses the icon button IB46, the communication terminal 100 suspends processing. The control data is transmitted only when the user presses the icon button IB26 in the image illustrated in FIG. 26A and then presses the icon button IB45 in the image illustrated in FIG. 26B. Thus, a remote operation against user's intention is less likely to occur.

Figure 26C:
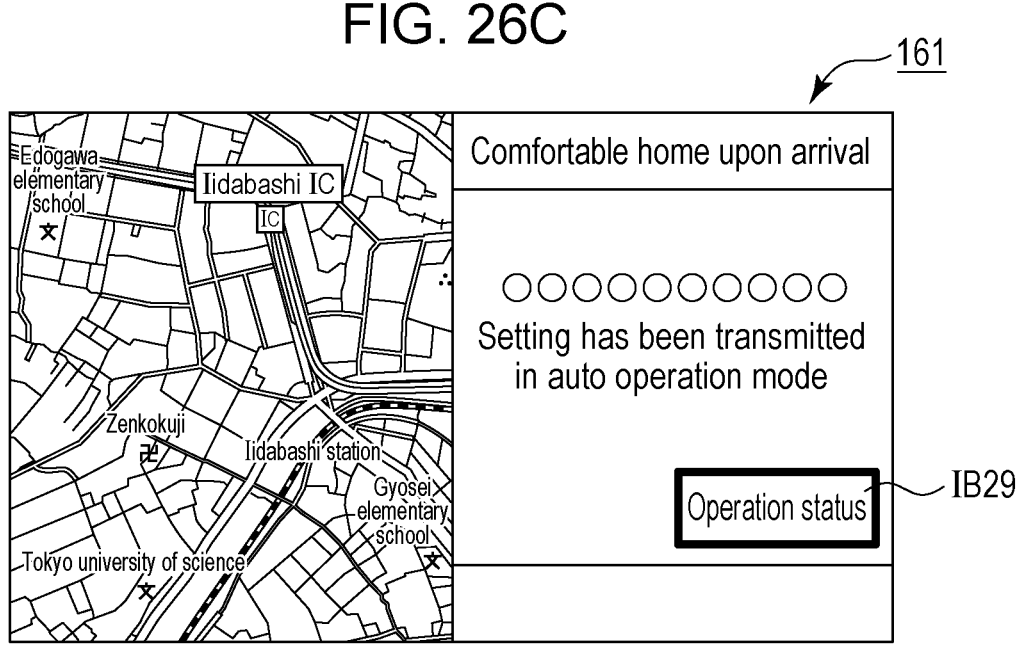
FIG. 26C illustrates an exemplary image that is presented to the user by the communication terminal illustrated in FIG. 7 (eleventh embodiment)

When the communication terminal 100 receives notification data representing the receipt of the control data for an air conditioner, the communication terminal 100 presents the image illustrated in FIG. 26C to the user. Like the image illustrated in FIG. 15B, the image illustrated in FIG. 26C includes the icon button IB29. Unlike in the image illustrated in FIG. 15B, the icon button IB28 is not provided in the image illustrated in FIG. 26B.

Figure 26D:
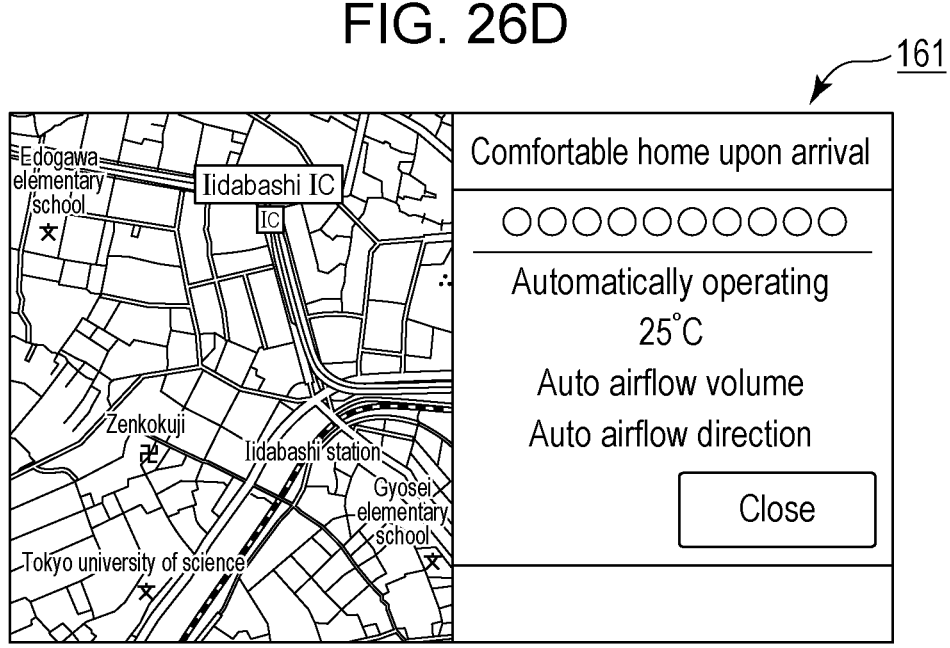
FIG. 26D illustrates an exemplary image that is presented to the user by the communication terminal illustrated in FIG. 7 (eleventh embodiment)

When the user presses the icon button IB29, the communication terminal 100 presents the image illustrated in FIG. 26D to the user. Even if the user does not press the icon button IB29, the communication terminal 100 presents the image illustrated in FIG. 26D to the user after a certain period has elapsed from the time when the image illustrated in FIG. 26C is displayed. Thus, the user is able to check the operation status of the target air conditioner.

Twelfth Embodiment

A designer is able to design a communication terminal having various functions on the basis of the design principle of the communication terminal described above in relation to the second embodiment. In a twelfth embodiment, a description will be given of an exemplary communication terminal.

Figure 27:
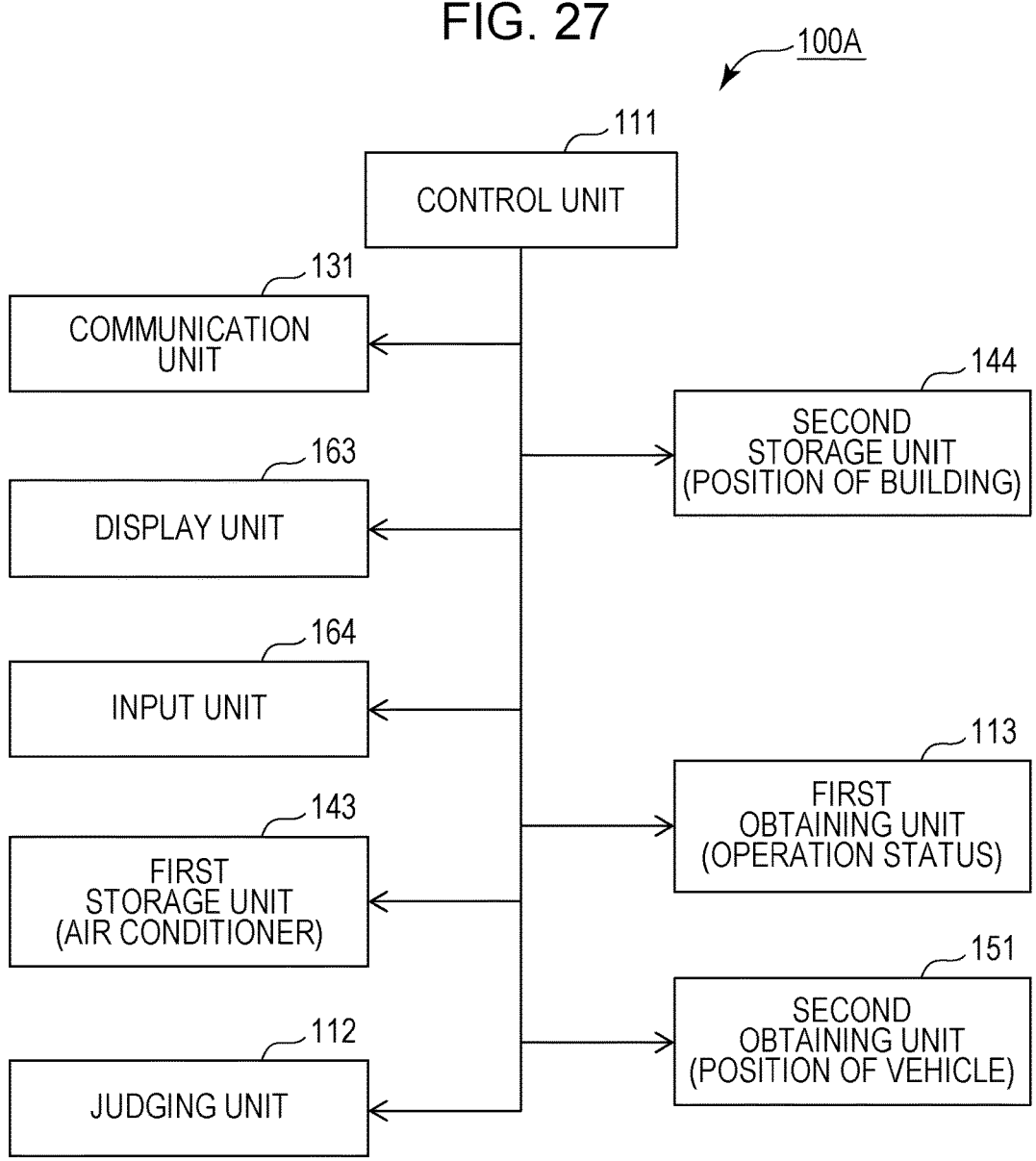
FIG. 27 is a schematic block diagram illustrating an exemplary functional configuration of a communication terminal (twelfth embodiment)

FIG. 27 is a schematic block diagram illustrating an exemplary functional configuration of a communication terminal 100A according to the twelfth embodiment. With reference to FIGS. 7, 11, 14, and 27, a description will be given of the exemplary functional configuration of the communication terminal 100A.

The communication terminal 100A includes a control unit 111, a judging unit 112, a first obtaining unit 113, a communication unit 131, a first storage unit 143, a second storage unit 144, a second obtaining unit 151, a display unit 163, and an input unit 164. The control unit 111 controls the overall operation of the communication terminal 100A.

Thus, the judging unit 112, the first obtaining unit 113, the communication unit 131, the first storage unit 143, the second storage unit 144, the second obtaining unit 151, the display unit 163, and the input unit 164 execute certain operations under the control executed by the control unit 111.

The control unit 111, the judging unit 112, and the first obtaining unit 113 correspond to the CPU 110 described above with reference to FIG. 7. The judging unit 112 executes judgment processing executed by the CPU 110. The first obtaining unit 113 generates a request signal for requesting an operation status to an air conditioner.

The communication unit 131 corresponds to the data communication device 130 described above with reference to FIG. 7. The communication unit 131 transmits various signals (for example, the request signal generated by the first obtaining unit 113) to the server apparatus 300 described above with reference to FIG. 14. In addition, the communication unit 131 receives various signals (for example, operation data generated in response to the request signal) from the server apparatus 300.

The first storage unit 143 and the second storage unit 144 correspond to the memory 140 described above with reference to FIG. 7. The first storage unit 143 stores the data described above with reference to FIG. 11. The second storage unit 144 stores information about the position of the building HM set by the user by using the method described above in relation to the fourth embodiment.

The second obtaining unit 151 corresponds to the information obtaining device 150 described above with reference to FIG. 7. The second obtaining unit 151 obtains information about the position of a vehicle. The second obtaining unit 151 may be a GPS device of a car navigation system that is typically mounted in a vehicle. The principle of this embodiment is not limited by a specific device used as the second obtaining unit 151.

The display unit 163 and the input unit 164 correspond to the touch panel display 160 described above with reference to FIG. 7. The display unit 163 corresponds to the display 161 described above with reference to FIG. 7. The display unit 163 may be a display of a car navigation system. Alternatively, the display unit 163 may be a display of a smartphone or another mobile terminal. The principle of this embodiment is not limited by a specific device used as the display unit 163.

The input unit 164 may be integrated with the display unit 163. In this case, the input unit 164 corresponds to the operation detection sensor 162. Alternatively, the input unit 164 may be a device separated from the display unit 163. Thus, the input unit 164 may be a keyboard, a mouse device, or another input device. The principle of this embodiment is not limited by a specific device used as the input unit 164.

Thirteenth Embodiment

As described above in relation to the fifth embodiment, the communication terminal transmits various signals to and receives various signals from the server apparatus. In a thirteenth embodiment, a description will be given of an exemplary server apparatus.

Figure 28:
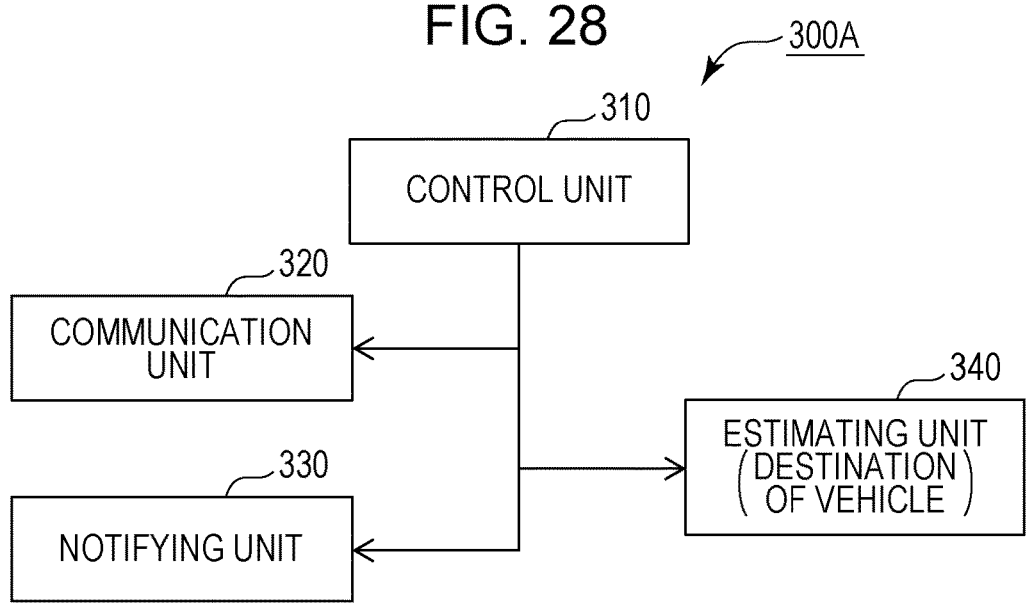
FIG. 28 is a schematic block diagram illustrating an exemplary functional configuration of a server apparatus (thirteenth embodiment)

FIG. 28 is a schematic block diagram illustrating an exemplary functional configuration of a server apparatus 300A according to the thirteenth embodiment. With reference to FIGS. 1, 3A, 3B, 14, 15A, 27, and 28, a description will be given of the exemplary functional configuration of the server apparatus 300A.

The server apparatus 300A is available as the server apparatus 300 described above with reference to FIG. 14. The server apparatus 300A is designed to transmit various signals to and receive various signals from the communication terminal 100A described above with reference to FIG. 27.

The server apparatus 300A includes a control unit 310, a communication unit 320, a notifying unit 330, and an estimating unit 340. The control unit 310 controls the overall operation of the server apparatus 300A. Thus, the communication unit 320, the notifying unit 330, and the estimating unit 340 execute certain operations under the control executed by the control unit 310.

The communication unit 320 of the server apparatus 300A receives control data from the communication unit 131 of the communication terminal 100A. The communication unit 320 transmits the control data to the air conditioner group ACG. The air conditioners in the air conditioner group ACG that have received the control data generate notification data representing the receipt of the control data. The notification data representing the receipt of the control data is transmitted from the air conditioners in the air conditioner group ACG to the communication unit 320 of the server apparatus 300A. The communication unit 320 of the server apparatus 300A transmits the notification data representing the receipt of the control data to the communication unit 131 of the communication terminal 100A.

After the control data has been transmitted to the air conditioner group ACG, if the communication unit 320 of the server apparatus 300A does not receive notification data representing the receipt of the control data for a certain period, the control unit 310 causes the notifying unit 330 to generate notification data. The notification data generated by the control unit 310 indicates that communication of the control data has failed. The notification data is output from the notifying unit 330 of the server apparatus 300A to the communication unit 320 of the server apparatus 300A. The communication unit 320 of the server apparatus 300A transmits the notification data to the communication unit 131 of the communication terminal 100A.

The control unit 111 of the communication terminal 100A reads information about the position of the building HM from the second storage unit 144. The information about the position of the building HM is output from the control unit 111 of the communication terminal 100A to the communication unit 131. The information about the position of the building HM is then transmitted from the communication unit 131 of the communication terminal 100A to the communication unit 320 of the server apparatus 300A. The information about the position of the building HM is output from the communication unit 320 of the server apparatus 300A to the estimating unit 340. Accordingly, the estimating unit 340 is able to obtain the information about the position of the building HM.

The second obtaining unit 151 of the communication terminal 100A generates position data representing the position of the vehicle VC. The position data is output from the second obtaining unit 151 to the communication unit 131 of the communication terminal 100A. The communication unit 131 of the communication terminal 100A transmits the position data to the communication unit 320 of the server apparatus 300A. The position data is then output from the communication unit 320 of the server apparatus 300A to the estimating unit 340. Accordingly, the estimating unit 340 is able to obtain the information about the position of the vehicle VC, as well as the information about the position of the building HM and the information about the control region CR.

The estimating unit 340 is able to determine, by using the information about the position of the building HM and the information about the position of the vehicle VC, whether the vehicle VC is running away from or approaching the building HM. If the vehicle VC is running away from the building HM, the estimating unit 340 is able to estimate that the destination of the vehicle VC is not the building HM. If the vehicle VC is approaching the building HM, the estimating unit 340 is able to estimate that the destination of the vehicle VC is the building HM. A trigger signal is output from the estimating unit 340 to the communication unit 320 of the server apparatus 300A.

The communication unit 320 of the server apparatus 300A transmits the trigger signal to the communication unit 131 of the communication terminal 100A. After the communication unit 131 of the communication terminal 100A has received the trigger signal, the control unit 111 of the communication terminal 100A causes the display unit 163 to display the image illustrated in FIG. 15A. That is, the communication terminal 100A switches the processing described above with reference to FIG. 1 from step S120 to step S130 in response to the trigger signal.

Fourteenth Embodiment

As described above in relation to the fifth embodiment, the air conditioners transmit various signals to and receive various signals from the server apparatus. In a fourteenth embodiment, a description will be given of an exemplary air conditioner.

Figure 29:
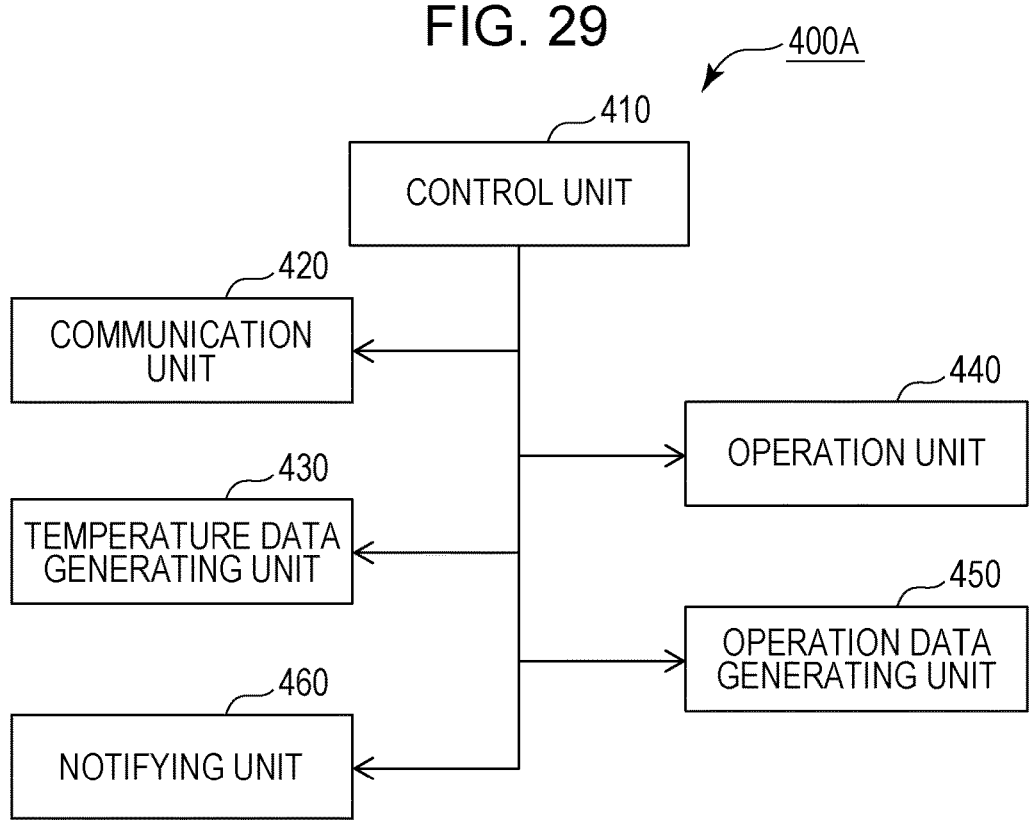
FIG. 29 is a schematic block diagram illustrating an exemplary functional configuration of an air conditioner (fourteenth embodiment)

FIG. 29 is a schematic block diagram illustrating an exemplary functional configuration of an air conditioner 400A according to the fourteenth embodiment. With reference to FIGS. 14, 28, and 29, a description will be given of the exemplary functional configuration of the air conditioner 400A.

The air conditioner 400A is available as an air conditioner in the air conditioner group ACG described above with reference to FIG. 14. The air conditioner 400A is designed to transmit various signals to and receive various signals from the server apparatus 300A described above with reference to FIG. 29.

The air conditioner 400A includes a control unit 410, a communication unit 420, a temperature data generating unit 430, an operation unit 440, an operation data generating unit 450, and a notifying unit 460. The control unit 410 controls the overall operation of the air conditioner 400A. Thus, the communication unit 420, the temperature data generating unit 430, the operation unit 440, the operation data generating unit 450, and the notifying unit 460 execute certain operations under the control executed by the control unit 410.

The communication unit 420 of the air conditioner 400A receives control data from the communication unit 320 of the server apparatus 300A. The control unit 410 causes the operation unit 440 to execute an operation defined by the control data. The operation data generating unit 450 generates operation data representing the operation status of the operation unit 440. The operation data is output from the operation data generating unit 450 to the communication unit 420 of the air conditioner 400A. The communication unit 420 of the air conditioner 400A transmits the operation data to the communication unit 320 of the server apparatus 300A.

The temperature data generating unit 430 measures a temperature around the air conditioner 400A. The temperature data generating unit 430 generates temperature data representing the measured temperature. The temperature data is also transmitted from the communication unit 420 of the air conditioner 400A to the communication unit 320 of the server apparatus 300A.

The notifying unit 460 generates notification data for making a notification that the control data has been received by the air conditioner 400A. The notification data is output from the notifying unit 460 of the air conditioner 400A to the communication unit 420 of the air conditioner 400A. The communication unit 420 of the air conditioner 400A transmits the notification data to the communication unit 320 of the server apparatus 300A.

Fifteenth Embodiment

The control region described above in relation to the first embodiment is not necessarily defined along a driving path of the vehicle. Thus, the vehicle may run along a boundary of the control region. In this case, the vehicle may enter the control region a plurality of times. If the communication terminal asks, every time the vehicle enters the control region, whether or not a remote operation is necessary, the user may find such frequent inquiries from the communication terminal irksome. In a fifteenth embodiment, a description will be given of a communication terminal that does not ask extremely frequently whether or not a remote operation is necessary.

Figure 30:
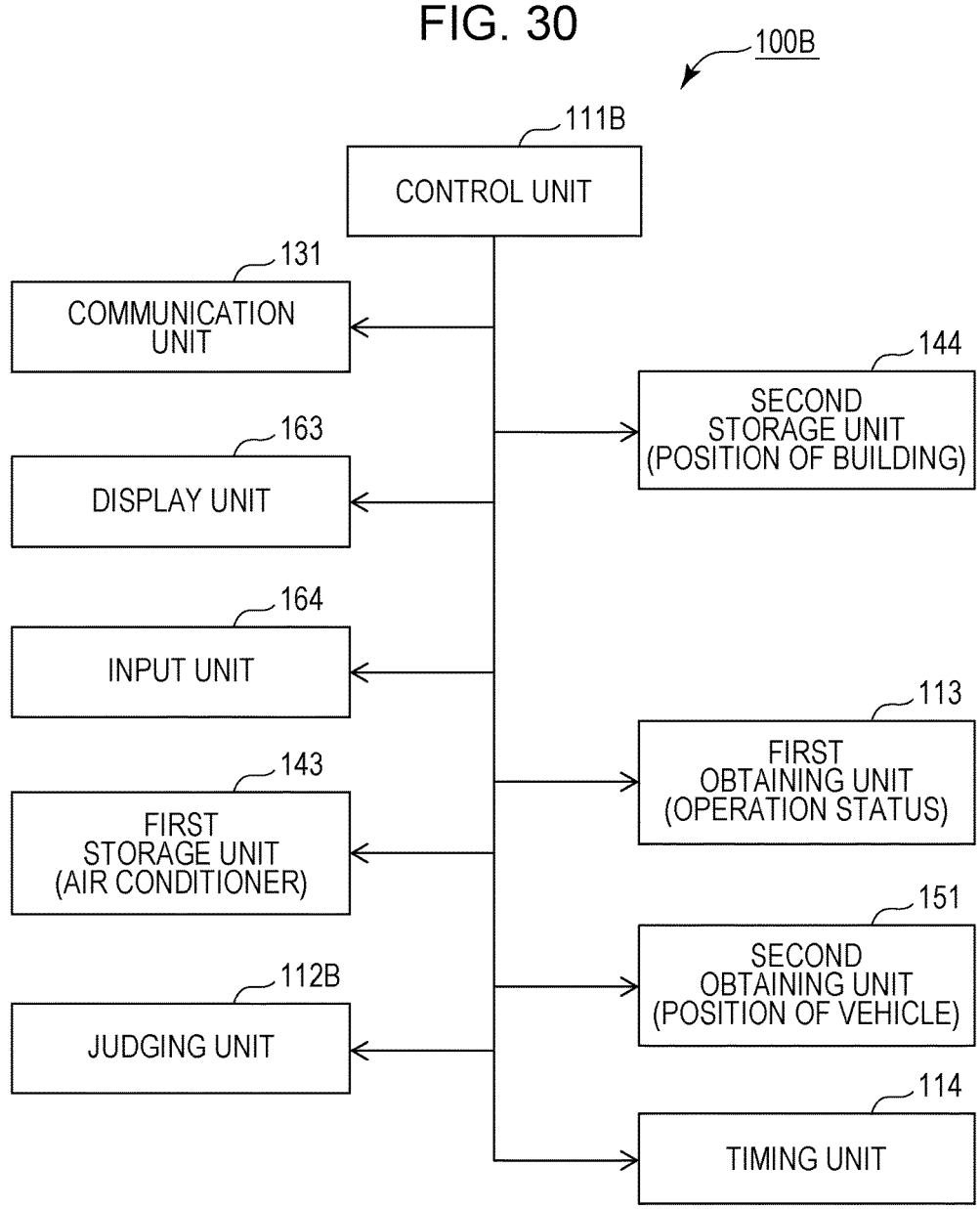
FIG. 30 is a schematic block diagram illustrating an exemplary functional configuration of a communication terminal (fifteenth embodiment)

FIG. 30 is a schematic block diagram illustrating an exemplary functional configuration of a communication terminal 100B according to the fifteenth embodiment. With reference to FIGS. 1, 7, 15A, 15D, 28, and 30, a description will be given of the exemplary functional configuration of the communication terminal 100B. In the fifteenth embodiment, the same reference numerals as those in the twelfth embodiment indicate that the elements denoted by the same reference numerals have the same functions as those in the twelfth embodiment. Thus, the description of the twelfth embodiment is applied to these elements.

As in the twelfth embodiment, the communication terminal 100B includes the first obtaining unit 113, the communication unit 131, the first storage unit 143, the second storage unit 144, the second obtaining unit 151, the display unit 163, and the input unit 164. The description of the twelfth embodiment is applied to these elements.

The communication terminal 100B further includes a control unit 111B, a judging unit 112B, and a timing unit 114. The control unit 111B and the timing unit 114 correspond to the CPU 110 described above with reference to FIG. 7.

The control unit 111B controls the overall operation of the communication terminal 100B. Thus, the judging unit 112B, the first obtaining unit 113, the timing unit 114, the communication unit 131, the first storage unit 143, the second storage unit 144, the second obtaining unit 151, the display unit 163, and the input unit 164 execute certain operations under the control executed by the control unit 111B.

The control unit 111B activates the timing unit 114 at the time when the display unit 163 displays the image illustrated in FIG. 15A. The timing unit 114 may be a timer that operates only in a certain period TP. In this embodiment, the certain period is exemplified as a threshold period.

If the timer is operating when the communication unit 131 of the communication terminal 100B receives a trigger generated by the estimating unit 340 of the server apparatus 300A, the judging unit 112B may judge that the image illustrated in FIG. 15A need not be displayed. Thus, the communication terminal 100B ends the processing without step S130 described above with reference to FIG. 1 being executed.

Figure 31:
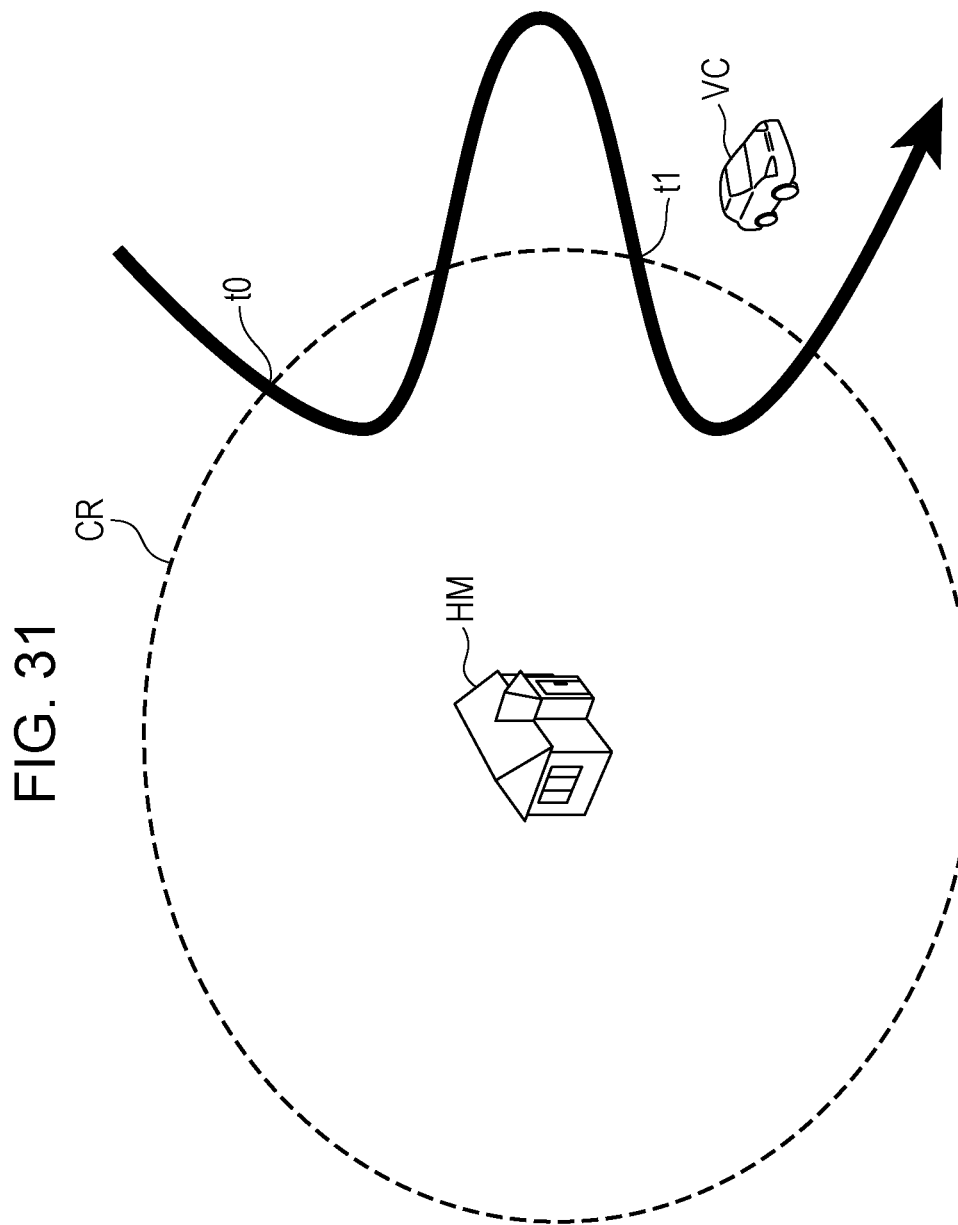
FIG. 31 is a conceptual diagram of a vehicle that runs near a boundary of a control region (fifteenth embodiment)

FIG. 31 is a conceptual diagram of the vehicle VC that runs near a boundary of the control region CR. With reference to FIGS. 15A, 30, and 31, a further description will be given of the communication terminal 100B.

The vehicle VC illustrated in FIG. 31 enters the control region CR at time t0. After that, the vehicle VC goes out of the control region CR, and enters the control region CR again at time t1. If the difference between time t1 and time t0 is under the threshold period defined by the timing unit 114, the display unit 163 does not display the image illustrated in FIG. 15A at time t1. If the difference between time t1 and time t0 exceeds the threshold period defined by the timing unit 114, the display unit 163 displays the image illustrated in FIG. 15A.

Figure 32:
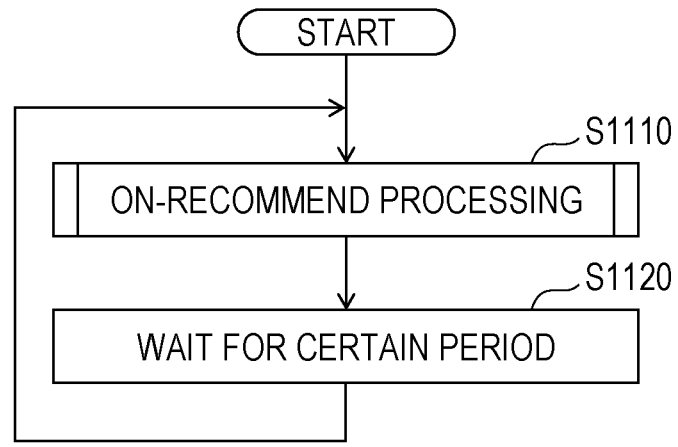
FIG. 32 is a schematic flowchart illustrating processing executed by the communication terminal illustrated in FIG. 30 (fifteenth embodiment)

FIG. 32 is a schematic flowchart illustrating processing executed by the communication terminal 100B. With reference to FIGS. 1, 30, and 32, a description will be given of the operation of the communication terminal 100B.

In step S1110, the communication terminal 100B executes the series of processing operations described above with reference to FIG. 1 (on-recommend processing). After that, step S1120 is executed.

In step S1120, the communication terminal 100B waits for a certain period. After that, step S1110 is executed.

Sixteenth Embodiment

The communication terminal described above in relation to the fifteenth embodiment is able to operate in accordance with the operation principle described above in relation to the first embodiment. In a sixteenth embodiment, a description will be given of the operation of the communication terminal.

Figure 33:
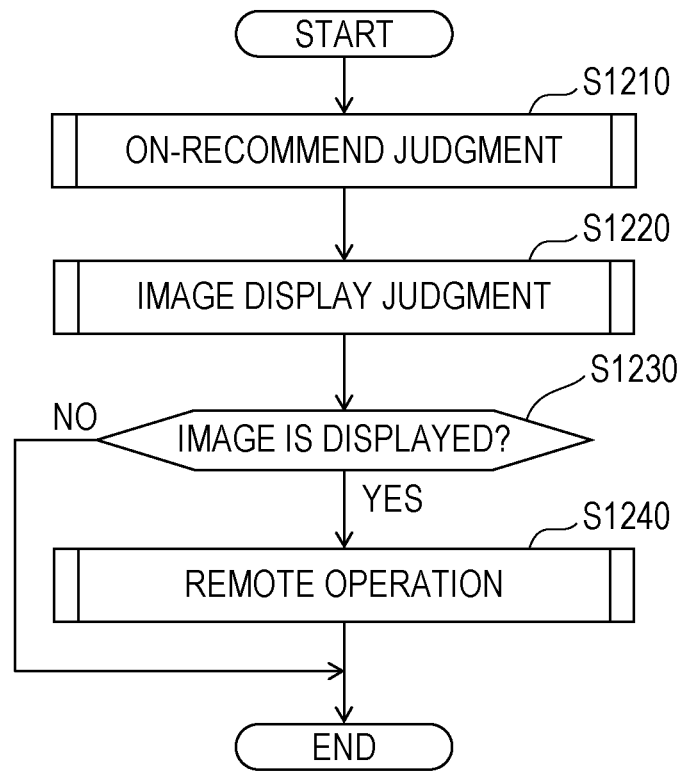
FIG. 33 is a schematic flowchart illustrating an exemplary operation of the communication terminal illustrated in FIG. 30 (sixteenth embodiment)

FIG. 33 is a schematic flowchart illustrating an exemplary operation of the communication terminal 100B. With reference to FIGS. 1, 15A, 30, and 33, a description will be given of the exemplary operation of the communication terminal 100B.

In step S1210, the communication terminal 100B executes on-recommend judgment processing. The on-recommend judgment processing corresponds to steps S110 and S120 described above with reference to FIG. 1. After the on-recommend judgment processing, step S1220 is executed.

In step S1220, the communication terminal 100B executes image display judgment processing. The image display judgment processing is executed to determine whether or not the image illustrated in FIG. 15A is to be displayed. After the image display judgment processing, step S1230 is executed.

In step S1230, if the image illustrated in FIG. 15A is displayed, step S1240 is executed. Otherwise, the communication terminal 100B ends the processing.

In step S1240, the user determines whether or not to perform a remote operation. If the user presses the icon button IB26 illustrated in FIG. 15A, the on-recommend processing ends. If the user presses the icon button IB27 illustrated in FIG. 15A, remote operation processing is executed. The remote operation processing corresponds to steps S130 to S150 described above with reference to FIG. 1.

Seventeenth Embodiment

In the on-recommend judgment processing described above in relation to the sixteenth embodiment, the communication terminal executes various processing operations in cooperation with the server apparatus. In a seventeenth embodiment, a description will be given of on-recommend judgment processing.

Figure 34:
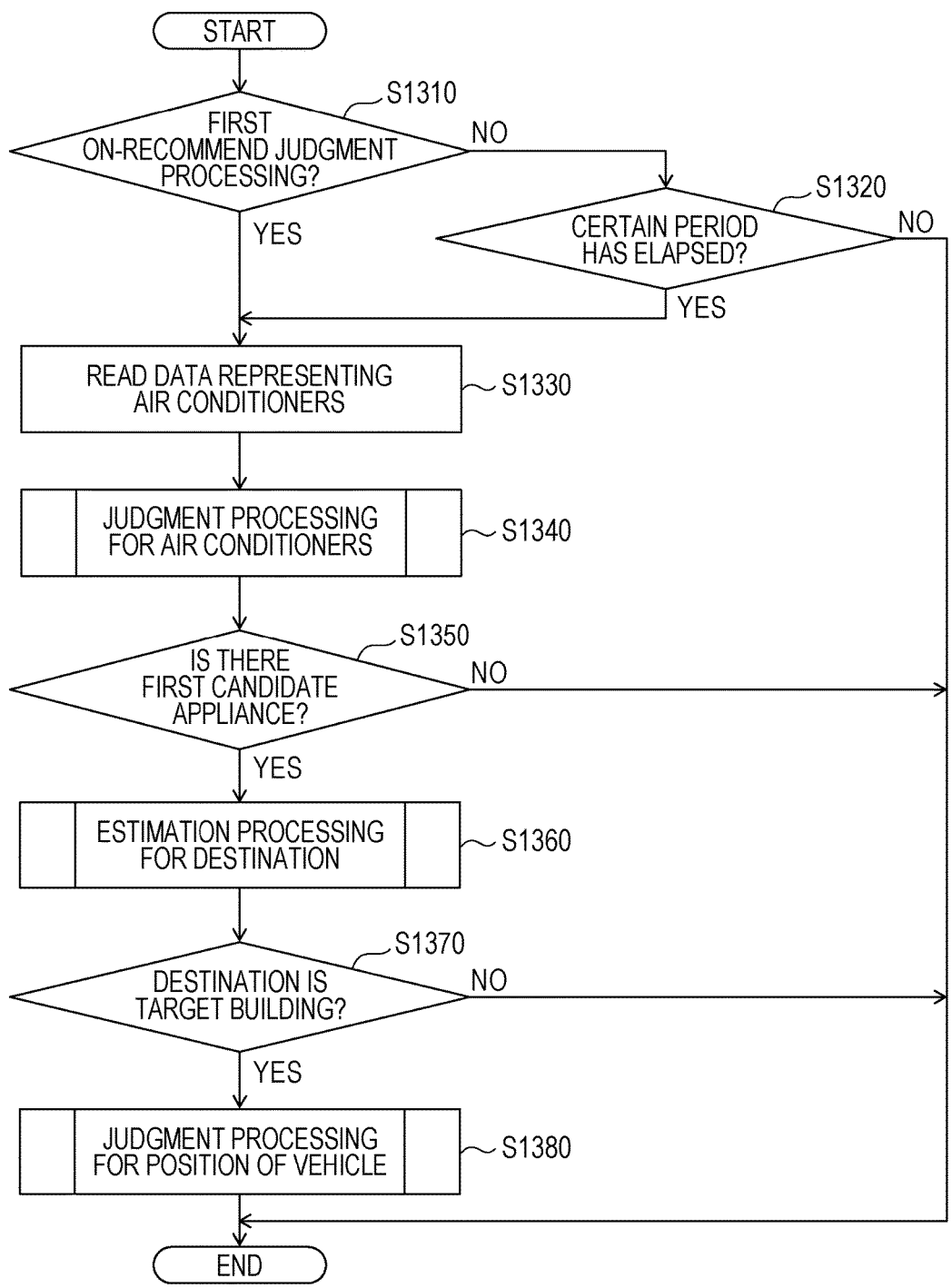
FIG. 34 is a schematic flowchart illustrating on-recommend judgment processing (seventeenth embodiment)

FIG. 34 is a schematic flowchart illustrating the on-recommend judgment processing. With reference to FIGS. 11, 28, 30, 31, and 34, a description will be given of the on-recommend judgment processing.

In step S1310, the judging unit 112B judges whether or not the current processing is the first on-recommend judgment processing after the setting of the control region CR. If on-recommend judgment processing has already been executed after the setting of the control region CR, step S1320 is executed. If the current processing is the first on-recommend judgment processing, step S1330 is executed.

In step S1320, the judging unit 112B judges whether or not a certain period has elapsed since the execution of the previous on-recommend processing. If the certain period has elapsed since the execution of the previous on-recommend processing, step S1330 is executed. Otherwise, the communication terminal 100B ends the processing.

In step S1330, the control unit 111B causes the judging unit 112B to read data representing the air conditioners owned by the user (see FIG. 11) from the first storage unit 143. After that, step S1340 is executed.

In step S1340, the communication terminal 100B executes certain judgment processing for the air conditioners. After the judgment processing for the air conditioners, step S1350 is executed.

In step S1350, the judging unit 112B judges whether or not the result of the judgment processing in step S1340 represents the existence of a first candidate appliance. The term "first candidate appliance" means an air conditioner that satisfies a start condition. If the result of the judgment processing represents the existence of a first candidate appliance, step S1360 is executed. Otherwise, the communication terminal 100B ends the processing.

In step S1360, the estimating unit 340 of the server apparatus 300A executes estimation processing for the destination of the vehicle VC. After the estimation processing, step S1370 is executed.

In step S1370, the judging unit 112B judges whether or not the destination of the vehicle VC is the target building. If the judging unit 112B judges that the destination of the vehicle VC is the target building, step S1380 is executed. Otherwise, the communication terminal 100B ends the processing.

In step S1380, processing for judging the position of the vehicle VC relative to the control region CR is executed.

FIG. 35 is a schematic flowchart illustrating the processing in step S1340 described above with reference to FIG. 34. With reference to FIGS. 11, 28 to 31, 34, and 35, a further description will be given of the on-recommend judgment processing.

In step S1341, the control unit 111B of the communication terminal 100B generates a request signal for requesting temperature data. After that, the control unit 111B of the communication terminal 100B causes the communication unit 131 of the communication terminal 100B to transmit the request signal. The request signal is transmitted from the communication unit 131 of the communication terminal 100B to the communication unit 420 of the air conditioner 400A via the server apparatus 300A. When the communication unit 420 of the air conditioner 400A receives the request signal, the control unit 410 of the air conditioner 400A causes the temperature data generating unit 430 to generate temperature data representing a temperature of the space where the air conditioner 400A is placed. The temperature data generating unit 430 outputs the temperature data to the communication unit 420. The temperature data is transmitted from the communication unit 420 of the air conditioner 400A to the communication unit 131 of the communication terminal 100B via the server apparatus 300A. When the communication unit 131 of the communication terminal 100B receives the temperature data, step S1342 is executed.

In step S1342, the control unit 111B of the communication terminal 100B reads data about a start condition from the first storage unit 143. After that, step S1343 is executed.

In step S1343, the judging unit 112B compares the temperature data with the data about the start condition. If the temperature data satisfies the start condition, step S1344 is executed. Otherwise, step S1345 is executed. For example, if the temperature of the living room is 30° C., step S1344 is executed in the processing for the air conditioner installed in the living room illustrated in FIG. 11. If the temperature of the living room is 22° C., step S1345 is executed in the processing for the air conditioner installed in the living room illustrated in FIG. 11.

In step S1344, the air conditioner as the processing target is selected as a first candidate appliance. Information about the air conditioner selected as a first candidate appliance is temporarily stored in the first storage unit 143. After that, step S1345 is executed.

In step S1345, the judging unit 112B judges whether or not the processing has been completed for all the air conditioners owned by the user. If the processing has not been completed for all the air conditioners owned by the user, step S1342 is executed. Otherwise, the communication terminal 100B ends the processing in step S1340 described above with reference to FIG. 34.

FIG. 36 is a schematic flowchart illustrating the processing in step S1360 described above with reference to FIG. 34. With reference to FIGS. 28, 30, 34, and 36, a further description will be given of the on-recommend judgment processing.

In step S1361, the control unit 111B of the communication terminal 100B requests the second obtaining unit 151 of the communication terminal 100B to generate position information about the position of the vehicle. The control unit 111B of the communication terminal 100B reads position information about the position of the target building from the second storage unit 144 of the communication terminal 100B. After that, step S1362 is executed.

In step S1362, the position information about the vehicle and building is output from the second obtaining unit 151 of the communication terminal 100B to the communication unit 131 of the communication terminal 100B. The position information about the vehicle and building is transmitted from the communication unit 131 of the communication terminal 100B to the communication unit 320 of the server apparatus 300A. After that, step S1363 is executed.

In step S1363, when the communication unit 320 of the server apparatus 300A receives the position information about the vehicle and building, the control unit 310 of the server apparatus 300A causes the estimating unit 340 to estimate the destination of the vehicle. If the position information indicates that the vehicle is going away from the building, the estimating unit 340 may judge that the destination of the vehicle is not the building. If the position information indicates that the vehicle is approaching the building, the estimating unit 340 may judge that the destination of the vehicle is the building. Data representing the judgment result is transmitted from the communication unit 320 of the server apparatus 300A to the communication unit 131 of the communication terminal 100B. The estimating unit 340 may estimate the destination of the vehicle by using another method. The principle of this embodiment is not limited by a specific method for estimating the destination of the vehicle.

Figure 37:
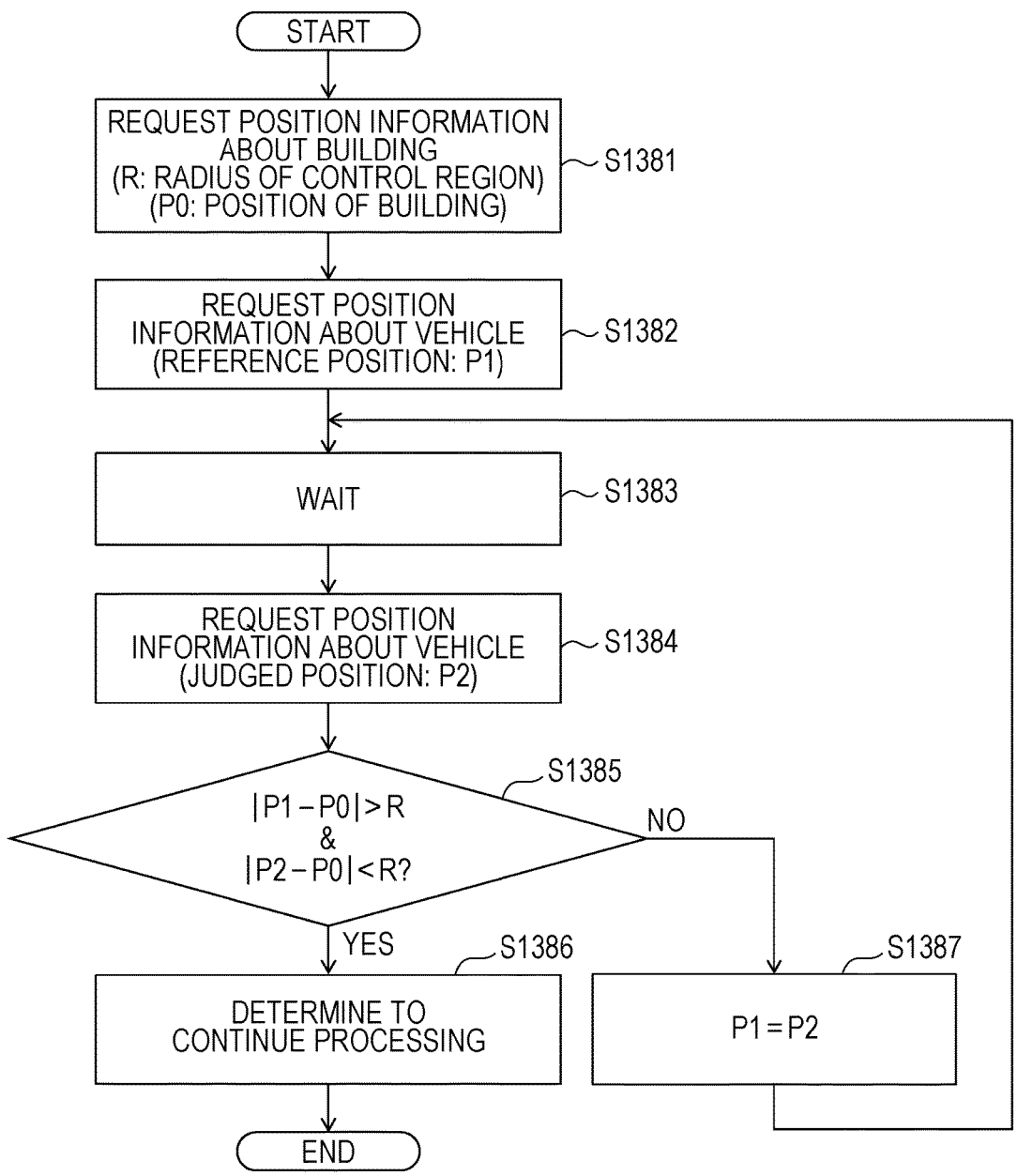
FIG. 37 is a schematic flowchart illustrating the processing in step S1380 of the flowchart illustrated in FIG. 34 (seventeenth embodiment)

FIG. 37 is a schematic flowchart illustrating the processing in step S1380 described above with reference to FIG. 34. With reference to FIGS. 25, 30, 33, 34, and 37, a further description will be given of the on-recommend judgment processing. In this embodiment, the second judgment step is exemplified by step S1380 described above with reference to FIG. 34.

In step S1381, the control unit 111B of the communication terminal 100B reads position information about the position of the target building and the radius of the control region from the second storage unit 144. In FIG. 37, the position of the building is represented by a symbol "P0". In FIG. 37, the radius of the control region is represented by a symbol "R". Under the setting illustrated in FIG. 25, "R" is "5 km". After the position information has been read, step S1382 is executed. In this embodiment, second position information is exemplified by the position information about the position of the target building and the radius of the control region read from the second storage unit 144.

In step S1382, the control unit 111B of the communication terminal 100B requests the second obtaining unit 151 to generate position information about the position of the vehicle. The communication terminal 100B handles the position of the vehicle represented by the position information obtained in step S1382 as a reference position. In FIG. 37, the reference position is represented by a symbol "P1". After the position information about the position of the vehicle has been generated, step S1383 is executed. In this embodiment, first position information is exemplified by the position information about the position of the vehicle.

In step 1383, the communication terminal 100B executes wait processing. A waiting time may be constant. Alternatively, the waiting time may be changed in accordance with the velocity of the vehicle. The principle of this embodiment is not limited by a waiting time. After the waiting time has elapsed, step S1384 is executed.

In step S1384, the control unit 111B of the communication terminal 100B requests again the second obtaining unit 151 to generate position information about the position of the vehicle. The communication terminal 100B handles the position of the vehicle represented by the position information obtained in step S1384 as a judged position. In FIG. 37, the judged position is represented by a symbol "P2". After the position information about the position of the vehicle has been generated, step S1385 is executed. In this embodiment, the first position information is exemplified by the position information about the position of the vehicle.

In step S1385, if the difference between the position of the vehicle "P1" and the position of the building "P0" is larger than the radius "R" of the control region and if the difference between the position of the vehicle "P2" and the position of the building "P0" is smaller than the radius "R" of the control region, step S1386 is executed. Otherwise, step S1387 is executed.

In step S1386, the control unit 111B of the control terminal 100B determines to continue the processing. Thus, after step S1386, step S1220 described above with reference to FIG. 33 is executed.

In step S1387, the judging unit 112B determines to handle the judged position P2 as the reference position P1. After that, step S1383 is executed.

Eighteenth Embodiment

In the image display judgment processing described above in relation to the sixteenth embodiment, it is determined whether or not an image prompting the user to judge whether or not to execute a remote operation is to be displayed. In an eighteenth embodiment, a description will be given of the image display judgment processing.

FIG. 38A is a table showing the data about air conditioners stored in the first storage unit 143 in step S1344 described above with reference to FIG. 35. FIG. 38B is a table showing the air conditioners that have been determined as target appliances to be operated through the image display judgment processing. With reference to FIGS. 11, 30, 33, 35, 38A, and 38B, a description will be given of the image judgment processing.

If the temperature data represents a temperature of 26° C., as a result of the processing in step S1344 executed under the settings illustrated in FIG. 11, the air conditioners installed in the living room, kitchen, and child's room 2 are selected as first candidate appliances.

If the air conditioner installed in the child's room 2 is operating, it is not necessary to execute step S1240 described above with reference to FIG. 33. Thus, the judging unit 112B excludes the air conditioner installed in the child's room 2 from the target appliances to be operated.

Figure 39:
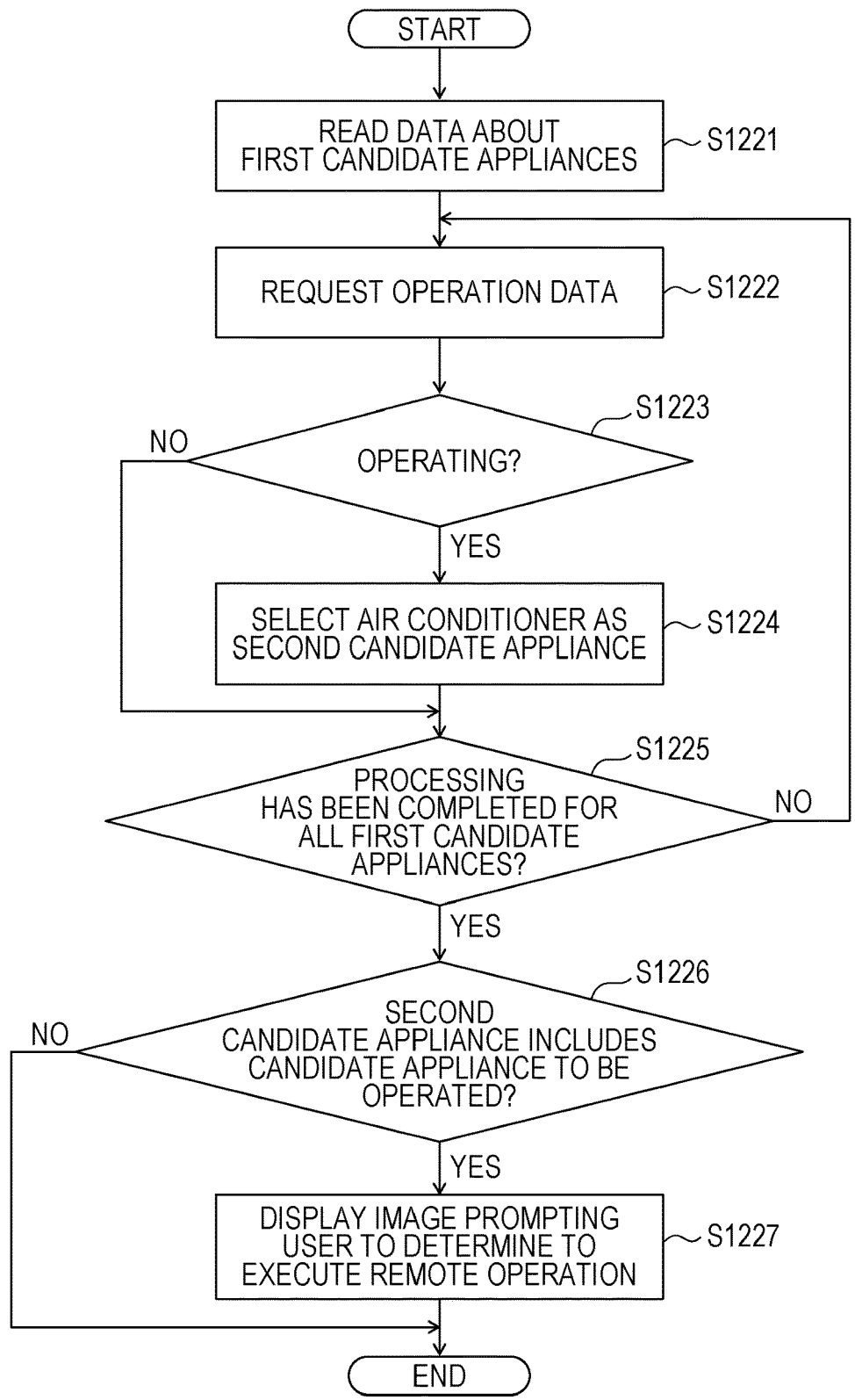
FIG. 39 is a schematic flowchart illustrating image display judgment processing (eighteenth embodiment)

FIG. 39 is a schematic flowchart illustrating the image display judgment processing. With reference to FIGS. 11, 15A, 28 to 30, 33, and 38A to 39, a description will be given of the image display judgment processing.

In step S1221, the control unit 111B of the communication terminal 100B reads the data about the first candidate appliances from the first storage unit 143. After that, step S1222 is executed.

In step S1222, the control unit 111B of the communication terminal 100B generates a request signal for requesting operation data. The control unit 111B of the communication terminal 100B causes the communication unit 131 of the communication terminal 100B to output the request signal. The request signal is transmitted from the communication unit 131 of the communication terminal 100B to the communication unit 420 of the air conditioner 400A via the server apparatus 300A. When the communication unit 420 of the air conditioner 400A receives the request signal, the control unit 410 of the air conditioner 400A causes the operation data generating unit 450 to generate operation data. The control unit 410 of the air conditioner 400A causes the communication unit 420 of the air conditioner 400 A to transmit the operation data. The operation data is transmitted from the communication unit 420 of the air conditioner 400A to the communication unit 131 of the communication terminal 100B via the server apparatus 300A. After that, step S1223 is executed.

In step S1223, the control unit 111B causes the judging unit 112B to judge, on the basis of the operation data, whether or not the air conditioner 400A as the processing target is operating. If the judging unit 112B judges that the air conditioner 400A as the processing target is operating, step S1224 is executed. Otherwise, step S1225 is executed.

In step S1224, the judging unit 112B determines to handle the air conditioner 400A as the processing target as a second candidate appliance. After that, step S1225 is executed.

In step S1225, the judging unit 112B judges whether or not the above-described processing has been completed for all the first candidate appliances. If the above-described processing has been completed for all the first candidate appliances, step S1226 is executed. Otherwise, step S1222 is executed. If the air conditioners illustrated in FIG. 38A are selected as first candidate appliances, and if the above-described processing has been completed for the air conditioners installed in the living room, kitchen, and child's room 2, step S1225 is executed.

In step S1226, the judging unit 112B judges whether or not an air conditioner selected as a second candidate appliance includes an air conditioner set by the user as a candidate appliance to be operated. If an air conditioner selected as a second candidate appliance includes an air conditioner set by the user as a candidate appliance to be operated, the judging unit 112B temporarily stores information about the air conditioner selected as a second candidate appliance and set by the user as a candidate appliance to be operated in the first storage unit 143. After that, step S1227 is executed. Otherwise, the control unit 111B suspends the processing. When the data illustrated in FIG. 38A is compared with the data illustrated in FIG. 11, the air conditioners installed in the living room, kitchen, and child's room 2 are set by the user as candidate appliances to be operated, and thus step S1227 is executed.

In step S1227, the control unit 111B causes the display unit 163 to display the image illustrated in FIG. 15A. After that, step S1230 described above with reference to FIG. 33 is executed.

Nineteenth Embodiment

In the image display judgment processing described above in relation to the eighteenth embodiment, if the communication terminal is able to determine a target appliance to be operated, processing for remotely operating the target appliance to be operated is executed. In a nineteenth embodiment, a description will be given of the processing for remotely operating the target appliance to be operated.

Figure 40:
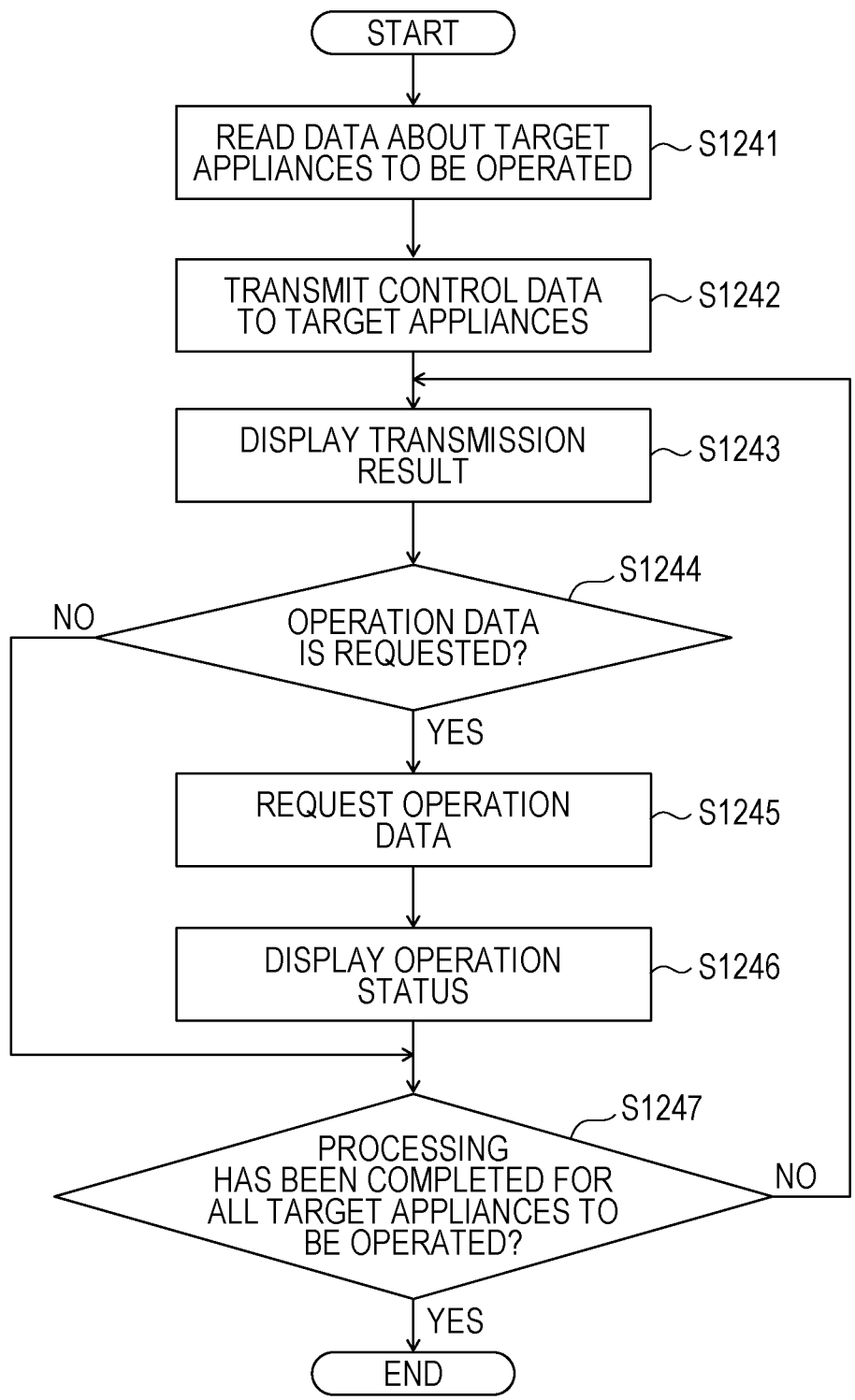
FIG. 40 is a schematic flowchart illustrating the processing executed in step S1240 of the flowchart illustrated in FIG. 33 (nineteenth embodiment)

FIG. 40 is a schematic flowchart illustrating the processing executed in step S1240 described above with reference to FIG. 33. With reference to FIGS. 15A to 15C, 28 to 30, 33, 38B, 39, and 40, a description will be given of the processing executed in step S1240.

In step S1241, if the user presses the icon button IB27 (see FIG. 15A), the control unit 111B of the communication terminal 100B reads the data about all the air conditioners selected as target appliances to be operated (see FIG. 38B) from the first storage unit 143. The data read from the first storage unit 143 may include setting data defining the operations of the air conditioners selected as target appliances to be operated. After the control unit 111B has read the data about all the air conditioners selected as target appliances to be operated, step S1242 is executed.

In step S1242, the control unit 111B of the communication terminal 100B causes the communication unit 131 of the communication terminal 100B to transmit the read setting data as control data. The control data is transmitted from the communication unit 131 of the communication terminal 100B to the communication unit 420 of the air conditioner 400A via the server apparatus 300A. When the communication unit 420 of the air conditioner 400A receives the control data, the operation unit 440 of the air conditioner 400A executes an operation defined by the control data. The notifying unit 460 of the air conditioner 400A generates notification data indicating that the control data has been received. The control unit 410 of the air conditioner 400A causes the communication unit 420 of the air conditioner 400A to transmit the notification data. The notification data is transmitted from the communication unit 420 of the air conditioner 400A to the communication unit 131 of the communication terminal 100B via the server apparatus 300A. After that, step S1243 is executed.

In step S1243, the control unit 111B of the communication terminal 100B causes the display unit 163 to display images representing a communication result of the control data (see FIGS. 15B and 15C) in accordance with the notification data. After that, step S1244 is executed.

In step S1244, the communication terminal 100B judges whether or not the user requests operation data. If the user requests operation data (if the user presses the icon buttons IB29 and IB31 (see FIGS. 15B and 15C), step S1245 is executed. Otherwise, step S1247 is executed.

In step S1245, the control unit 111B of the communication terminal 100B generates a request signal for requesting operation data. The control unit 111B of the communication terminal 100B causes the communication unit 131 of the communication terminal 100B to transmit the request signal. The request signal is transmitted from the communication unit 131 of the communication terminal 100B to the communication unit 420 of the air conditioner 400A via the server apparatus 300A. In response to the request signal, the control unit 410 of the air conditioner 400A causes the operation data generating unit 450 to generate operation data. The control unit 410 of the air conditioner 400A causes the communication unit 420 of the air conditioner 400A to transmit the operation data. The operation data is transmitted from the communication unit 420 of the air conditioner 400A to the communication unit 131 of the communication terminal 100B via the server apparatus 300A. After that, step S1246 is executed. In this embodiment, an obtaining step is exemplified by step S1245.

In step S1246, the control unit 111B causes the display unit 163 to display the operation status represented by the operation data. After that, step S1247 is executed.

In step S1247, the judging unit 112B of the communication terminal 100B judges whether or not the above-described processing has been executed on all the target appliances to be operated.

Twentieth Embodiment

In the on-recommend judgment processing described above in relation to the seventeenth embodiment, judgment processing for an air conditioner is executed before judgment processing for the position of the vehicle. Alternatively, judgment processing for an air conditioner may be executed after judgment processing for the position of the vehicle. In a twentieth embodiment, a description will be given of other on-recommend judgment processing.

Figure 41:
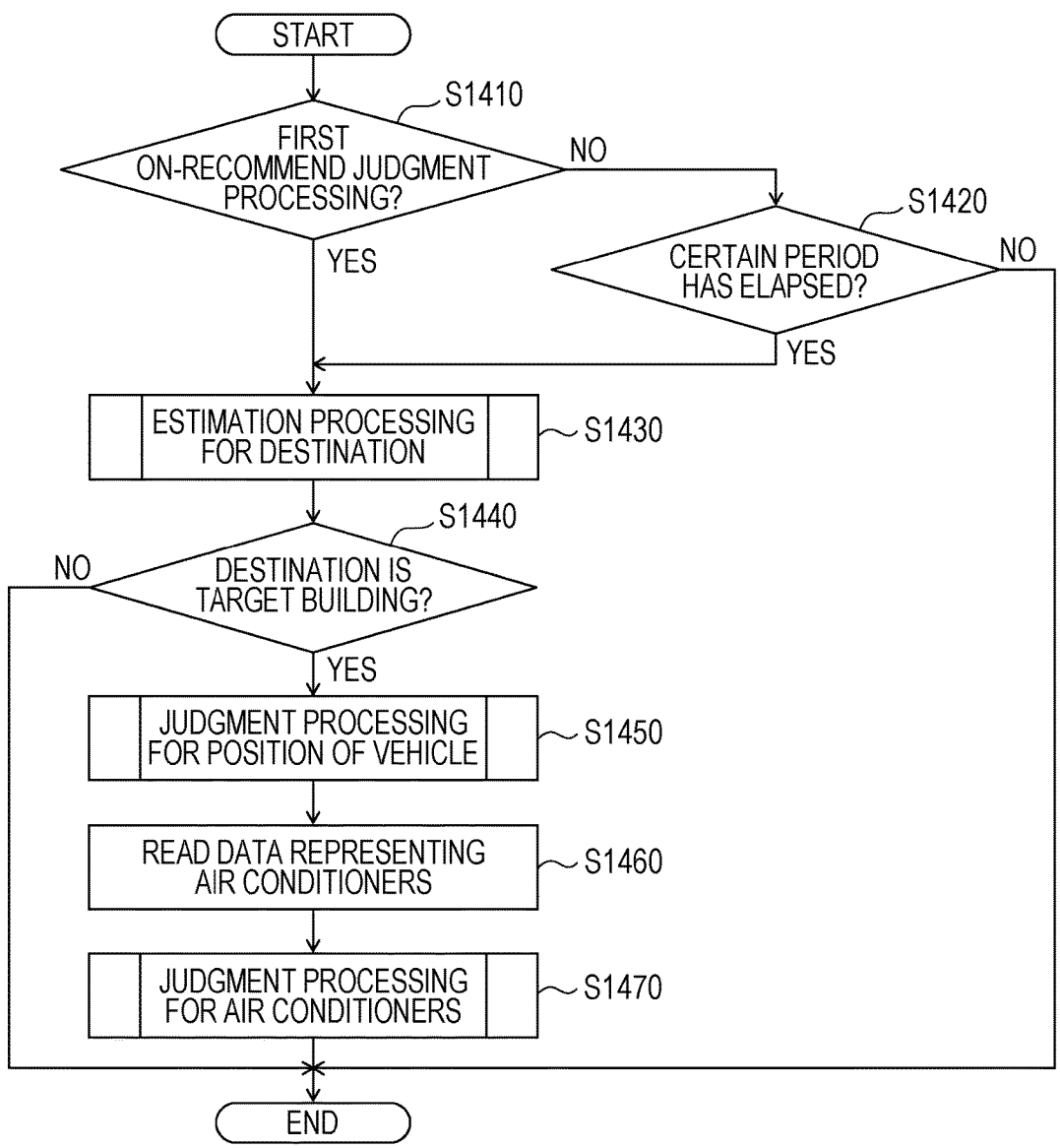
FIG. 41 is a schematic flowchart illustrating on-recommend judgment processing (twentieth embodiment)

FIG. 41 is a schematic flowchart illustrating the on-recommend judgment processing. With reference to FIGS. 11, 28, 30, 31, 35 to 37, and 41, a description will be given of the on-recommend judgment processing.

In step S1410, the judging unit 1128 judges whether or not the current processing is the first on-recommend judgment processing after the setting of the control region CR. If on-recommend judgment processing has already been executed after the setting of the control region CR, step S1420 is executed. If the current processing is the first on-recommend judgment processing, step S1430 is executed.

In step S1420, the judging unit 1128 judges whether or not a certain period has elapsed since the execution of the previous on-recommend processing. If the certain period has elapsed since the execution of the previous on-recommend processing, step S1430 is executed. Otherwise, the communication terminal 1008 ends the processing.

In step S1430, the estimating unit 340 of the server apparatus 300A executes the estimation processing described above with reference to FIG. 36. After the estimation processing, step S1440 is executed.

In step S1440, the judging unit 1128 judges whether or not the destination of the vehicle VC is the target building. If the judging unit 1128 judges that the destination of the vehicle VC is the target building, step S1450 is executed. Otherwise, the communication terminal 1008 ends the processing.

In step S1450, the processing described above with reference to FIG. 37 is executed, and it is judged whether or not the vehicle VC has entered the control region CR. After that, step S1460 is executed.

In step S1460, the control unit 111B causes the judging unit 112B to read the data representing the air conditioners owned by the user (see FIG. 11) from the first storage unit 143. After that, step S1470 is executed.

In step S1470, the communication terminal 100B executes the judgment processing described above with reference to FIG. 35.

Twenty-First Embodiment

In the above-described various embodiments, judgment processing for the position of the vehicle is executed. Thus, if the user does not make a setting in advance for the position of the target building, it is preferable to suspend on-recommend judgment processing before the communication terminal executes various processing operations. In addition, if judgment processing for the position of the vehicle is executed, estimation processing for the destination of the vehicle is not necessarily executed. Thus, the on-recommend judgment processing may be greatly simplified. In a twenty-first embodiment, a description will be given of simplified on-recommend judgment processing.

Figure 42:
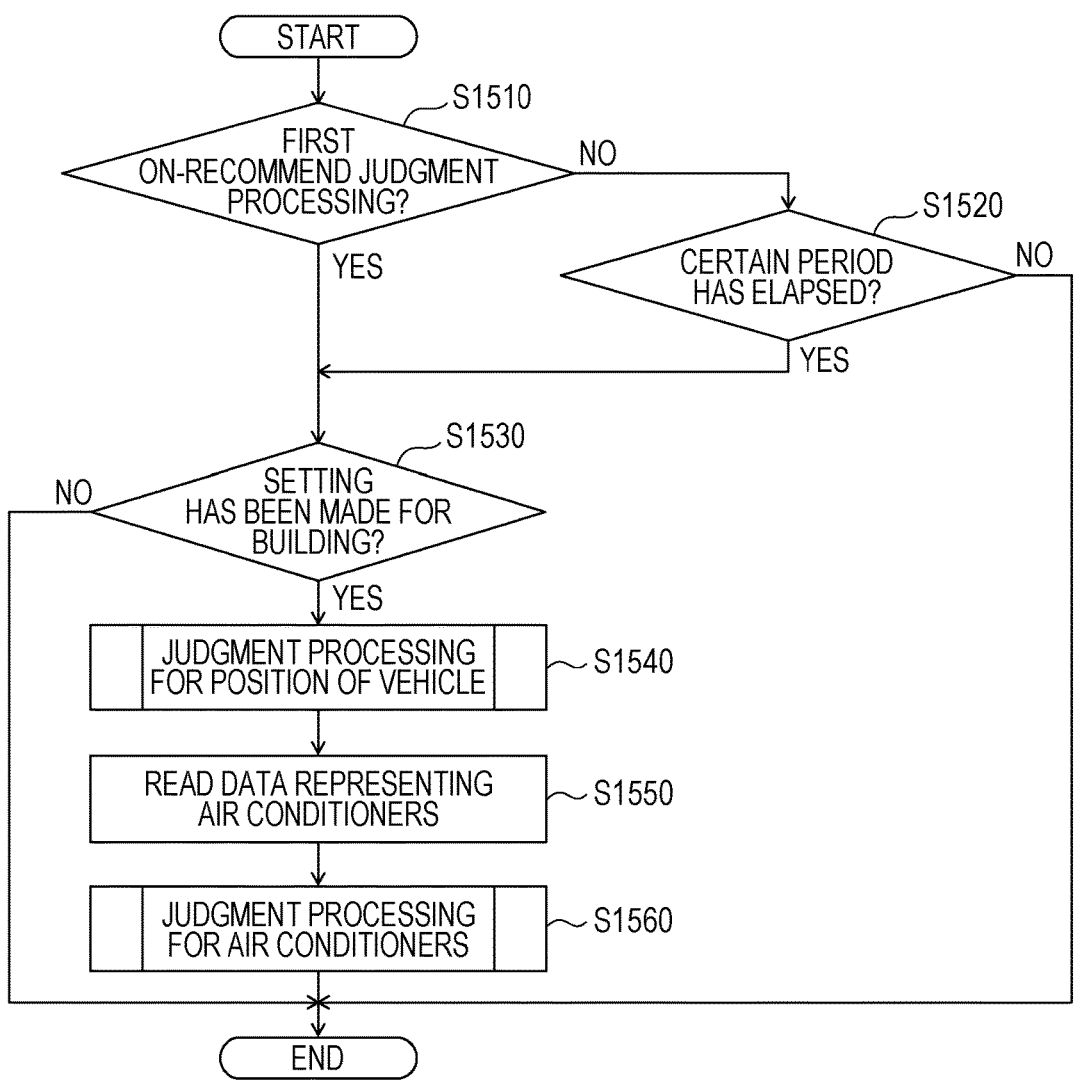
FIG. 42 is a schematic flowchart illustrating on-recommend judgment processing (twenty-first embodiment)

FIG. 42 is a schematic flowchart illustrating the on-recommend judgment processing. With reference to FIGS. 11, 12, 25, 30, 31, 35, 37, and 42, a description will be given of the on-recommend judgment processing.

In step S1510, the judging unit 112B judges whether or not the current processing is the first on-recommend judgment processing after the setting of the control region CR. If on-recommend judgment processing has already been executed after the setting of the control region CR, step S1520 is executed. If the current processing is the first on-recommend judgment processing, step S1530 is executed.

In step S1520, the judging unit 112B judges whether or not a certain period has elapsed since the execution of the previous on-recommend processing. If the certain period has elapsed since the execution of the previous on-recommend processing, step S1530 is executed. Otherwise, the communication terminal 100B ends the processing.

In step S1530, the control unit 111B of the communication terminal 100B reads the data about the building HM from the second storage unit 144. If the user has not made the setting described above with reference to FIGS. 12 and 25, the control unit 111B is not able to read the data about the building HM, and thus the on-recommend judgment processing is suspended. If the control unit 111B reads the data about the building HM from the second storage unit 144, step S1540 is executed.

In step S1540, the processing described above with reference to FIG. 37 is executed, and it is judged whether or not the vehicle VC has entered the control region CR. After that, step S1550 is executed.

In step S1550, the control unit 111B causes the judging unit 112B to read the data representing the air conditioners owned by the user (see FIG. 11) from the first storage unit 143. After that, step S1560 is executed.

In step S1560, the communication terminal 100B executes the judgment processing described above with reference to FIG. 35.

Twenty-Second Embodiment

A communication terminal may obtain information about an outside temperature without communicating with an air conditioner. In this case, a temperature outside a vehicle and a building is obtained by the communication terminal. In a twenty-second embodiment, a description will be given of a communication terminal capable of obtaining information about an outside temperature without communicating with an air conditioner.

Figure 43:
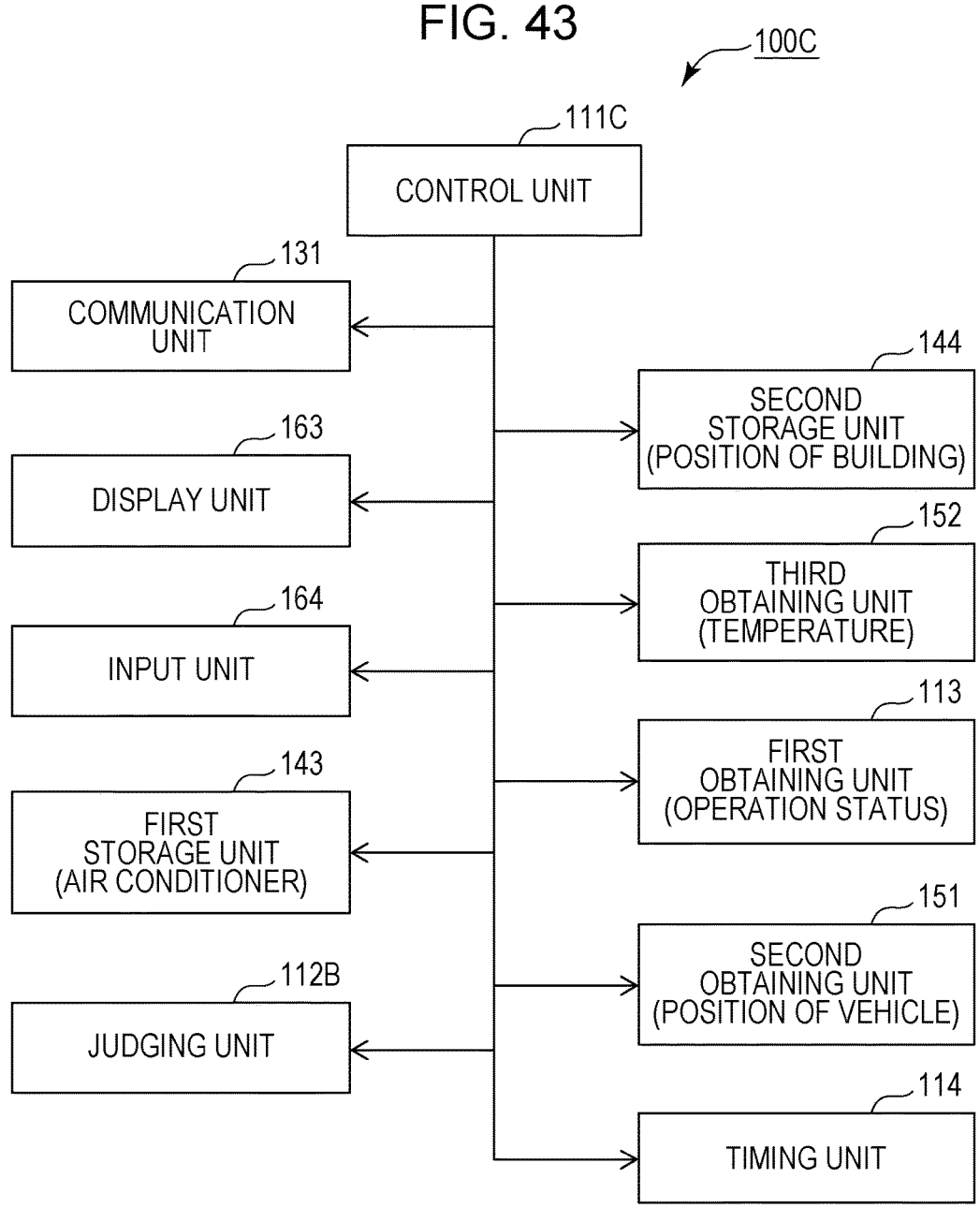
FIG. 43 is a schematic block diagram illustrating an exemplary functional configuration of a communication terminal (twenty-second embodiment)

FIG. 43 is a schematic block diagram illustrating an exemplary functional configuration of a communication terminal 100C according to the twenty-second embodiment. With reference to FIGS. 35 and 43, a description will be given of the exemplary functional configuration of the communication terminal 100C. In the twenty-second embodiment, the same reference numerals as those in the fifteenth embodiment indicate that the elements denoted by the same reference numerals have the same functions as those in the fifteenth embodiment. Thus, the description of the fifteenth embodiment is applied to these elements.

As in the fifteenth embodiment, the communication terminal 100C includes the first obtaining unit 113, the judging unit 112B, the timing unit 114, the communication unit 131, the first storage unit 143, the second storage unit 144, the second obtaining unit 151, the display unit 163, and the input unit 164. The description of the fifteenth embodiment is applied to these elements.

The communication terminal 100C further includes a control unit 111C and a third obtaining unit 152. The control unit 111C corresponds to the CPU 110 described above with reference to FIG. 7. The third obtaining unit 152 corresponds to the information obtaining device 150 described above with reference to FIG. 7. The third obtaining unit 152 may be a temperature measuring element for measuring a temperature outside the vehicle.

The control unit 111C controls the overall operation of the communication terminal 100C. Thus, judging unit 112B, the first obtaining unit 113, the timing unit 114, the communication unit 131, the first storage unit 143, the second storage unit 144, the second obtaining unit 151, the third obtaining unit 152, the display unit 163, and the input unit 164 execute certain operations under the control executed by the control unit 111C.

The communication terminal 100C executes the same operations as those described above in relation to the fifteenth embodiment, except step S1341 described above with reference to FIG. 35. In step S1341, the control unit 111C causes the third obtaining unit 152 to obtain information about a temperature outside the vehicle. After that, the communication terminal 100C executes steps S1342 to S1345 by using the information obtained by the third obtaining unit 152. Thus, in step S1341, the communication terminal 100C does not need to communicate with a home appliance. In this embodiment, the first judgment step is exemplified by the series of processing operations illustrated in FIG. 35.

Twenty-Third Embodiment

A communication terminal may determine an operation mode on the basis of obtained information about an outside temperature. In a twenty-third embodiment, a description will be given of a communication terminal that determines an operation mode in accordance with an outside temperature.

Figure 44:
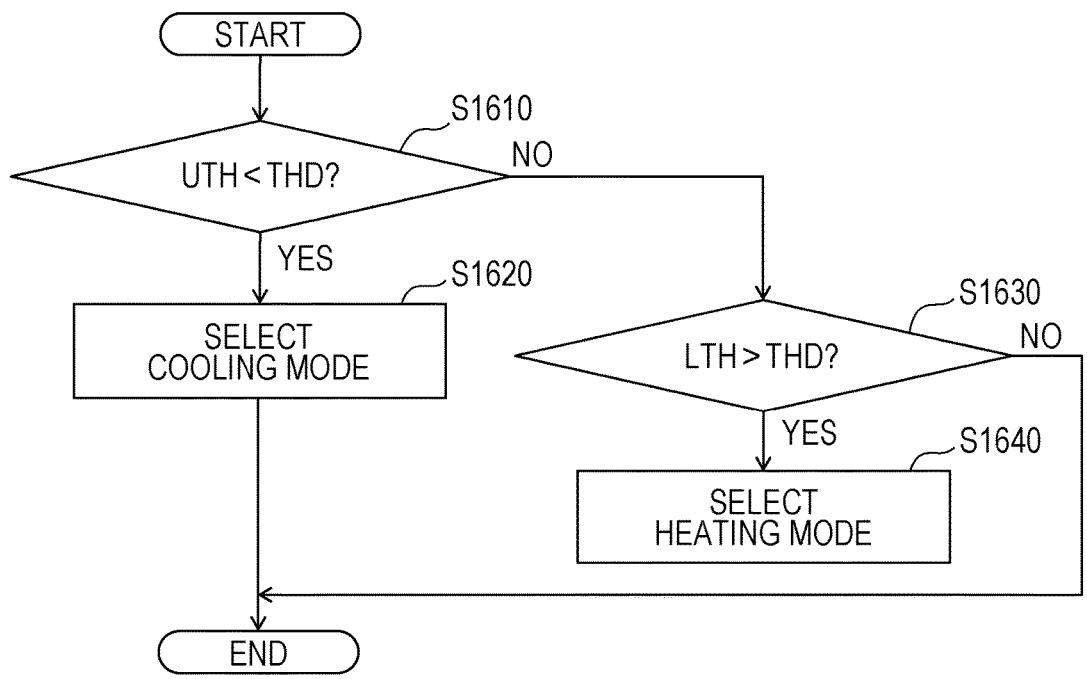
FIG. 44 is schematic flowchart illustrating a procedure for determining an operation mode (twenty-third embodiment)

FIG. 44 is schematic flowchart illustrating a procedure for determining an operation mode. With reference to FIGS. 29, 30, 35, 40, and 44, a description will be given of a method for determining an operation mode.

Upon the start of step S1343 described above with reference to FIG. 35, step S1610 is executed. In FIG. 44, an upper-limit temperature set by the user is represented by a symbol "UTH". In FIG. 44, an outside temperature represented by the temperature data obtained in step S1341 described above with reference to FIG. 35 is represented by a symbol "THD". In step S1610, the judging unit 112B compares the outside temperature THD with the upper-limit temperature UTH. If the outside temperature THD is higher than the upper-limit temperature UTH, step S1620 is executed. Otherwise, step S1630 is executed. In this embodiment, a second set temperature is exemplified by the upper-limit temperature UTH.

In step S1620, the communication terminal 100B selects a cooling mode. In this case, in step S1242 described above with reference to FIG. 40, the communication terminal 100B transmits control data for the cooling mode. The operation unit 440 of the air conditioner 400A operates, in accordance with the control data, so that a room temperature is adjusted to become a target temperature that is set to be lower than the upper-limit temperature.

In FIG. 44, a lower-limit temperature set by the user is represented by a symbol "LTH". In step S1630, the judging unit 112B compares the outside temperature THD with the lower-limit temperature LTH. If the outside temperature THD is lower than the lower-limit temperature LTH, step S1640 is executed. Otherwise, the start condition is not satisfied and thus step S1345 illustrated in FIG. 35 is executed.

In step S1640, the communication terminal 100B selects a heating mode. In this case, in step S1242 described above with reference to FIG. 40, the communication terminal 100B transmits control data for the heating mode. The operation unit 440 of the air conditioner 400A operates, in accordance with the control data, so that a room temperature is adjusted to become a target temperature that is set to be higher than the lower-limit temperature.

Figure 45:
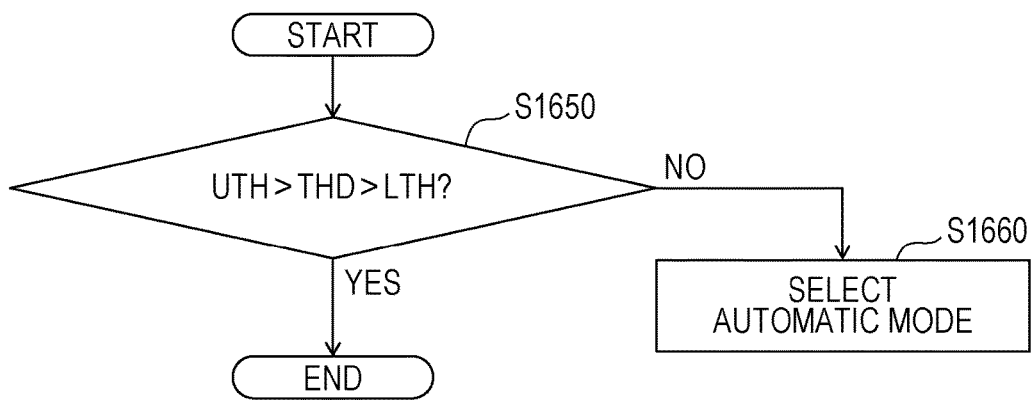
FIG. 45 is schematic flowchart illustrating another procedure for determining an operation mode (twenty-third embodiment)

FIG. 45 is a schematic flowchart illustrating another procedure for determining an operation mode. With reference to FIGS. 29, 30, 35, 40, and 45, a description will be given of a method for determining an operation mode.

In step S1650, the judging unit 112B judges whether or not the outside temperature THD is between the upper-limit temperature UTH and the lower-limit temperature LTH. If the outside temperature THD is between the upper-limit temperature UTH and the lower-limit temperature LTH, the start condition is not satisfied, and thus step S1345 illustrated in FIG. 35 is executed. Otherwise, step S1660 is executed.

In step S1660, the communication terminal 100B selects an automatic mode. In this case, in step S1242 described above with reference to FIG. 40, the communication terminal 100B transmits control data for the automatic mode. The operation unit 440 of the air conditioner 400A operates, in accordance with the control data, so that a room temperature is adjusted to become a target temperature that is set to be between the lower-limit temperature and the upper-limit temperature.

Twenty-Fourth Embodiment

After control data has been transmitted, a plurality of images representing transmission statuses of the control data are displayed. The order in which the plurality of images are displayed may be predetermined. In a twenty-fourth embodiment, a description will be given of a method for determining a display order of a plurality of images.

FIG. 46 is a table showing the data stored in the first storage unit 143. With reference to FIGS. 15B, 15C, 30, 38B, 40, and 46, a description will be given of the method for determining a display order of a plurality of images.

FIG. 46 illustrates that priorities are set for the plurality of air conditioners owned by the user. The control unit 111B refers to the data about the priorities, and executes the above-described various processing operations in accordance with the priorities. The priorities may be set by the user. Alternatively, the priorities may be automatically set by an application program. The principle of this embodiment is not limited by a specific method for determining priorities. In this embodiment, the setting information is exemplified by the data illustrated in FIG. 46.

FIG. 38B illustrates that the air conditioner installed in the living room and the air conditioner installed in the kitchen are selected as target appliances to be operated. As illustrated in FIG. 46, the air conditioner installed in the living room is given a higher priority over the air conditioner installed in the kitchen. Thus, the processing loop from step S1243 to step S1248 described above with reference to FIG. 40 is executed on the air conditioner installed in the living room, and is then executed on the air conditioner installed in the kitchen. As a result, the display unit 163 displays the image illustrated in FIG. 15B and then displays the image illustrated in FIG. 15C. In this embodiment, a first target appliance is exemplified by the air conditioner installed in the living room. In this embodiment, the first target appliance is exemplified by the air conditioner installed in the kitchen. A first notification image is exemplified by the image illustrated in FIG. 15B. A second notification image is exemplified by the image illustrated in FIG. 15C.

Twenty-Fifth Embodiment

A display order of images may depend on the difference between a temperature set by the user and a measured temperature. In a twenty-fifth embodiment, a description will be given of a method for determining a display order of images on the basis of the difference between a temperature set by the user and a measured temperature.

Figure 47:
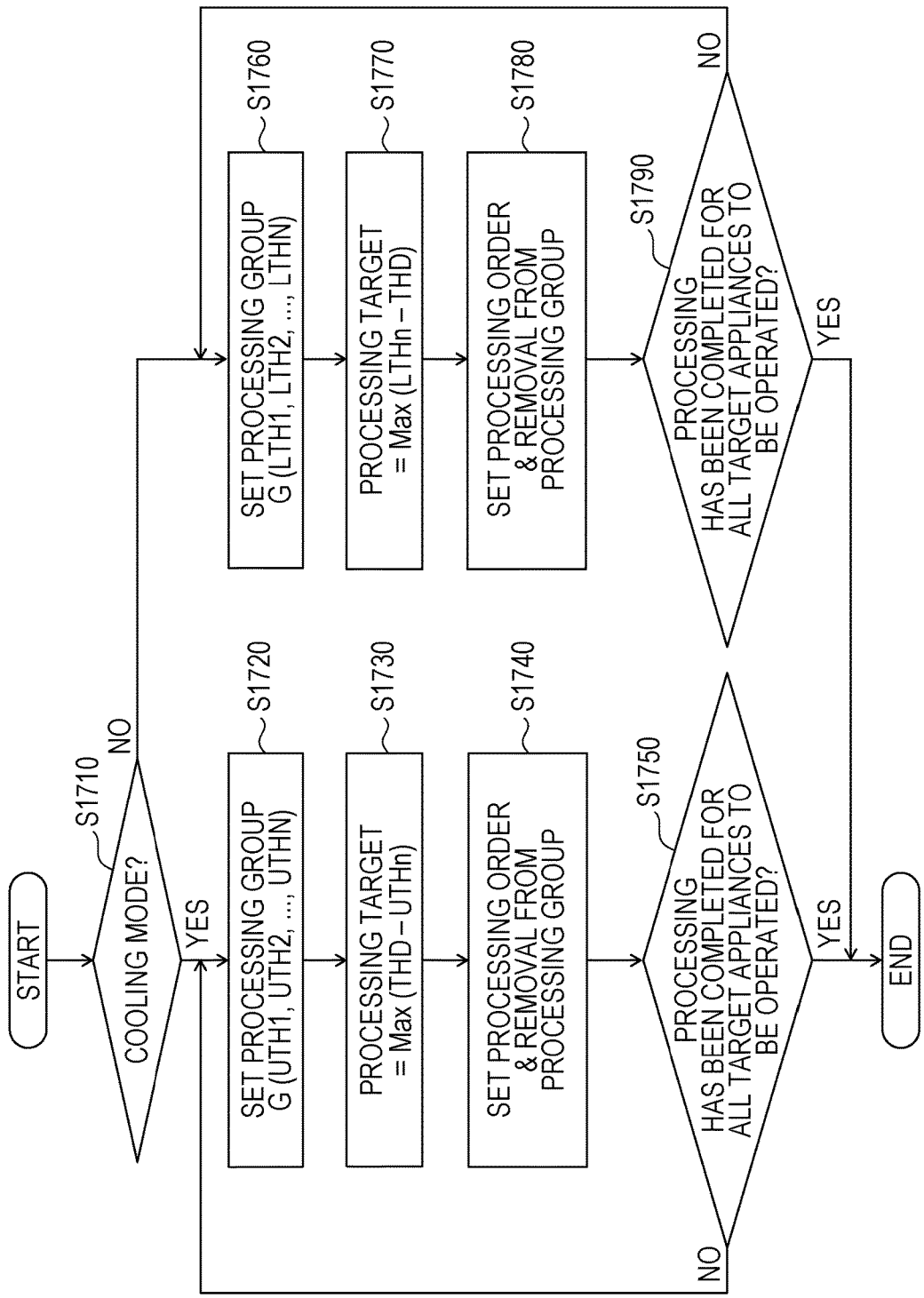
FIG. 47 is a schematic flowchart illustrating a method for determining a display order of images on the basis of the difference between a temperature set by the user and a measured temperature (twenty-fifth embodiment)

FIG. 47 is a schematic flowchart illustrating a method for determining a display order of images on the basis of the difference between a temperature set by the user and a measured temperature. With reference to FIGS. 35, 40, 43, and 47, a description will be given of the method for determining a display order of a plurality of images.

In step S1710, the judging unit 112B judges whether or not the communication unit 131 has transmitted control data for the cooling mode. A technique of selecting the cooling mode or the heating mode may be based on the principle of the twenty-third embodiment. If the judging unit 112B judges that the communication unit 131 has transmitted the control data for the cooling mode, step S1720 is executed. Otherwise, step S1760 is executed.

In step S1720, the control unit 111B sets, on the basis of the data about the target appliances to be operated that is read in step S1241 described above with reference to FIG. 40, a processing group of the upper-limit temperatures set for the target appliances to be operated. After that, step S1730 is executed.

In step S1730, the control unit 111B finds an air conditioner for which the difference between the temperature THD represented by the temperature data obtained in step S1341 described above with reference to FIG. 35 and the upper-limit temperature set for the target appliance to be operated is the maximum. After that, step S1740 is executed.

In step S1740, the control unit 111B sets a processing order for the processing loop from step S1243 to step S1248 illustrated in FIG. 40. The data about the air conditioner for which the processing order has been set is removed from the processing group. After that, step S1750 is executed.

In step S1750, the judging unit 112B judges whether or not the above-described processing has been executed on all the target appliances to be operated. If the above-described processing has been executed on all the target appliances to be operated, the processing ends. Otherwise, step S1720 is executed.

In step S1760, the control unit 111B sets, on the basis of the data about the target appliances to be operated that is read in step S1241 described above with reference to FIG. 40, a processing group of the lower-limit temperatures set for the target appliances to be operated. After that, step S1770 is executed.

In step S1770, the control unit 111B finds an air conditioner for which the difference between the temperature THD represented by the temperature data obtained in step S1341 described above with reference to FIG. 35 and the lower-limit temperature set for the target appliance to be operated is the maximum. After that, step S1780 is executed.

In step S1780, the control unit 111B sets a processing order for the processing loop from step S1243 to step S1248 illustrated in FIG. 40. The data about the air conditioner for which the processing order has been set is removed from the processing group. After that, step S1790 is executed.

In step S1790, the judging unit 112B judges whether or not the above-described processing has been executed on all the target appliances to be operated. If the above-described processing has been executed on all the target appliances to be operated, the processing ends. Otherwise, step S1760 is executed.

As a result of the above-described processing, the display unit 163 preferentially displays a transmission result for the air conditioner for which a large temperature difference is seen.

Twenty-Sixth Embodiment

If the user has not set information about the position of a target building, the communication terminal described above in relation to the twenty-first embodiment suspends processing. If the communication terminal is used together with a server apparatus having a function of estimating the position of the building, the processing can be continued. In this case, the communication terminal is able to execute various processing operations by using the position of the building estimated by the server apparatus. In a twenty-sixth embodiment, a description will be given of an exemplary server apparatus.

Figure 48:
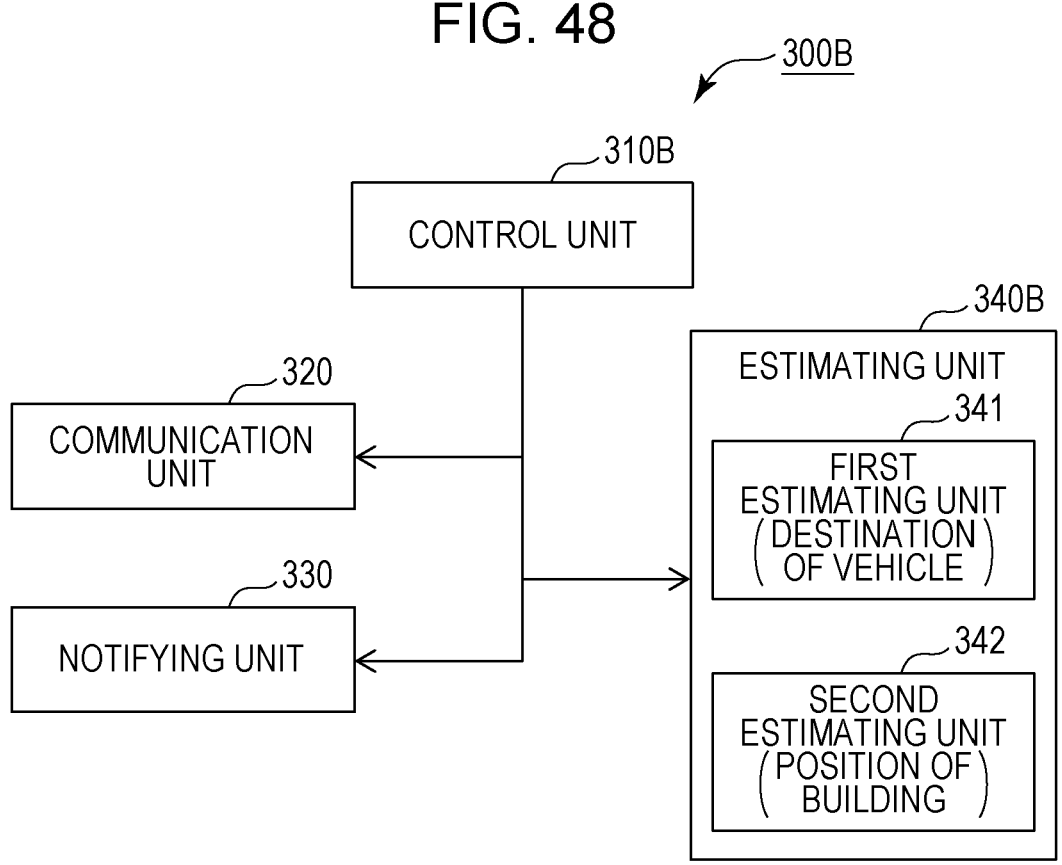
FIG. 48 is a schematic block diagram illustrating an exemplary functional configuration of a server apparatus (twenty-sixth embodiment)

FIG. 48 is a schematic block diagram illustrating an exemplary functional configuration of a server apparatus 300B according to the twenty-sixth embodiment. With reference to FIGS. 36 and 48, a description will be given of the exemplary functional configuration of the server apparatus 300B. In the twenty-sixth embodiment, the same reference numerals as those in the thirteenth embodiment indicate that the elements denoted by the same reference numerals have the same functions as those in the thirteenth embodiment. Thus, the description of the thirteenth embodiment is applied to these elements.

The server apparatus 300B includes the communication unit 320 and the notifying unit 330. The description of the thirteenth embodiment is applied to these elements.

The server apparatus 300B further includes a control unit 310B and an estimating unit 340B. The control unit 310B controls the overall operation of the server apparatus 300B. Thus, the communication unit 320, the notifying unit 330, and the estimating unit 340B execute certain operations under the control executed by the control unit 310B.

The estimating unit 340B includes a first estimating unit 341 and a second estimating unit 342. The first estimating unit 341 executes the processing in step S1363 described above with reference to FIG. 36.

The server apparatus 300B may regularly receive information about the position of the vehicle generated by the second obtaining unit 151 of the communication terminal 100B. In this case, the server apparatus 300B is able to roughly grasp the movement pattern of the vehicle. The second estimating unit 342 is able to estimate the position of the target building on the basis of the movement pattern of the vehicle.

If the target building is a user's home, the second estimating unit 342 is able to estimate that the user's home exists near the position where the vehicle is often parked for a long time. The principle of this embodiment is not limited by a specific estimation method used by the second estimating unit 342.

Twenty-Seventh Embodiment

In on-recommend judgment processing, position information about the position of a building estimated by a server apparatus may be used. In a twenty-seventh embodiment, a description will be given of on-recommend judgment processing in which position information about the position of a building estimated by a server apparatus is used.

Figure 49:
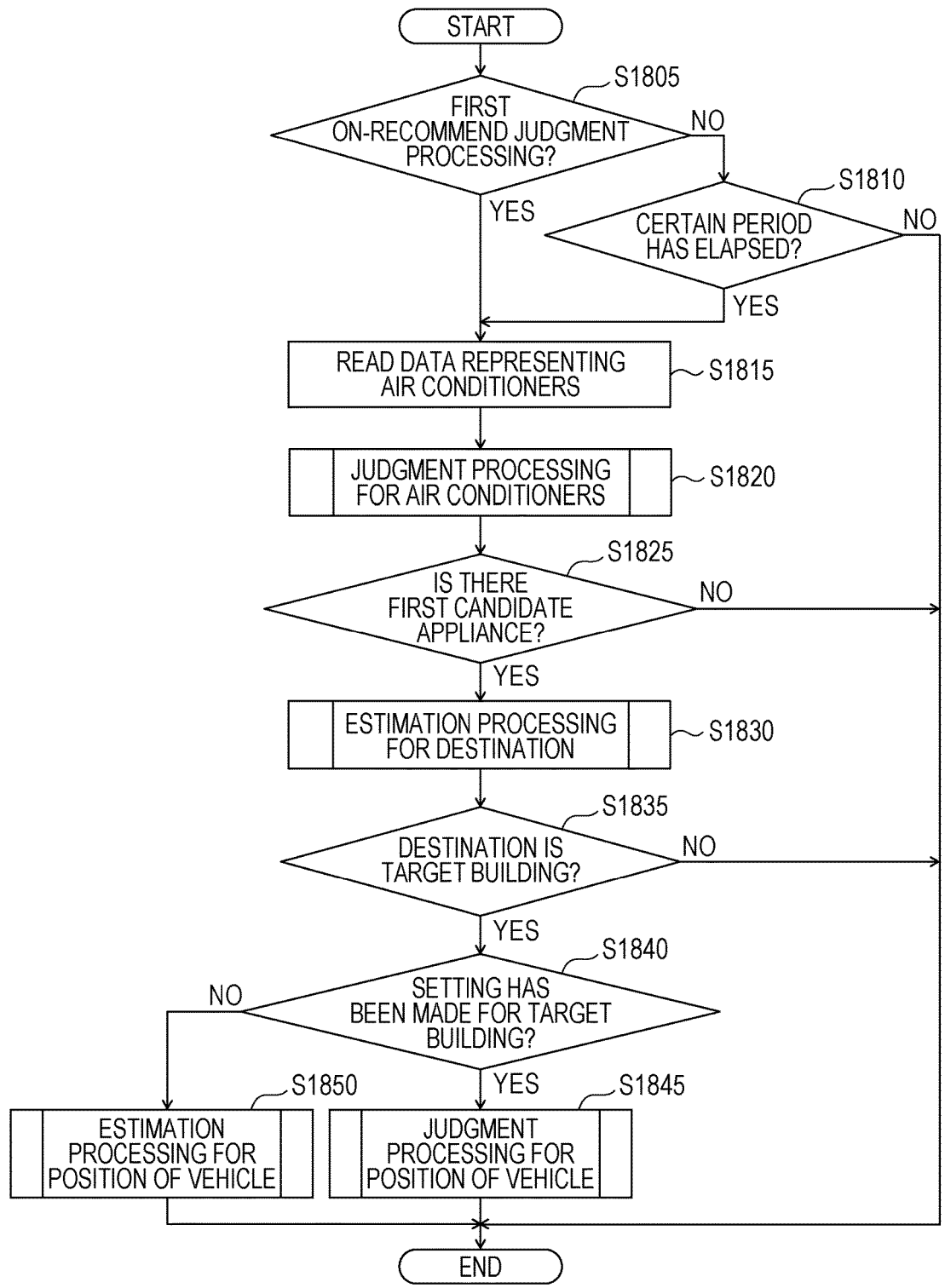
FIG. 49 is a schematic flowchart illustrating on-recommend judgment processing (twenty-seventh embodiment)

FIG. 49 is a schematic flowchart illustrating the on-recommend judgment processing. With reference to FIGS. 11, 12, 25, 30, 31, 35 to 37, 48, and 49, a description will be given of the on-recommend judgment processing.

In step S1805, the judging unit 112B of the communication terminal 100B judges whether or not the current processing is the first on-recommend judgment processing after the setting of the control region CR. If on-recommend judgment processing has already been executed after the setting of the control region CR, step S1810 is executed. If the current processing is the first on-recommend judgment processing, step S1815 is executed.

In step S1810, the judging unit 112B judges whether or not a certain period has elapsed since the execution of the previous on-recommend processing. If the certain period has elapsed since the execution of the previous on-recommend processing, step S1815 is executed. Otherwise, the communication terminal 100B ends the processing.

In step S1815, the control unit 111B causes the judging unit 112B to read data representing the air conditioners owned by the user (see FIG. 11) from the first storage unit 143. After that, step S1820 is executed.

In step S1820, the communication terminal 100B executes the judgment processing described above with reference to FIG. 35. After that, step S1825 is executed.

In step S1825, the judging unit 112B judges whether or not the result of the judgment processing in step S1820 indicates the existence of a first candidate appliance. If the result of the judgment processing indicates the existence of a first candidate appliance, step S1830 is executed. Otherwise, the communication terminal 100B ends the processing.

In step S1830, the server apparatus 300B executes the estimation processing described above with reference to FIG. 36. After the estimation processing, step S1835 is executed.

In step S1835, the judging unit 112B judges whether or not the destination of the vehicle VC is the target building HM. If the judging unit 112B judges that the destination of the vehicle VC is the target building HM, step S1840 is executed. Otherwise, the communication terminal 100B ends the processing.

In step S1840, the control unit 111B of the communication terminal 100B reads the data about the building HM from the second storage unit 144. If the user has made the setting described above with reference to FIGS. 12 and 25, step S1845 is executed. Otherwise, step S1850 is executed.

In step S1845, the series of processing operations described above with reference to FIG. 37 is executed.

In step S1850, the communication terminal 100B executes estimation processing for the position of the vehicle VC in cooperation with the server apparatus 300B.

Figure 50:
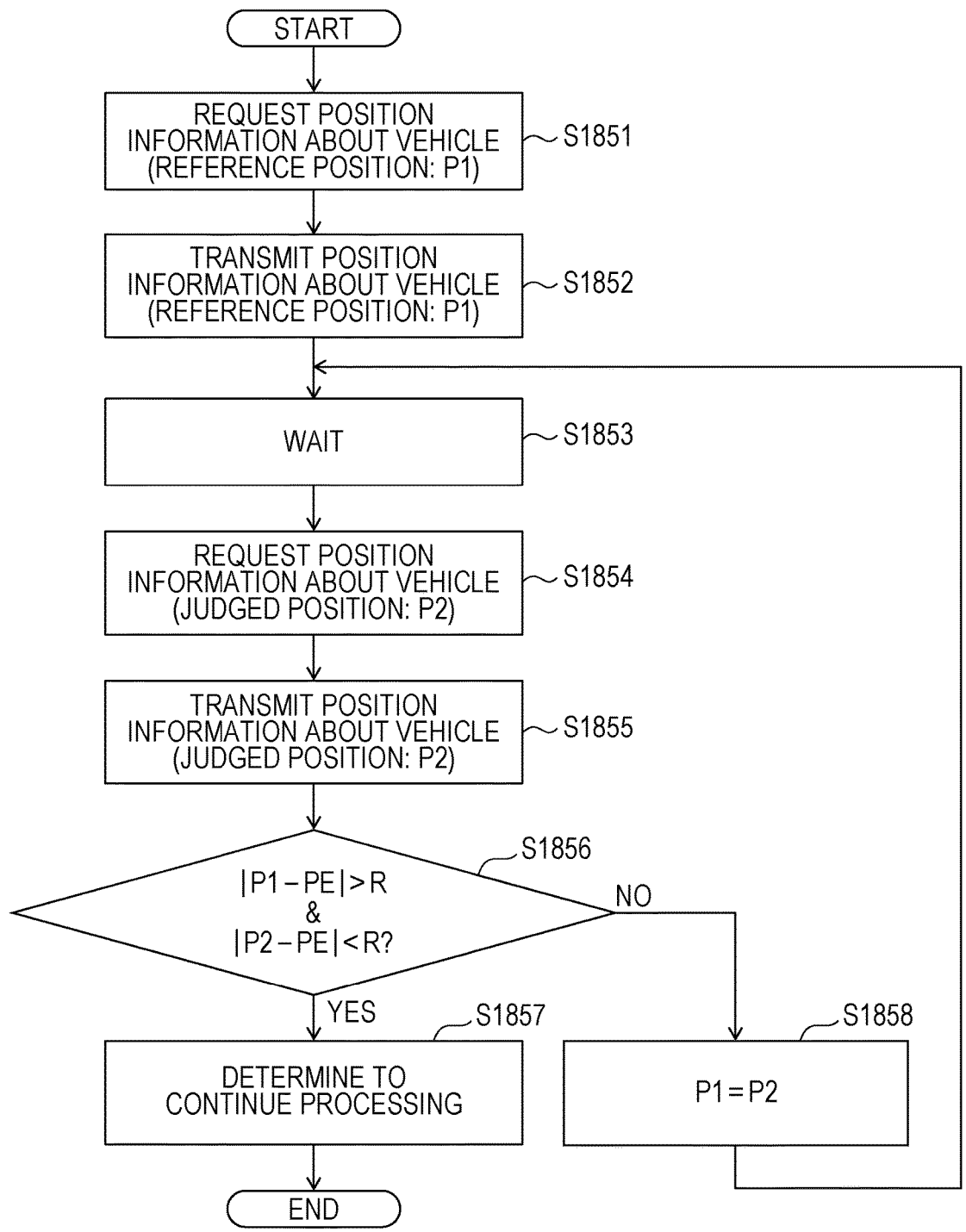
FIG. 50 is a schematic flowchart illustrating the processing in step S1850 of the flowchart illustrated in FIG. 49 (twenty-seventh embodiment)

FIG. 50 is a schematic flowchart illustrating the processing in step S1850 described above with reference to FIG. 49. With reference to FIGS. 30, 33, and 48 to 50, a further description will be given of the processing in step S1850.

In step S1851, the control unit 111B of the communication terminal 100B requests the second obtaining unit 151 to generate position information about the position of the vehicle. The communication terminal 100B handles the position of the vehicle represented by the position information obtained in step S1851 as a reference position. In FIG. 50, the reference position is represented by a symbol "P1". After the position information about the position of the vehicle has been generated, step S1852 is executed.

In step S1852, the control unit 310B of the communication terminal 100B causes the communication unit 131 of the communication terminal 100B to transmit the position information about the position of the vehicle. The position information about the position of the vehicle is transmitted from the communication unit 131 of the communication terminal 100B to the communication unit 320 of the server apparatus 300B. After that, step S1853 is executed.

In step S1853, the communication terminal 100B executes wait processing. A waiting time may be constant. Alternatively, the waiting time may be changed in accordance with the velocity of the vehicle. The principle of this embodiment is not limited by the waiting time. After the waiting time has elapsed, step S1854 is executed.

In step S1854, the control unit 111B of the communication terminal 100B requests again the second obtaining unit 151 to generate position information about the position of the vehicle. The communication terminal 100B handles the position of the vehicle represented by the position information obtained in step S1854 as a judged position. In FIG. 50, the judged position is represented by a symbol "P2". After the position information about the position of the vehicle has been generated, step S1855 is executed.

In step S1855, the control unit 310B of the communication terminal 100B causes the communication unit 131 of the communication terminal 100B to transmit the position information about the position of the vehicle. The position information about the position of the vehicle is transmitted from the communication unit 131 of the communication terminal 100B to the communication unit 320 of the server apparatus 300B. After that, step S1856 is executed.

In step S1856, the control unit 310B of the server apparatus 300B requests an estimated position of the building "PE" to the second estimating unit 342. If the difference between the position of the vehicle "P1" and the estimated position of the building "PE" is larger than the radius "R" of the control region, and if the difference between the position of the vehicle "P2" and the estimated position of the building "PE" is smaller than the radius "R" of the control region, step S1857 is executed. Otherwise, step S1858 is executed.

In step S1857, the control unit 310B of the server apparatus 300B causes the notifying unit 330 to generate a notification signal for making a notification that the vehicle has entered the control region. The notification signal is transmitted from the communication unit 320 of the server apparatus 300B to the communication unit 131 of the communication terminal 100B. In response to the notification signal, the control unit 111B of the communication terminal 100B determines to continue the processing. Thus, after step S1857, step S1220 described above with reference to FIG. 33 is executed.

In step S1858, the judging unit 112B determines to handle the judged position P2 as the reference position P1. After that, step S1853 is executed.

Twenty-Eighth Embodiment

In the on-recommend judgment processing described above in relation to the twenty-seventh embodiment, judgment processing for an air conditioner is executed before judgment processing for the position of the vehicle. Alternatively, judgment processing for an air conditioner may be executed after judgment processing for the position of the vehicle. In a twenty-eighth embodiment, a description will be given of other on-recommend judgment processing.

Figure 51:
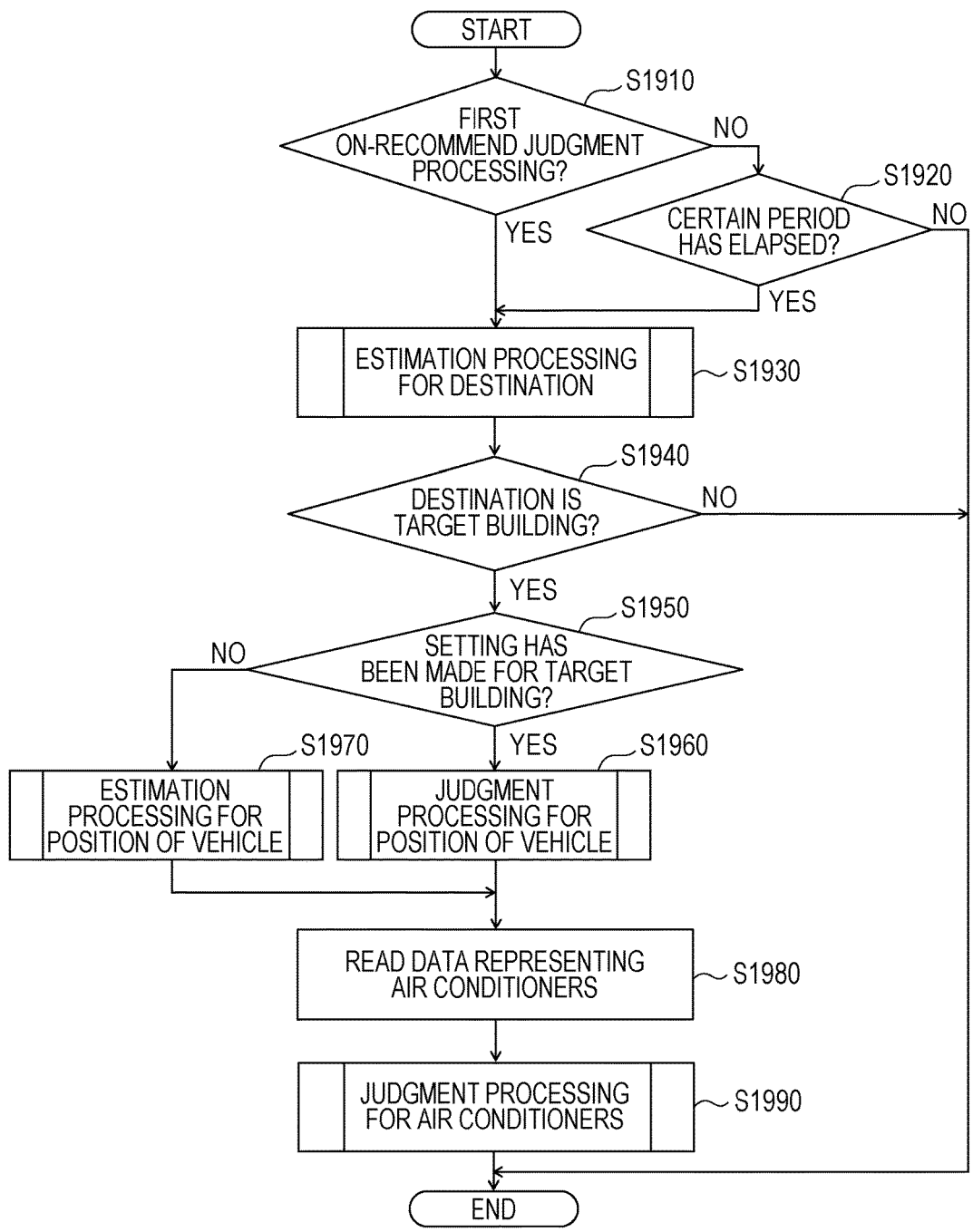
FIG. 51 is a schematic flowchart illustrating on-recommend judgment processing (twenty-eighth embodiment)

FIG. 51 is a schematic flowchart illustrating the on-recommend judgment processing. With reference to FIGS. 11, 12, 25, 30, 31, 35 to 37, and 49 to 51, a description will be given of the on-recommend judgment processing.

In step S1910, the judging unit 112B judges whether or not the current processing is the first on-recommend judgment processing after the setting of the control region CR. If on-recommend judgment processing has already been executed after the setting of the control region CR, step S1920 is executed. If the current processing is the first on-recommend judgment processing, step S1930 is executed.

In step S1920, the judging unit 112B judges whether or not a certain period has elapsed since the execution of the previous on-recommend processing. If the certain period has elapsed since the execution of the previous on-recommend processing, step S1930 is executed. Otherwise, the communication terminal 100B ends the processing.

In step S1930, the server apparatus 300B executes the estimation processing described above with reference to FIG. 36. After the estimation processing, step S1940 is executed.

In step S1940, the judging unit 112B judges whether or not the destination of the vehicle VC is the target building HM. If the judging unit 112B judges that the destination of the vehicle VC is the target building HM, step S1950 is executed. Otherwise, the communication terminal 100B ends the processing.

In step S1950, the control unit 111B of the communication terminal 100B reads data about the building HM from the second storage unit 144. If the user has made the setting described above with reference to FIGS. 12 and 25, step S1960 is executed. Otherwise, step S1970 is executed.

In step S1960, the series of processing operations described above with reference to FIG. 37 is executed. After that, step S1980 is executed.

In step S1970, the communication terminal 100B executes the estimation processing described above with reference to FIG. 50 in cooperation with the server apparatus 300B. After that, step S1980 is executed.

In step S1980, the control unit 111B causes the judging unit 112B to read the data representing the air conditioners owned by the user (see FIG. 11) from the first storage unit 143. After that, step S1990 is executed.

In step S1990, the communication terminal 100B executes the judgment processing described above with reference to FIG. 35.

Twenty-Ninth Embodiment

As a result of the on-recommend judgment processing described above with reference to the seventeenth embodiment, an air conditioner handled as a first candidate appliance is found. As a result of the on-recommend judgment processing, if an air conditioner handled as a first candidate appliance does not exist, the subsequent processing is not required. In a twenty-ninth embodiment, a description will be given of on-recommend processing for determining, in accordance with a result of on-recommend judgment processing, whether or not image display judgment processing is required.

Figure 52:
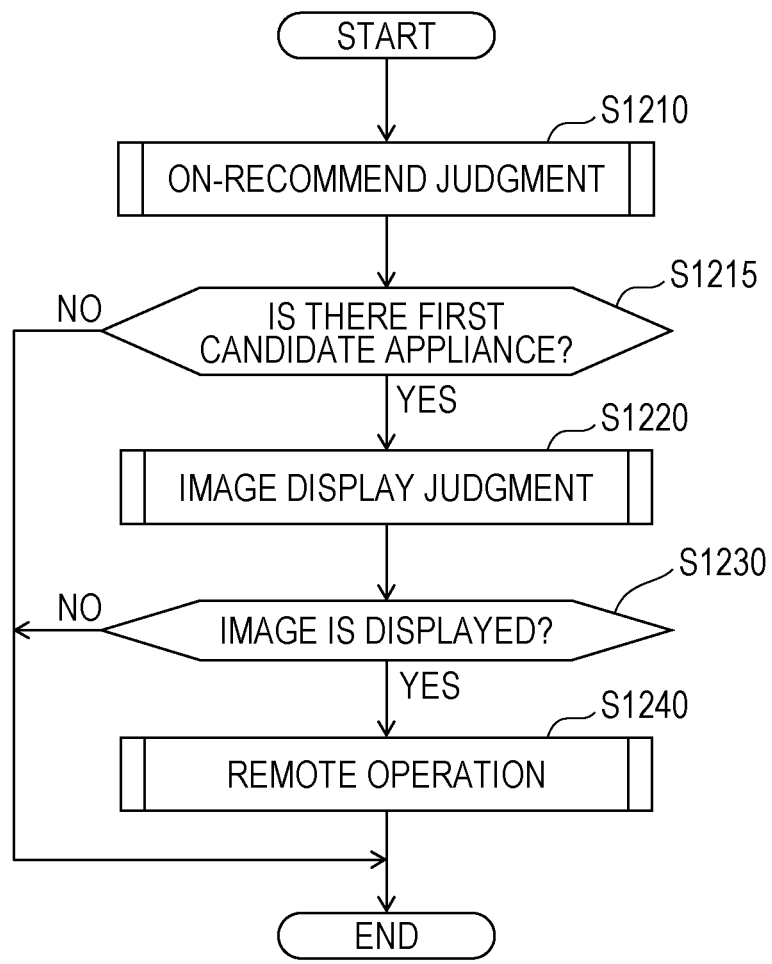
FIG. 52 is a schematic flowchart illustrating an exemplary operation of the communication terminal illustrated in FIG. 30 (twenty-ninth embodiment)

FIG. 52 is a schematic flowchart illustrating an exemplary operation of the communication terminal 100B. With reference to FIG. 52, a description will be given of an exemplary operation of the communication terminal 100B. In the twenty-ninth embodiment, the same step numbers as those in the sixteenth embodiment indicate that the processing operations denoted by the same step numbers are the same as those in the sixteenth embodiment. Thus, the description of the sixteenth embodiment is applied to these steps.

In step S1210, the communication terminal 100B executes on-recommend judgment processing. As described above in relation to the seventeenth embodiment, as a result of the on-recommend judgment processing, the communication terminal 100B is able to find an air conditioner handled as a first candidate appliance. After the on-recommend judgment processing, step S1215 is executed.

In step S1215, the communication terminal 100B judges whether or not an air conditioner handled as a first candidate appliance exists. If an air conditioner handled as a first candidate appliance does not exist, the communication terminal 100B ends the on-recommend processing. Otherwise, step S1220 is executed. The processing from step S1220 is the same as that in the sixteenth embodiment.

Thirtieth Embodiment

The principles of the above-described various embodiments enable an air conditioner in a target building to be operated before the user arrives at the building and also enable the environment in the building to be comfortable for the user. There is a probability that the user notices, after the user has gone out of the target building, that the air conditioner in the building is left operating. In a thirtieth embodiment, a description will be given of a user operation in off-recommend processing for turning off an air conditioner in a target building after the user has gone out of the building.

Figure 53A:
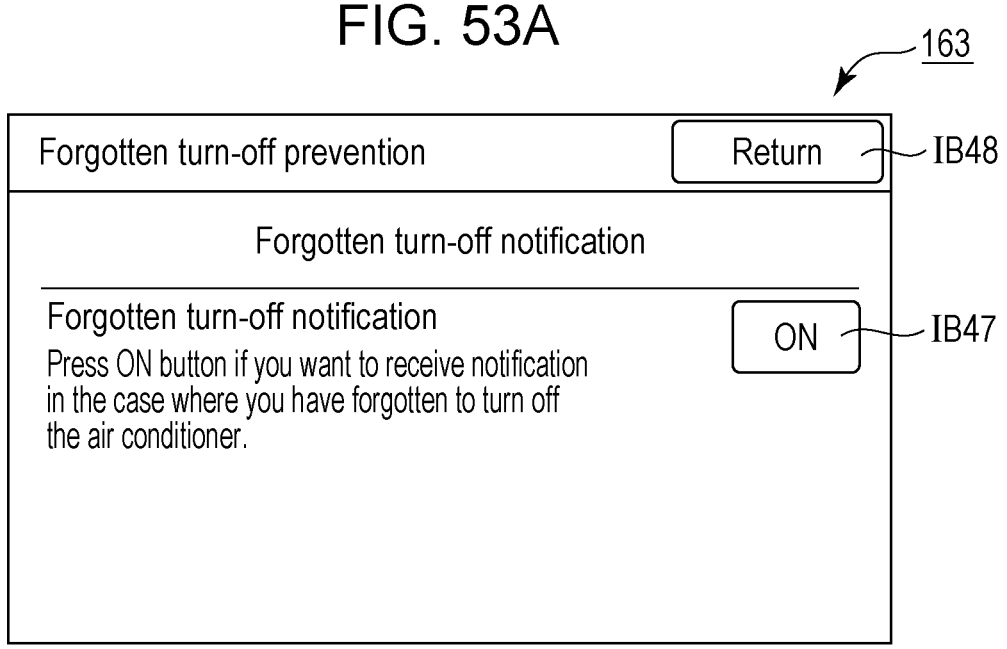
FIG. 53A illustrates an exemplary image displayed on a display unit of the communication terminal illustrated in FIG. 30 (thirtieth embodiment)
Figure 53B:
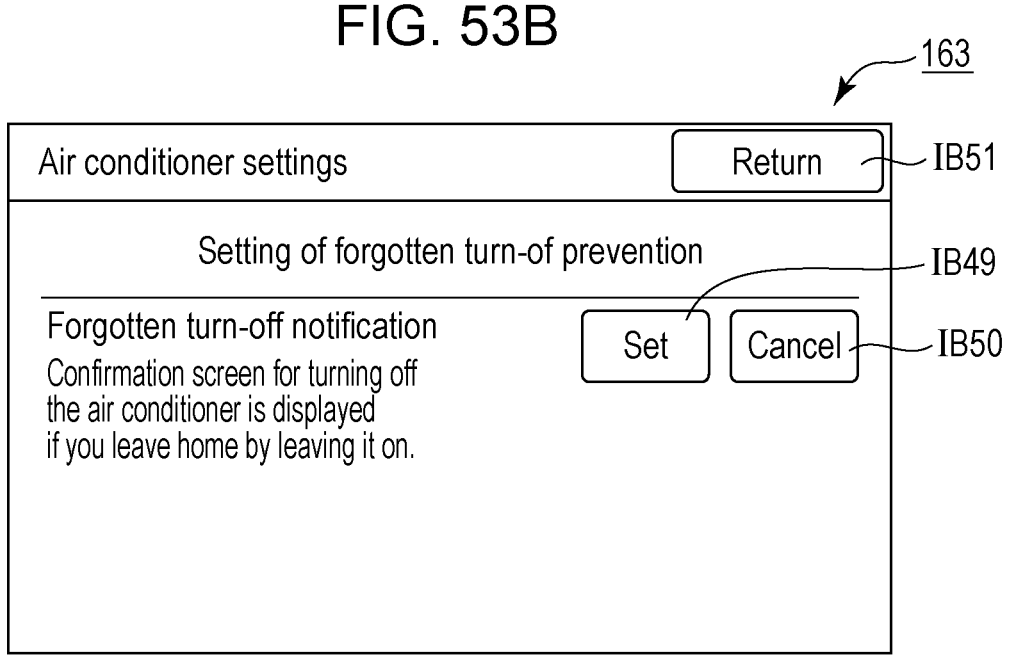
FIG. 53B illustrates an exemplary image displayed on the display unit of the communication terminal illustrated in FIG. 30 (thirtieth embodiment)

FIGS. 53A and 53B illustrate exemplary images displayed on the display unit 163 of the communication terminal 100B. With reference to FIGS. 8E, 30, 53A, and 53B, a description will be given of a user operation in off-recommend processing.

When the user performs a certain operation on an image displayed on the display unit 163 in accordance with the operation method described above in relation to the third embodiment, the display unit 163 is able to display the image illustrated in FIG. 8E. After that, when the user presses the icon button IB15, the display unit 163 displays the image illustrated in FIG. 53A or 53B.

The image illustrated in FIG. 53A includes two icon buttons IB47 and IB48. When the user presses the icon button IB47, the target air conditioner can be set as a candidate appliance to be operated that is subjected to off-recommend processing. When the user presses the icon button IB48, the display unit 163 displays the image illustrated in FIG. 8E again.

The image illustrated in FIG. 53B includes three icon buttons IB49, IB50, and IB51. When the user presses the icon button IB49, the target air conditioner can be set as a candidate appliance to be operated that is subjected to off-recommend processing. When the user presses the icon button IB50, the setting as a candidate appliance to be operated can be canceled. When the user presses the icon button IB51, the display unit 163 displays the image illustrated in FIG. 8E again.

FIG. 54 is a table showing exemplary data generated through operations performed on the images illustrated in FIGS. 53A and 53B. With reference to FIGS. 30 and 53A to 54, a description will be given of data generated through operations performed on the images illustrated in FIGS. 53A and 53B.

When the user presses the icon buttons IB47 and IB49, the setting as a candidate appliance to be operated is validated. When the user presses the icon button IB50, the setting as a candidate appliance to be operated is invalidated. FIG. 54 illustrates that the settings as candidate appliances to be operated are valid for the air conditioners installed in the living room, kitchen, child's room 1, and child's room 2. FIG. 54 illustrates that the setting as a candidate appliance to be operated is invalid for the air conditioner installed in the bed room.

Figures 55, 56:
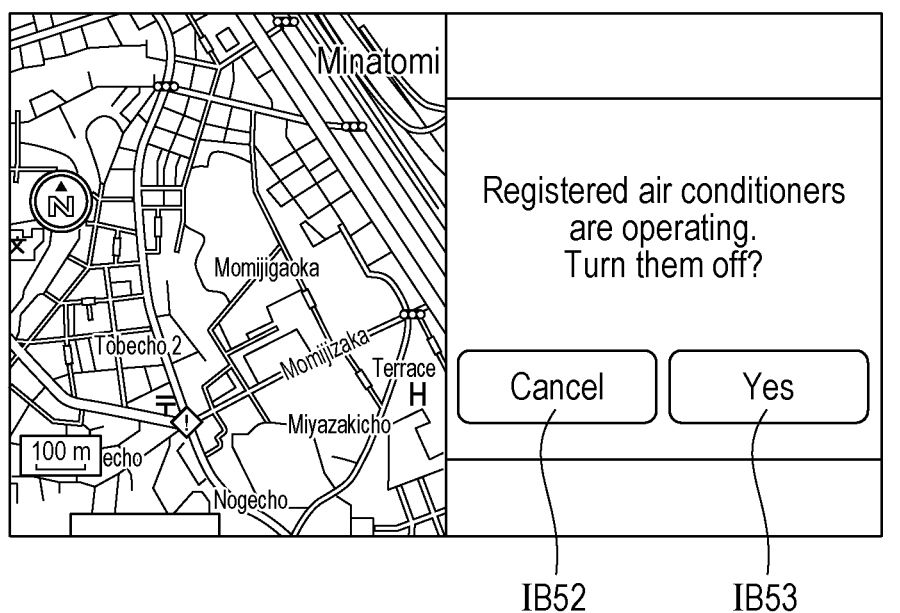
FIG. 55 is a table showing data about target appliances to be operated that serve as a destination of control data for stopping operation (thirtieth embodiment)
FIG. 56 illustrates an exemplary image displayed on the display unit of the communication terminal illustrated in FIG. 30 (thirtieth embodiment)

FIG. 55 is a table showing data about target appliances to be operated that serve as a destination of control data for stopping operation. With reference to FIGS. 30, 54, and 55, a description will be given of off-recommend processing.

The communication terminal 100B executes off-recommend processing, and selects a target appliance to be operated from among a plurality of air conditioners set as candidate appliances to be operated. FIG. 55 illustrates that the air conditioners installed in the living room and the child's room 1 are selected as target appliances to be operated from among the air conditioners installed in the living room, kitchen, child's room 1, and child's room 2 as a result of the off-recommend processing.

FIG. 56 illustrates an exemplary image displayed on the display unit 163 of the communication terminal 100B that is executing the off-recommend processing. With reference to FIGS. 30, 55, and 56, a further description will be given of the off-recommend processing.

After the target appliances to be operated have been determined, the communication terminal 100B causes the display unit 163 to display the image illustrated in FIG. 56. The image illustrated in FIG. 56 includes two icon buttons IB52 and IB53. When the user presses the icon button IB52, the communication terminal 100B ends the off-recommend processing without transmitting control data. When the user presses the icon button IB53, control data is transmitted to the air conditioners installed in the living room and child's room 1. As a result, the air conditioners installed in the living room and child's room 1 are able to stop the operation.

Figure 57A:
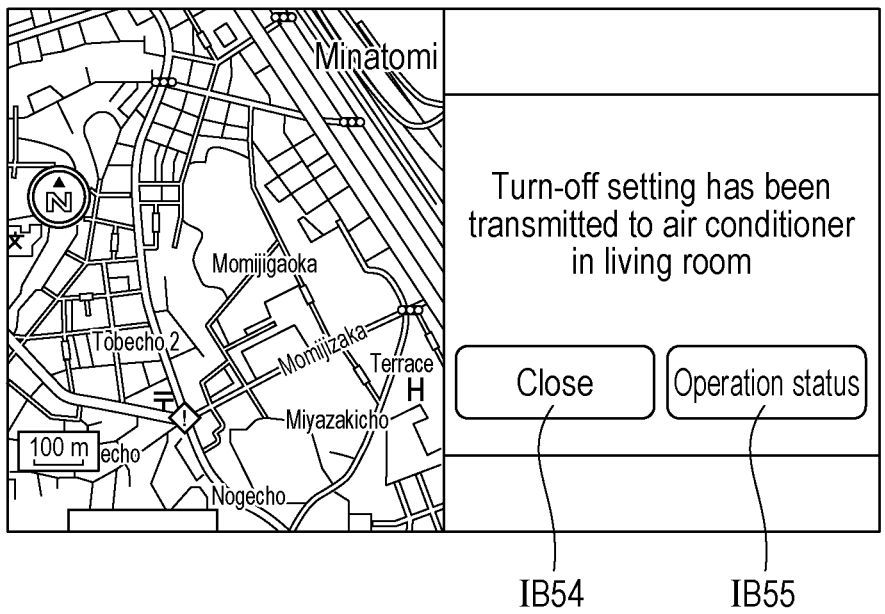
FIG. 57A illustrates an exemplary image displayed on the display unit of the communication terminal illustrated in FIG. 30 (thirtieth embodiment)
Figure 57B:
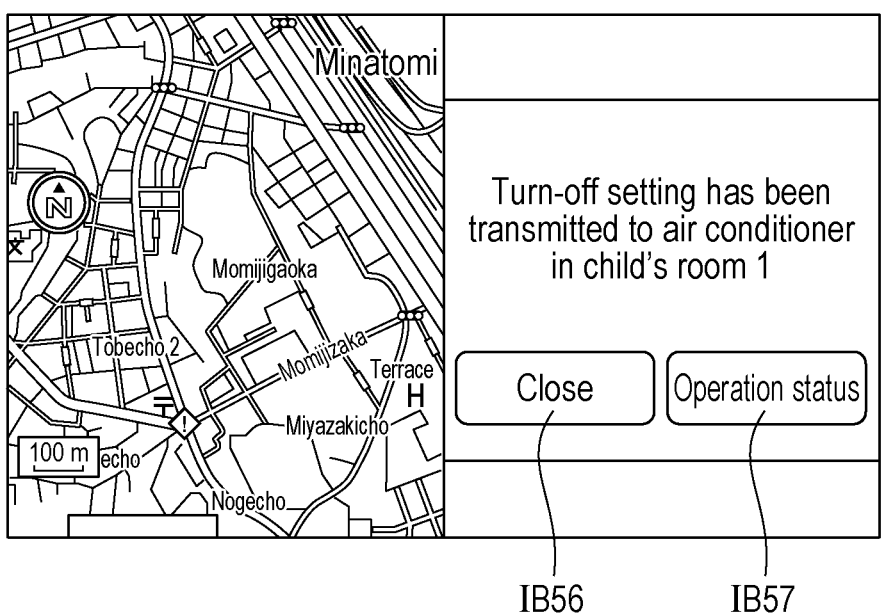
FIG. 57B illustrates an exemplary image displayed on the display unit of the communication terminal illustrated in FIG. 30 (thirtieth embodiment)

FIGS. 57A and 57B illustrate exemplary images displayed on the display unit 163 after the control data has been transmitted. With reference to FIGS. 30, 54, 57A, and 57B, a further description will be given of the off-recommend processing.

The display order in which images are displayed after the control data has been transmitted may be set depending on the principle described above with reference to the twenty-fourth embodiment. FIG. 54 illustrates the priorities assigned to the plurality of air conditioners in the off-recommend processing. The air conditioner installed in the living room is given a higher priority over the air conditioner installed in the child's room 1. Thus, the display unit 163 displays a transmission result of the control data for the air conditioner installed in the living room and then a transmission result of the control data for the air conditioner installed in the child's room 1. The priorities may be set by the user. Alternatively, the priorities may be automatically set by an application program. The principle of this embodiment is not limited by a specific method for determining priorities.

The image illustrated in FIG. 57A includes two icon buttons IB54 and IB55. When the user presses the icon button IB54, the display unit 163 displays the image illustrated in FIG. 57B. When the user presses the icon button IB55, the display unit 163 displays a detailed operation status of the air conditioner installed in the living room.

The image illustrated in FIG. 57B includes two icon buttons IB56 and IB57. When the user presses the icon button IB56, the user operation in the off-recommend processing ends. When the user presses the icon button IB57, the display unit 163 displays a detailed operation status of the air conditioner installed in the child's room 1.

Thirty-First Embodiment

As in the on-recommend processing, the user performs, for each of a plurality of air conditioners, setting processing for setting a candidate appliance to be operated for off-recommend processing. In a thirty-first embodiment, a description will be given of setting processing for setting a candidate appliance to be operated.

Figure 58:
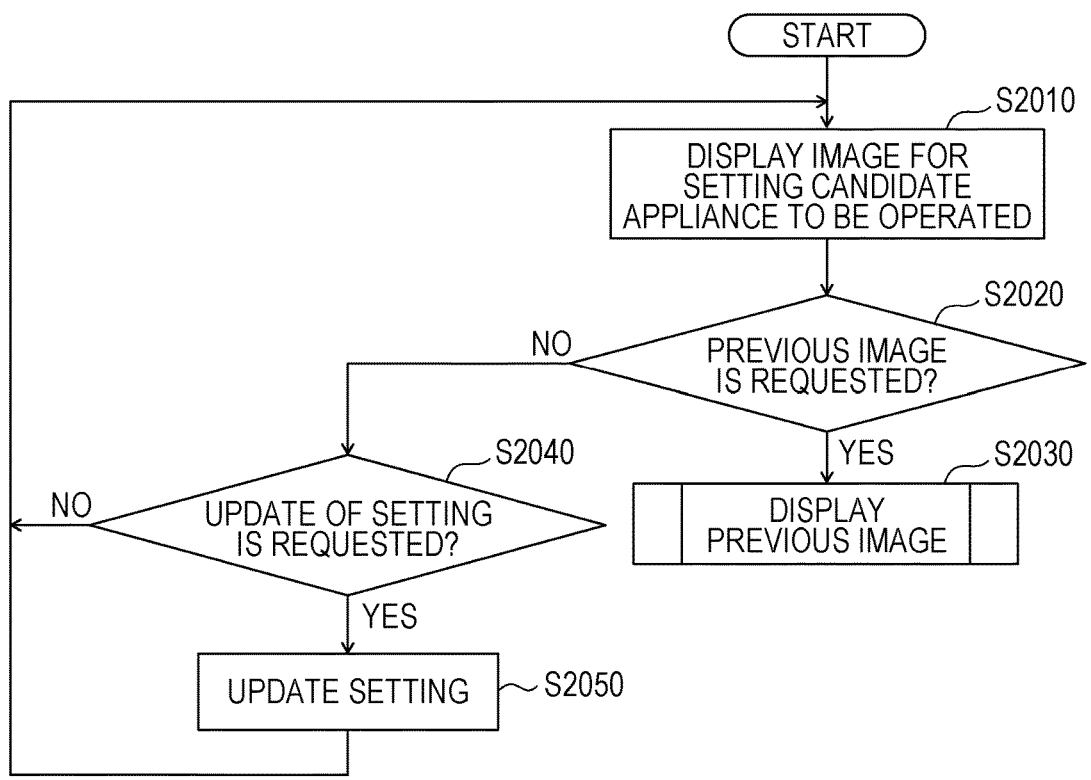
FIG. 58 is a schematic flowchart illustrating setting processing for setting a candidate appliance to be operated (thirty-first embodiment)

FIG. 58 is a schematic flowchart illustrating setting processing for setting a candidate appliance to be operated. With reference to FIGS. 8E, 9, 30, 53A to 54, and 58, a description will be given of the setting processing for setting a candidate appliance to be operated.

Upon step S270 described above with reference to FIG. 9 being executed, the processing in step S2010 is started. In step S2010, the display unit 163 displays the image illustrated in FIG. 53A or 53B. After that, step S2020 is executed.

In step S2020, the judging unit 112B judges whether or not the user has operated the input unit 164 and pressed the icon button IB48. If the judging unit 112B judges that the user has operated the input unit 164 and pressed the icon button IB48, step S2030 is executed. Otherwise, step S2040 is executed.

In step S2030, the display unit 163 displays the image illustrated in FIG. 8E. After that, the processing described above with reference to FIG. 9 is executed.

In step S2040, the judging unit 112B judges whether or not the user has operated the input unit 164 and pressed one of the icon buttons IB47, IB49, and IB50. If the judging unit 112B judges that the user has operated the input unit 164 and pressed one of the icon buttons IB47, IB49, and IB50, step S2050 is executed. Otherwise, step S2010 is executed.

In step S2050, the control unit 111B updates the data stored in the first storage unit 143 (see FIG. 54) in accordance with the user operation. After that, step S2010 is executed.

Thirty-Second Embodiment

The communication terminal described above in relation to the thirtieth embodiment displays, only once, an image for asking the user whether or not to execute a remote operation. If the communication terminal asks the user a plurality of times whether or not to execute a remote operation, a remote operation against user's intention is less likely to occur. In a thirty-second embodiment, a description will be given of a communication terminal that asks the user a plurality of times whether or not to execute a remote operation.

FIGS. 59A to 59D illustrate exemplary images that are presented to the user by the communication terminal 100B. With reference to FIGS. 30, 57A, 57B, and 59A to 59D, a description will be given of the communication terminal 100B.

Figure 59A:
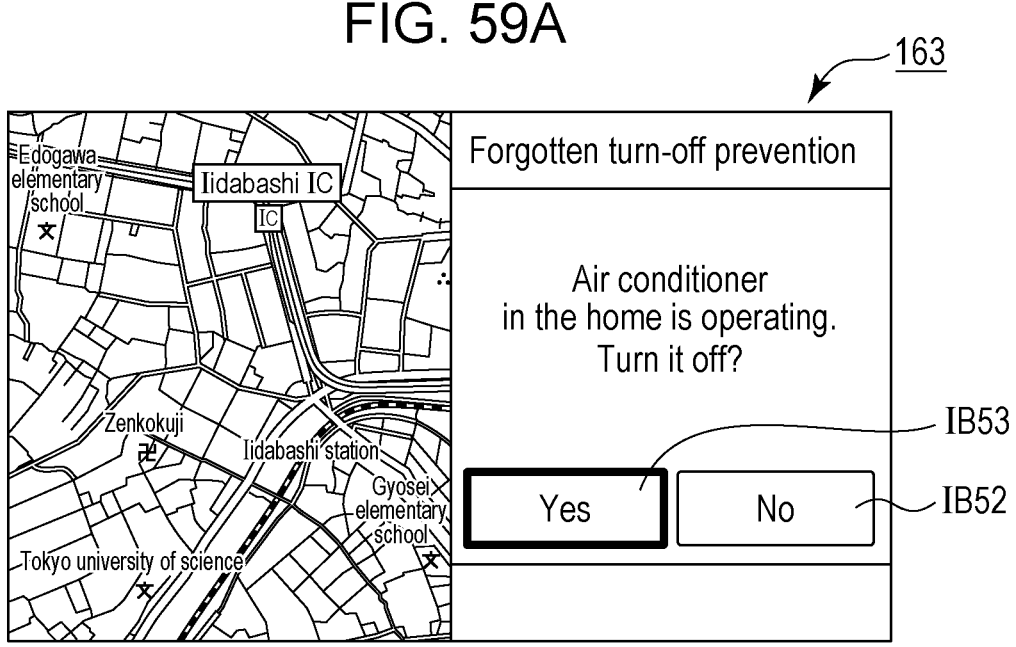
FIG. 59A illustrates an exemplary image that is presented to the user by the communication terminal illustrated in FIG. 30 (thirty-second embodiment)

As in the thirtieth embodiment, the communication terminal 100B presents the image illustrated in FIG. 59A to the user. When the user presses the icon button IB53, the communication terminal 100B presents the image illustrated in FIG. 59B to the user.

Figure 59B:
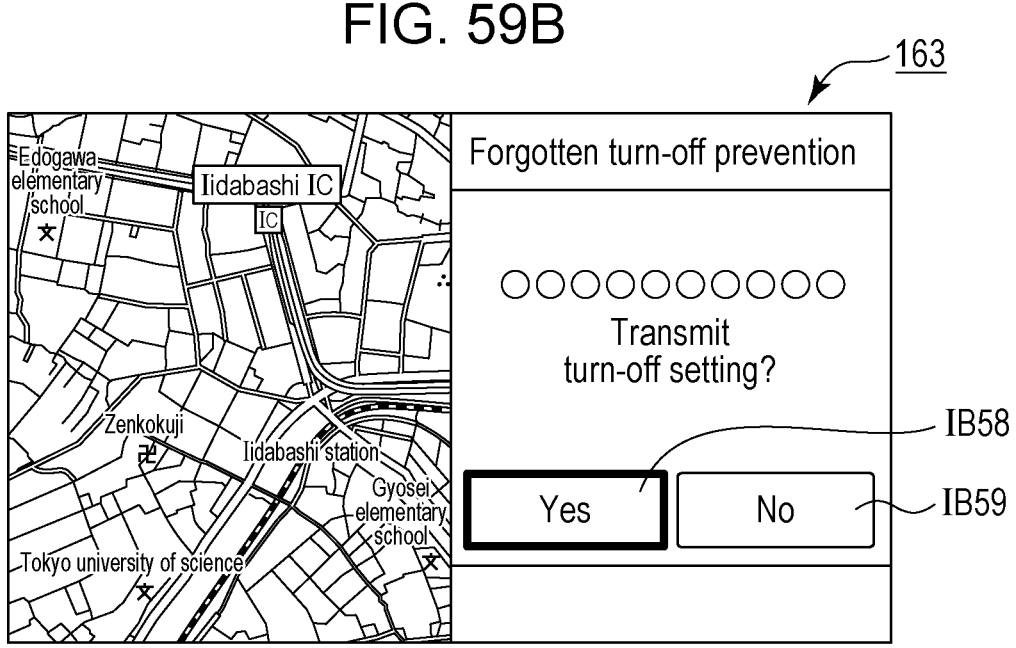
FIG. 59B illustrates an exemplary image that is presented to the user by the communication terminal illustrated in FIG. 30 (thirty-second embodiment)

The image illustrated in FIG. 59B includes two icon buttons IB58 and IB59. When the user presses the icon button IB58, the communication terminal 100B transmits control data. When the user presses the icon button IB59, the communication terminal 100B suspends the processing. Only when the user presses the icon button IB53 in the image illustrated in FIG. 59A and then presses the icon button IB58 in the image illustrated in FIG. 59B, control data is transmitted. Thus, a remote operation against user's intention is less likely to occur.

Figure 59C:
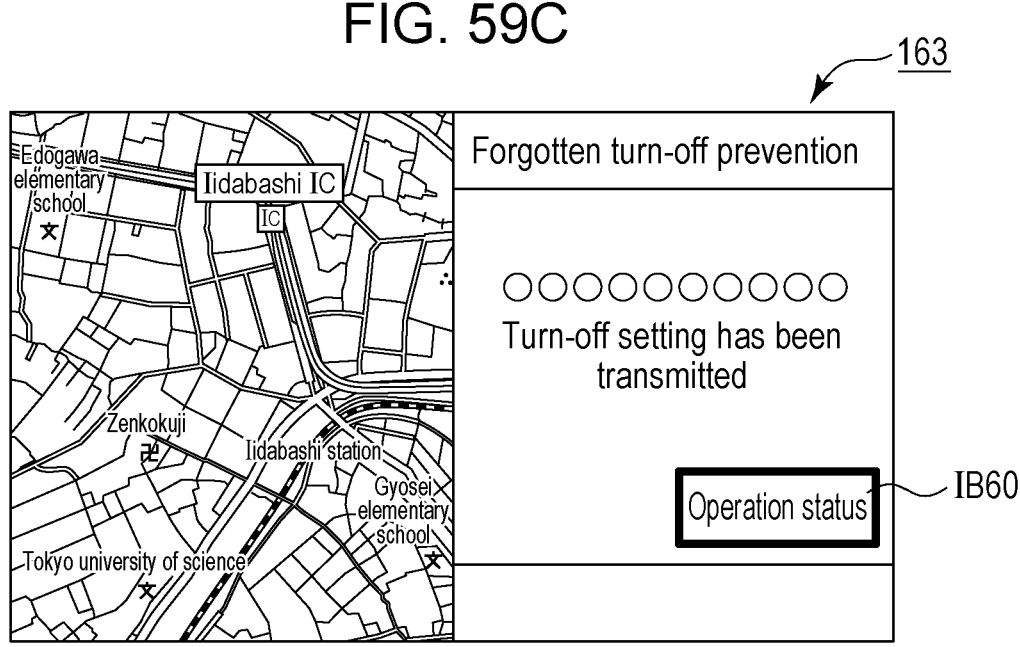
FIG. 59C illustrates an exemplary image that is presented to the user by the communication terminal illustrated in FIG. 30 (thirty-second embodiment)

When the communication terminal 100B receives notification data representing the receipt of the control data from the air conditioner, the communication terminal 100B presents the image illustrated in FIG. 59C to the user. The image illustrated in FIG. 59C includes an icon button IB60. The icon button IB60 corresponds to each of the icon button IB55 described above with reference to FIG. 57A and the icon button IB57 described above with reference to FIG. 57B.

Figure 59D:
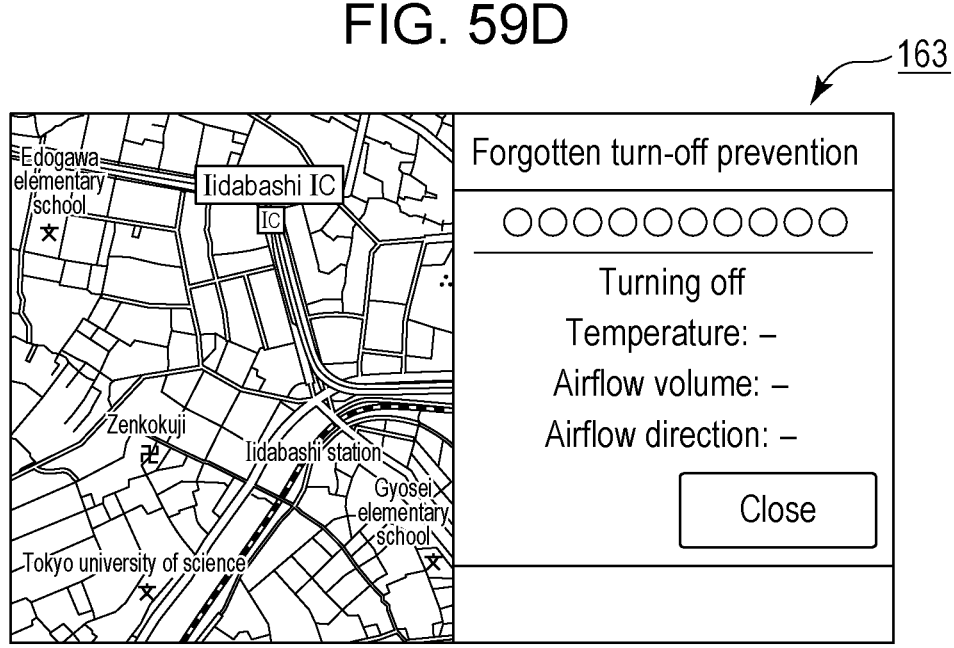
FIG. 59D illustrates an exemplary image that is presented to the user by the communication terminal illustrated in FIG. 30 (thirty-second embodiment)

When the user presses the icon button IB60, the communication terminal 100B presents the image illustrated in FIG. 59D to the user. Even if the user does not press the icon button IB60, the communication terminal 100B presents the image illustrated in FIG. 59D to the user after a certain period has elapsed since the display of the image illustrated in FIG. 59C. Thus, the user is able to check the operation status of the target air conditioner.

Thirty-Third Embodiment

As described above in relation to the thirtieth embodiment, off-recommend processing is executed to turn off an air conditioner in a building. Thus, it is preferable that off-recommend processing be executed in an early stage. In a thirty-third embodiment, a description will be given of off-recommend processing that is executed in an early stage.

FIG. 60 is a schematic flowchart illustrating start processing of off-recommend processing. With reference to FIGS. 30 and 60, a description will be given of the start processing of the off-recommend processing.

Step S2110 is executed until the communication terminal 100B receives power supply from the vehicle. When the communication terminal 100B receives power supply from the vehicle, step S2120 is executed.

In step S2120, the timing unit 114 starts measuring time. In FIG. 60, a time length measured by the timing unit 114 is represented by a symbol "TC". Information about the time length TC is output from the timing unit 114 to the judging unit 112B. After the information about the time length TC has been output from the timing unit 114 to the judging unit 112B, step S2130 is executed.

In step S2130, the judging unit 112B compares the time length TC represented by the information received from the timing unit 114 with a threshold period TP having a certain length. The comparison result is output from the judging unit 112B to the control unit 111B. If the comparison result indicates that the time length TC is shorter than the threshold period TP, step S2140 is executed. Otherwise, the processing ends.

In step S2140, the comparison result indicating that the time length TC is shorter than the threshold period TP is output from the judging unit 112B to the control unit 111B. The control unit 111B that has received the comparison result determines to execute off-recommend processing. As a result of the off-recommend processing, the user is able to turn off the air conditioner installed in the building from the vehicle.

In the off-recommend processing, the image illustrated in FIG. 56 or 59A is displayed. If the user does not press the icon button IB53 for a first certain period, step S2140 may end. In this case, the image illustrated in FIG. 56 or 59A may be erased from the display unit 163. The display unit 163 may display a map indicating a position where the vehicle is running, instead of the image illustrated in FIG. 56 or 59A. In this case, on the basis of the control principle described above in relation to the fifteenth embodiment, it is preferable that an application program be designed so that off-recommend processing is not executed during a second certain period from the time when the image illustrated in FIG. 56 or 59A is displayed.

Figure 61:
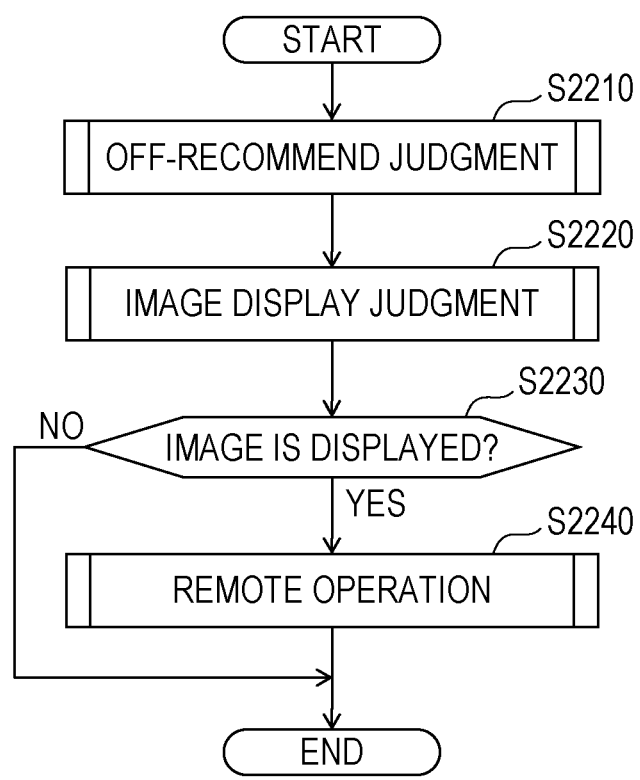
FIG. 61 is a schematic flowchart illustrating step S2140 (off-recommend processing) of the flowchart illustrated in FIG. 60 (thirty-third embodiment)

FIG. 61 is a schematic flowchart illustrating step S2140 (off-recommend processing) described above with reference to FIG. 60. With reference to FIGS. 30, 54, 56, 59A, 60, and 61, a description will be given of an exemplary operation of the off-recommend processing.

In step S2210, the communication terminal 100B executes off-recommend judgment processing. In the off-recommend judgment processing, setting of candidate appliances to be operated that has been described above with reference to FIG. 54 and confirmation processing for the position of the vehicle are executed. After the off-recommend judgment processing, step S2220 is executed.

In step S2220, the communication terminal 100B executes image display judgment processing. The image display judgment processing is executed to determine whether or not the image illustrated in FIG. 56 or 59A is to be displayed. After the image display judgment processing, step S2230 is executed.

In step S2230, if the image illustrated in FIG. 56 or 59A is displayed, step S2240 is executed. Otherwise, the communication terminal 100B ends the processing.

In step S2240, the communication terminal 100B starts remote operation processing. As a result, the user is able to stop the operation of the air conditioner from the vehicle.

Thirty-Fourth Embodiment

In the off-recommend judgment processing described above in relation to the thirty-third embodiment, the communication terminal executes various processing operations in cooperation with the server apparatus. In the thirty-fourth embodiment, a description will be given of off-recommend judgment processing.

Figure 62:
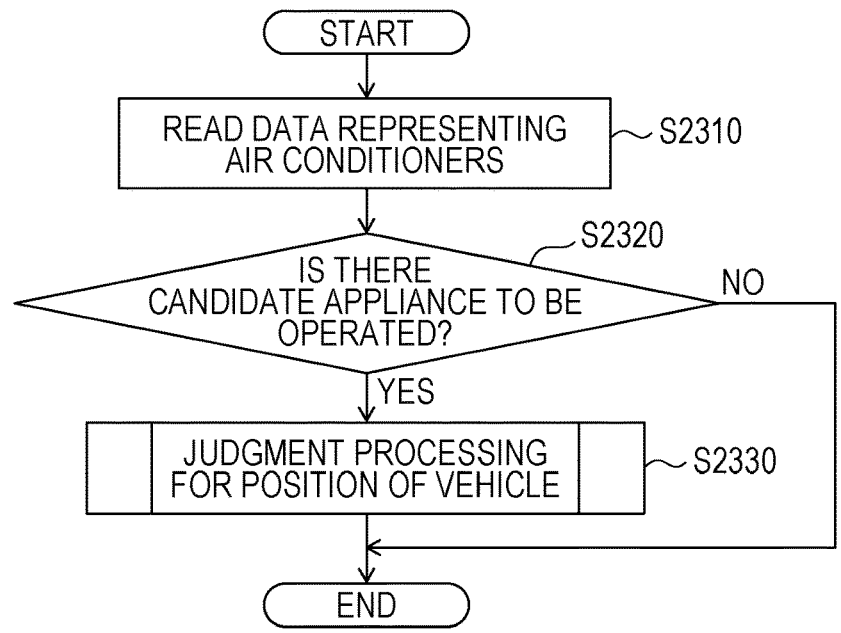
FIG. 62 is a schematic flowchart illustrating off-recommend judgment processing (thirty-fourth embodiment)

FIG. 62 is a schematic flowchart illustrating off-recommend judgment processing. With reference to FIGS. 52A to 54 and 62, a description will be given of the off-recommend judgment processing.

In step S2310, the control unit 111B causes the judging unit 112B to read the data representing the air conditioners owned by the user (see FIG. 54) from the first storage unit 143. After that, step S2320 is executed.

In step S2320, the judging unit 112B judges whether or not a candidate appliance to be operated exists. If the user has not set, as a candidate appliance to be operated, any of the air conditioners installed in the living room, kitchen, bed room, child's room 1, and child's room 2 by using the image described above with reference to FIG. 53A or 53B, the judging unit 112B judges that no candidate appliances to be operated exist. Alternatively, if the user has cancelled the setting of a candidate appliance to be operated for the air conditioners installed in the living room, kitchen, bed room, child's room 1, and child's room 2 by pressing the icon button IB50 described above with reference to FIG. 53B, the judging unit 112B judges that no candidate appliances to be operated exist. In these cases, the communication terminal 100B ends the processing. Otherwise, step S2330 is executed.

In step S2330, processing for judging the position of the vehicle VC relative to the position of the building is executed.

Figure 63:
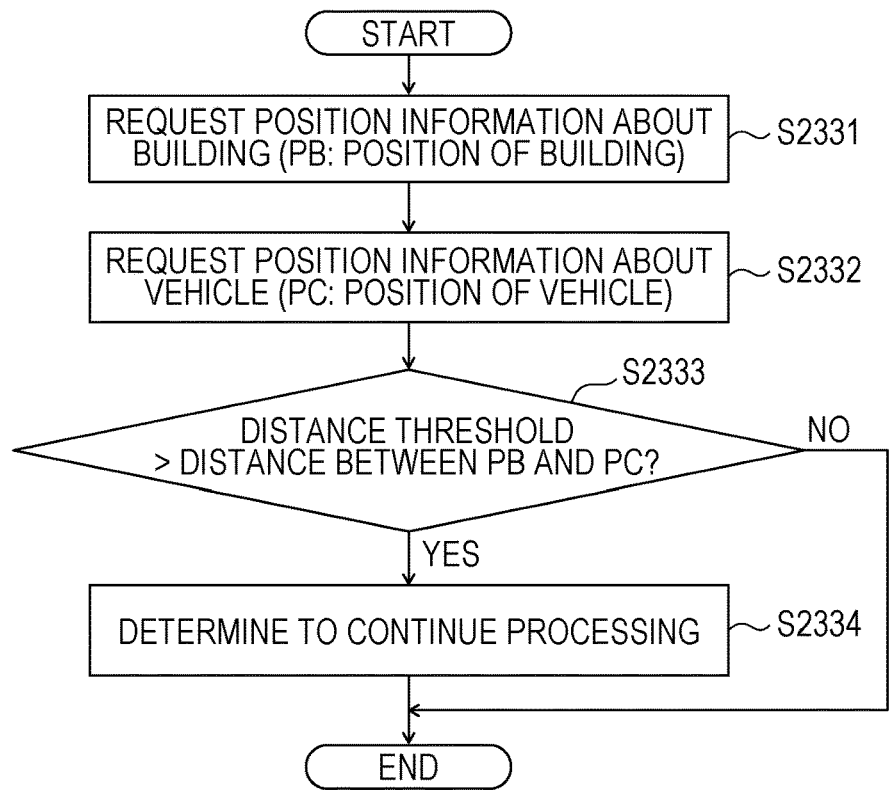
FIG. 63 is a schematic flowchart illustrating the processing in step S2330 of the flowchart illustrated in FIG. 62 (thirty-fourth embodiment)

FIG. 63 is a schematic flowchart illustrating the processing in step S2330 described above with reference to FIG. 62. With reference to FIGS. 30, 62, and 63, a further description will be given of the off-recommend judgment processing.

In step S2331, the control unit 111B of the communication terminal 100B reads position information about the position of the target building from the second storage unit 144. In FIG. 63, the position of the building is represented by a symbol "PB". After the position information about the position of the target building has been read, step S2332 is executed.

In step S2332, the control unit 111B of the communication terminal 100B requests the second obtaining unit 151 to generate position information about the position of the vehicle. In FIG. 63, the position of the vehicle is represented by a symbol "PC". After the position information about the position of the vehicle has been generated, step S2333 is executed.

In step S2333, the judging unit 112B of the communication terminal 100B judges whether or not the distance between the position of the vehicle "PC" and the position of the building "PB" is under a predetermined distance threshold. If the distance threshold is larger than the distance between the position of the vehicle "PC" and the position of the building "PB", step S2334 is executed. Otherwise, the communication terminal 100B ends the off-recommend processing.

In step S2334, the control unit 111B of the communication terminal 100B determines to continue the processing. Thus, after step S2334, step S2220 described above with reference to FIG. 33 is executed.

Thirty-Fifth Embodiment

In the image display judgment processing described above in relation to the thirty-third embodiment, it is determined whether or not to display an image prompting the user to judge whether or not to execute a remote operation. In a thirty-fifth embodiment, a description will be given of the image display judgment processing.

Figure 64:
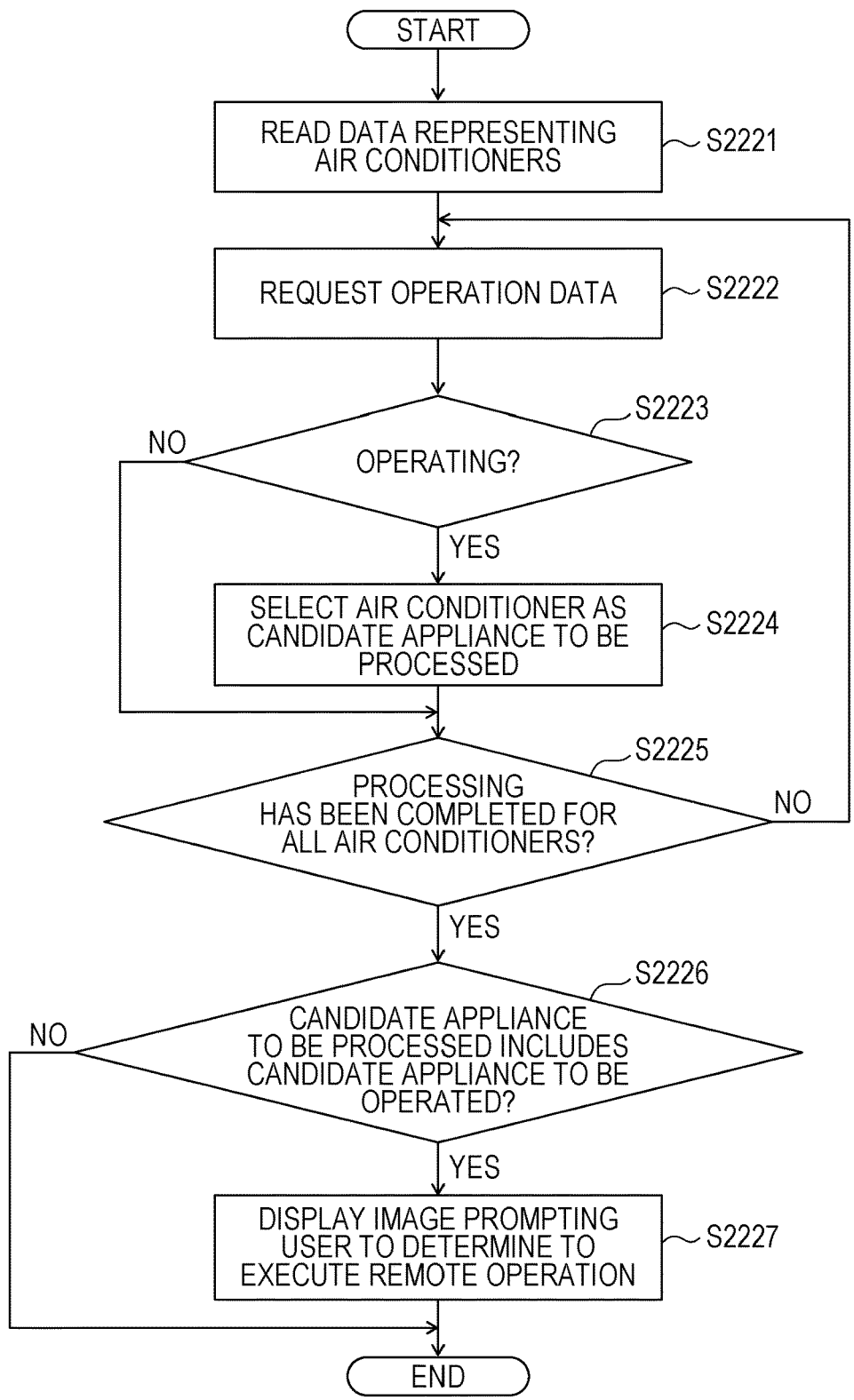
FIG. 64 is a schematic flowchart illustrating image display judgment processing (thirty-fifth embodiment)

FIG. 64 is a schematic flowchart illustrating the image display judgment processing. With reference to FIGS. 28 to 30, 54, 56, 59A, 61, and 64, a description will be given of the image display judgment processing.

In step S2221, the control unit 111B of the communication terminal 100B reads the data illustrated in FIG. 54 from the first storage unit 143. After that, step S2222 is executed.

In step S2222, the control unit 111B of the communication terminal 100B generates a request signal for requesting operation data. The control unit 111B of the communication terminal 100B causes the communication unit 131 of the communication terminal 100B to output the request signal. The request signal is transmitted from the communication unit 131 of the communication terminal 100B to the communication unit 420 of the air conditioner 400A via the server apparatus 300A. When the communication unit 420 of the air conditioner 400A receives the request signal, the control unit 410 of the air conditioner 400A causes the operation data generating unit 450 to generate operation data. The control unit 410 of the air conditioner 400A causes the communication unit 420 of the air conditioner 400A to transmit the operation data. The operation data is transmitted from the communication unit 420 of the air conditioner 400A to the communication unit 131 of the communication terminal 100B via the server apparatus 300A. After that, step S2223 is executed.

In step S2223, the control unit 111B causes the judging unit 112B to judge, on the basis of the operation data, whether or not the air conditioner 400A as the processing target is operating. If the judging unit 112B judges that the air conditioner 400A as the processing target is operating, step S2224 is executed. Otherwise, step S2225 is executed.

In step S2224, the judging unit 1112B determines to handle the air conditioner 400A as the processing target as a candidate appliance to be processed that is subjected to further processing. After that, step S2225 is executed.

In step S2225, the judging unit 112B judges whether or not the above-described processing has been completed for all the air conditioners 400A represented by the data illustrated in FIG. 54. If the above-described processing has been completed for all the air conditioners 400A represented by the data illustrated in FIG. 54, step S2226 is executed. Otherwise, step S2222 is executed. If the air conditioners illustrated in FIG. 38A are selected as first candidate appliances, and if the above-described processing has been completed for the air conditioners installed in the living room, kitchen, and child's room 2, step S2226 is executed.

In step S2226, the judging unit 112B judges whether or not an air conditioner selected as a candidate appliance to be processed includes an air conditioner set by the user as a candidate appliance to be operated. If an air conditioner selected as a candidate appliance to be processed includes the air conditioner 400A set by the user as a candidate appliance to be operated, the judging unit 112B temporarily stores, in the first storage unit 143, the air conditioner selected as a candidate appliance to be processed and set by the user as a candidate appliance to be operated. After that, step S2227 is executed. Otherwise, the control unit 111B suspends the processing.

In step S2227, the control unit 111B causes the display unit 163 to display the image illustrated in FIG. 56 or 59A. After that, step S2230 described above with reference to FIG. 61 is executed.

Thirty-Sixth Embodiment

In the image display judgment processing described above in relation to the thirty-fifth embodiment, if the communication terminal is able to determine a target appliance to be operated, processing for remotely operating the target appliance is executed. In a thirty-sixth embodiment, a description will be given of processing for remotely operating a target appliance to be operated.

Figure 65:
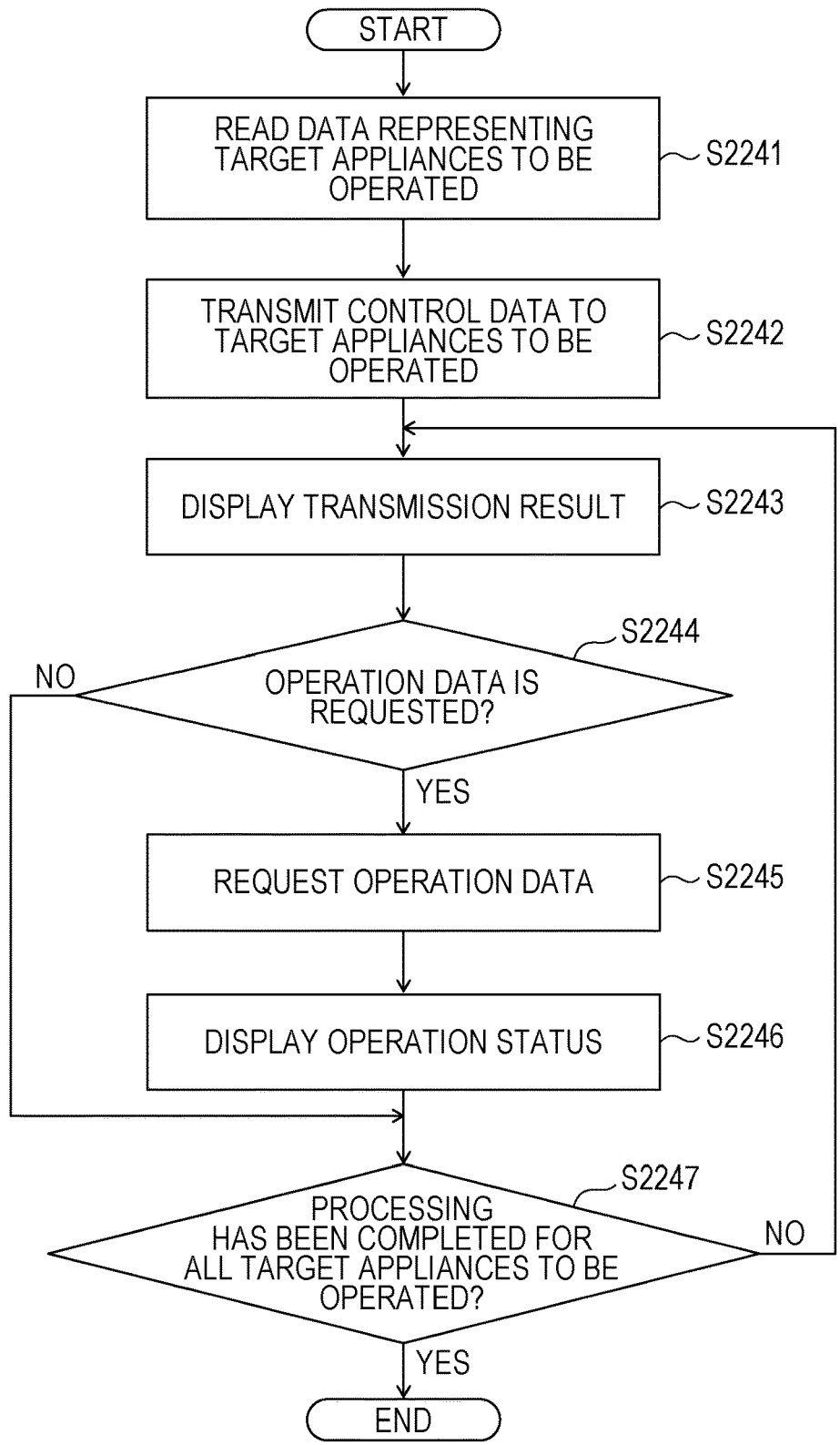
FIG. 65 is a schematic flowchart illustrating the processing executed in step S2240 of the flowchart illustrated in FIG. 61 (thirty-sixth embodiment)

FIG. 65 is a schematic flowchart illustrating the processing executed in step S2240 described above with reference to FIG. 61. With reference to FIGS. 28 to 30, 56 to 57B, 59A, 61, and 65, a description will be given of the processing executed in step S2240.

In step S2241, if the user presses the icon button IB53, the control unit 111B of the communication terminal 100B reads data representing all the air conditioners 400A selected as target appliances to be operated from the first storage unit 143. The data read from the first storage unit 143 may include setting data defining the operations of the air conditioners 400A selected as target appliances to be operated. After the control unit 111B has read the data representing all the air conditioners 400A selected as target appliances to be operated, step S2242 is executed.

In step S2242, the control unit 111B of the communication terminal 100B causes the communication unit 131 of the communication terminal 100B to transmit the read setting data as control data. The control data is transmitted from the communication unit 131 of the communication terminal 100B to the communication unit 420 of the air conditioner 400A via the server apparatus 300A. When the communication unit 420 of the air conditioner 400A receives the control data, the operation unit 440 of the air conditioner 400A stops in accordance with the control data. The notifying unit 460 of the air conditioner 400A generates notification data indicating that the control data has been received. The control unit 410 of the air conditioner 400A causes the communication unit 420 of the air conditioner 400A to transmit the notification data. The notification data is transmitted from the communication unit 420 of the air conditioner 400A to the communication unit 131 of the communication terminal 100B via the server apparatus 300A. After that, step S2243 is executed.

In step S2243, the control unit 111B of the communication terminal 100B causes the display unit 163 to display images representing a communication result of the control data (see FIGS. 57A and 57B) in accordance with the notification data. After that, step S2244 is executed.

In step S2244, the communication terminal 100B judges whether or not the user requests operation data. If the user requests operation data (if the user presses the icon buttons IB55 and IB57 (see FIGS. 57A and 57B), step S2245 is executed. Otherwise, step S2247 is executed.

In step S2245, the control unit 111B of the communication terminal 100B generates a request signal for requesting operation data. The control unit 111B of the communication terminal 100B causes the communication unit 131 of the communication terminal 100B to transmit the request signal. The request signal is transmitted from the communication unit 131 of the communication terminal 100B to the communication unit 420 of the air conditioner 400A via the server apparatus 300A. In response to the request signal, the control unit 410 of the air conditioner 400A causes the operation data generating unit 450 to generate operation data. The control unit 410 of the air conditioner 400A causes the communication unit 420 of the air conditioner 400A to transmit the operation data. The operation data is transmitted from the communication unit 420 of the air conditioner 400A to the communication unit 131 of the communication terminal 100B via the server apparatus 300A. After that, step S2246 is executed.

In step S2246, the control unit 111B causes the display unit 163 to display the operation status represented by the operation data. After that, step S2247 is executed.

In step S2247, the judging unit 112B of the communication terminal 100B judges whether or not the above-described processing has been executed on all the target appliances to be operated.

Thirty-Seventh Embodiment

If the user has not set the position of the building, the communication terminal may end off-recommend processing. In a thirty-seventh embodiment, a description will be given of off-recommend judgment processing that is ended if the user has not set the position of the building.

Figure 66:
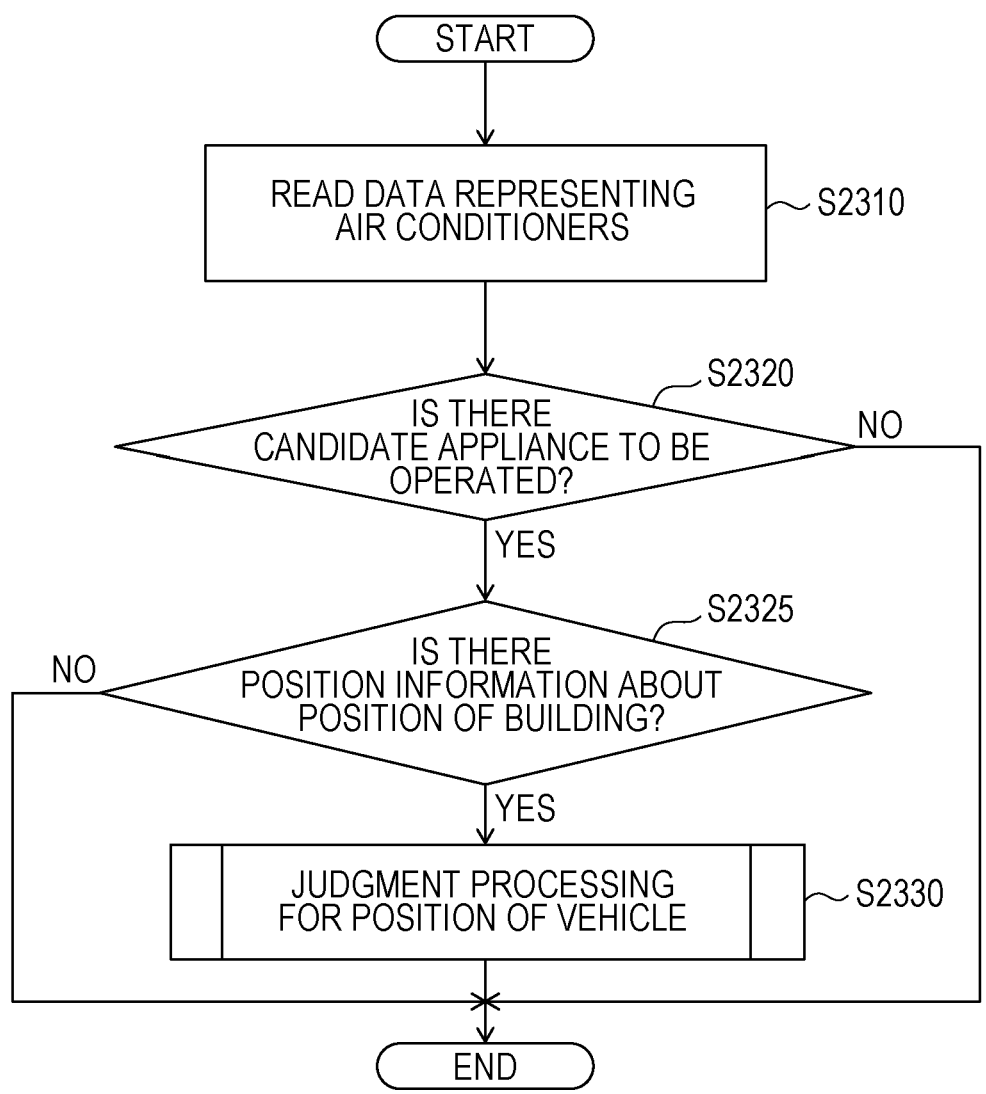
FIG. 66 is a schematic flowchart illustrating off-recommend judgment processing (thirty-seventh embodiment)

FIG. 66 is a schematic flowchart illustrating off-recommend judgment processing. With reference to FIG. 66, a description will be given of the off-recommend judgment processing. In the thirty-seventh embodiment, the same step numbers as those in the thirty-fourth embodiment indicate that the processing operations denoted by the same step numbers are the same as those in the thirty-fourth embodiment. Thus, the description of the thirty-fourth embodiment is applied to these steps.

As in the thirty-fourth embodiment, the off-recommend judgment processing includes steps S2310, S2320, and S2330. The description of the thirty-fourth embodiment is applied to these steps.

Step S2325 is executed between steps S2320 and S2330. In step S2320, the control unit 111B of the communication terminal 100B reads position information about the position of the target building from the second storage unit 144. If the control unit 111B fails in reading position information, the off-recommend processing ends. Otherwise, step S2330 is executed.

Thirty-Eighth Embodiment

If the user has not set the position of the building, off-recommend processing may be continued in accordance with an estimated position of the building by using the server apparatus described above in relation to the twenty-sixth embodiment. In a thirty-eighth embodiment, a description will be given of off-recommend judgment processing using an estimated position of the building.

Figure 67:
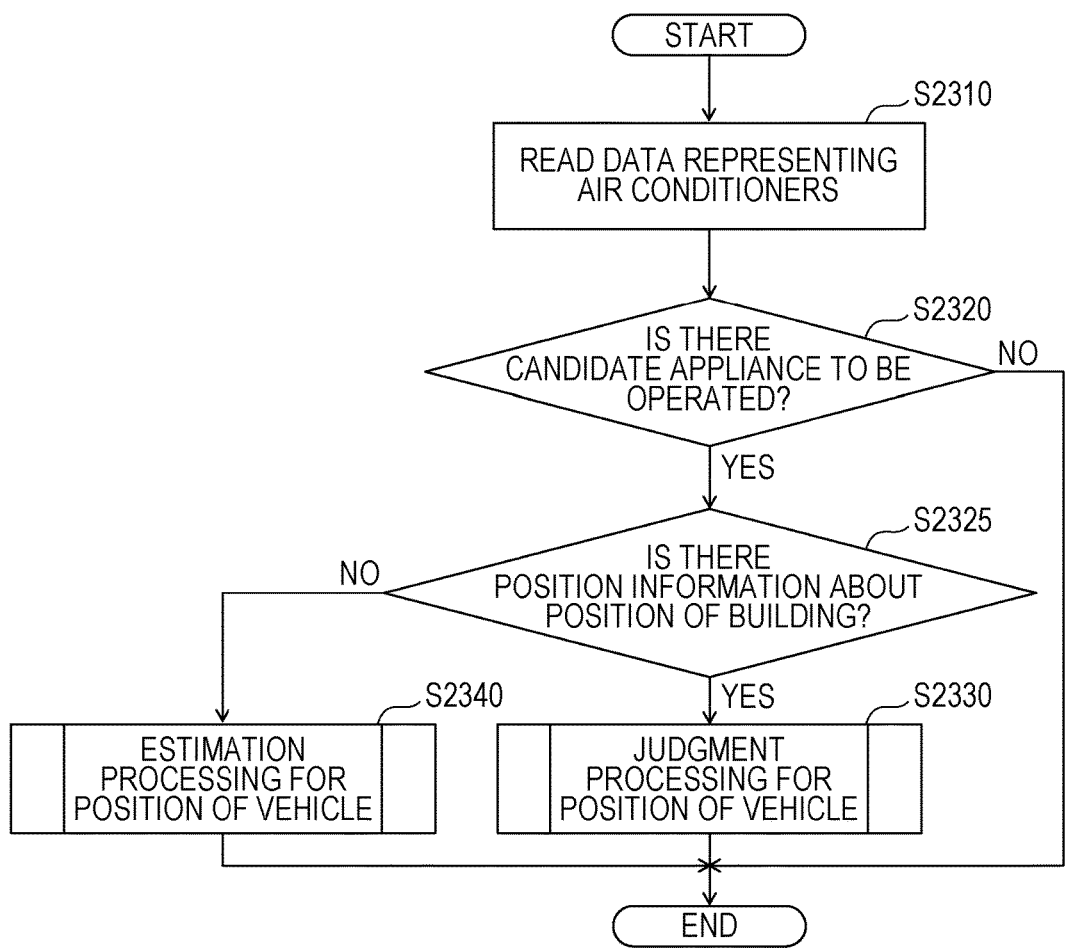
FIG. 67 is a schematic flowchart illustrating off-recommend judgment processing (thirty-eighth embodiment)

FIG. 67 is a schematic flowchart illustrating off-recommend judgment processing. With reference to FIG. 67, a description will be given of the off-recommend judgment processing. In the thirty-eighth embodiment, the same step numbers as those in the thirty-seventh embodiment indicate that the processing operations denoted by the same step numbers are the same as those in the thirty-seventh embodiment. Thus, the description of the thirty-seventh embodiment is applied to these steps.

As in the thirty-seventh embodiment, the off-recommend judgment processing includes steps S2310, S2320, S2330, and S2325. The description of the thirty-seventh embodiment is applied to these steps.

In step S2325, if the control unit 111B fails in reading position information, step S2340 is executed. In step S2340, estimation processing of estimating the position of the building is executed.

Figure 68:
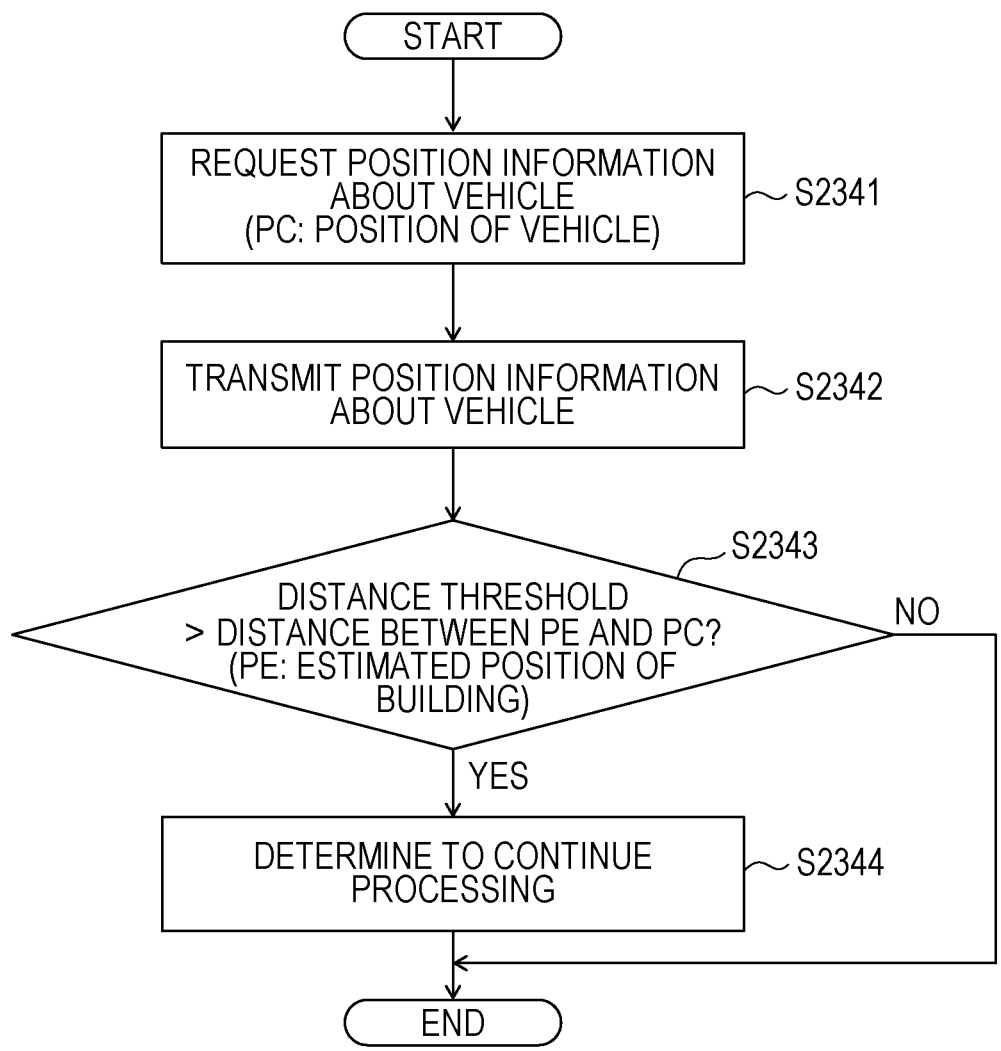
FIG. 68 is a schematic flowchart illustrating the processing in step S2340 of the flowchart illustrated in FIG. 67 (thirty-eighth embodiment).

FIG. 68 is a schematic flowchart illustrating the processing in step S2340 described above with reference to FIG. 67. With reference to FIGS. 30, 48, 61, 67, and 68, a further description will be given of the off-recommend judgment processing. In this embodiment, the second judgment step is exemplified by step S2340 described above with reference to FIG. 67.

In step S2341, the control unit 111B of the communication terminal 100B requests the second obtaining unit 151 to generate position information about the position of the vehicle. In FIG. 68, the position of the vehicle is represented by a symbol "PC". After the position information about the position of the vehicle has been generated, step S2342 is executed.

In step S2342, the control unit 111B of the communication terminal 100B causes the communication unit 131 of the communication terminal 100B to transmit the position information about the position of the vehicle. The position information about the position of the vehicle is transmitted from the communication unit 131 of the communication terminal 100B to the communication unit 320 of the server apparatus 300B. After that, step S2343 is executed.

In step S2343, the control unit 310B of the server apparatus 300B requests an estimated position of the building "PE" to the second estimating unit 342. If a predetermined distance threshold is larger than the distance between the position of the vehicle "PC" and the estimated position of the building "PE", step S2343 is executed. Otherwise, the communication terminal 100B ends the off-recommend processing.

In step S2344, the control unit 310B of the server apparatus 300B causes the notifying unit 330 to generate a notification signal indicating that the distance threshold is larger than the distance between the position of the vehicle "PC" and the estimated position of the building "PE". The notification signal is transmitted from the communication unit 320 of the server apparatus 300B to the communication unit 131 of the communication terminal 100B. In response to the notification signal, the control unit 111B of the communication terminal 100B determines to continue the processing. Thus, after step S2344, step S2220 described above with reference to FIG. 61 is executed.

The principles of the above-described various embodiments may be combined so as to satisfy the requirements for controlling air conditioners.

APPENDIX

A method for controlling a terminal apparatus according to an aspect of the present disclosure is applied to a terminal apparatus that is used for an appliance control system for executing, from a car via a network, a remote operation on a plurality of air conditioners installed in a building. The method includes a first judgment step of causing a computer of the terminal apparatus to, in response to input of status information into the computer, the status information indicating that a certain period has not elapsed from a time when power supply to the terminal apparatus is started, judge, based on setting information stored in a memory of the terminal apparatus, whether or not the plurality of air conditioners include a plurality of target appliances to be operated that are subjected to the remote operation; a second judgment step of causing the computer to, if the computer judges that the plurality of air conditioners include a plurality of target appliances to be operated, judge whether or not the car exists in a control region that is defined around the building and that has a certain area; a first display step of causing a display of the terminal apparatus to, if the computer judges that the car exists in the control region, display a start instruction image for providing an instruction to start the remote operation; an output step of causing the computer to, if an instruction image region is operated on the start instruction image, the instruction image region being used in common for the plurality of target appliances to be operated in order to provide an instruction to start the remote operation, output, to the network, control data for starting the remote operation for the plurality of target appliances to be operated; and a second display step of causing the display to display a plurality of notification images indicating that the control data has been transmitted to the plurality of target appliances to be operated.

With the above-described configuration, a user is able to operate the instruction image region on the start instruction image, and to easily provide an instruction to start the remote operation for the plurality of target appliances to be operated. After that, the display displays the plurality of notification images, and thus the user is able to visually determine whether or not the instruction to start the remote operation has been appropriately transmitted to the target appliances to be operated.

In the above-described configuration, the second judgment step may include causing the computer to obtain first position information about a current position of the car and second position information about a position of the building.

With the above-described configuration, the computer is able to appropriately judge, based on the first position information and the second position information, whether or not the car exists in the control region. Thus, the user does not request, from a position very far from the building, a remote operation for the plurality of target appliances to be operated. Accordingly, unnecessary operations of the target appliances to be operated are less likely to occur.

In the above-described configuration, the first display step may include causing a timer of the terminal apparatus to measure a first elapsed period from an execution time when the first display step is executed, and causing the timer to, if the instruction image region is not operated in the first elapsed period, measure a second elapsed period. In the second elapsed period, the first display step does not need to be executed again.

With the above-described configuration, the display does not frequently display the start instruction image. Thus, the user does not unnecessarily request the remote operation for the plurality of target appliances to be operated.

In the above-described configuration, the method may further include an obtaining step of causing the computer to obtain information representing operation statuses of the plurality of target appliances to be operated after the control data has been received. The second display step may include causing the display to display information representing operation statuses of the plurality of target appliances to be operated after the control data has been received.

With the above-described configuration, the user is able to visually determine whether or not the plurality of target appliances to be operated are appropriately operating.

In the above-described configuration, the plurality of target appliances to be operated may include a first target appliance and a second target appliance. The plurality of notification images may include a first notification image generated for the first target appliance and a second notification image generated for the second target appliance. The setting information may predetermine that the first notification image is displayed before the second notification image. The second display step may include causing the display to display the first notification image on the display before the second notification image.

With the above-described configuration, the display is able to provide the user with information about target appliances to be operated in accordance with a certain order.

A non-transitory recording medium according to another aspect of the present disclosure stores a program executed by a terminal apparatus that is used for an appliance control system for executing, from a car via a network, a remote operation on a plurality of air conditioners installed in a building. The program causes a computer of the terminal apparatus to, in response to input of status information into the computer, the status information indicating that a certain period has not elapsed from a time when power supply to the terminal apparatus is started, judge, based on setting information stored in a memory of the terminal apparatus, whether or not the plurality of air conditioners include a plurality of target appliances to be operated that are subjected to the remote operation. The program causes the computer to, if the computer judges that the plurality of air conditioners include a plurality of target appliances to be operated, judge whether or not the car exists in a control region that is defined around the building and that has a certain area. The program causes a display of the terminal apparatus to, if the computer judges that the car exists in the control region, display a start instruction image for providing an instruction to start the remote operation. The program causes the computer to, if an instruction image region is operated on the start instruction image, the instruction image region being used in common for the plurality of target appliances to be operated in order to provide an instruction to start the remote operation, output, to the network, control data for starting the remote operation for the plurality of target appliances to be operated, and causes the display to display a plurality of notification images indicating that the control data has been transmitted to the plurality of target appliances to be operated.

With the above-described configuration, a user is able to operate the instruction image region on the start instruction image, and to easily provide an instruction to start the remote operation for the plurality of target appliances to be operated. After that, the display displays the plurality of notification images, and thus the user is able to visually determine whether or not the instruction to start the remote operation has been appropriately transmitted to the target appliances to be operated.

A recommend method according to still another aspect of the present disclosure is executed by an appliance control system for executing, from a car via a network, a remote operation on a plurality of air conditioners installed in a building. The recommend method includes a step of judging, by using a memory storing setting information specifying a plurality of air conditioners, whether or not the plurality of air conditioners include a plurality of target appliances to be operated that are subjected to the remote operation; a step of judging, if it is judged that the plurality of air conditioners include a plurality of target appliances to be operated that are subjected to the remote operation, whether or not the car exists in a control region that is defined around the building and that has a certain area; a step of displaying, if it is judged that the car exists in the control region, display a start instruction image for providing an instruction to start the remote operation; a step of output, if an instruction image region is operated on the start instruction image, the instruction image region being used in common for the plurality of target appliances to be operated in order to provide an instruction to start the remote operation, output, to the network, control data for starting the remote operation for the plurality of target appliances to be operated, and a step of displaying a plurality of notification images indicating that the control data has been transmitted to the plurality of target appliances to be operated.

With the above-described configuration, a user is able to operate the instruction image region on the start instruction image, and to easily provide an instruction to start the remote operation for the plurality of target appliances to be operated. After that, the display displays the plurality of notification images, and thus the user is able to visually determine whether or not the instruction to start the remote operation has been appropriately transmitted to the target appliances to be operated.

The principles of the above-described embodiments are preferably used for controlling air conditioners.

What is claimed is:

1. A method for controlling a terminal apparatus that includes a display and that is used for an appliance control system for executing, from a car via a network, remote control on appliances installed in a building,
   the terminal apparatus including a processor and a memory, the memory storing setting information specifying a plurality of air conditioners designated as targets of the remote control,
   the method comprising:
      causing the processor of the terminal apparatus to judge, when a certain period has not elapsed since power-on of the car, by using the setting information, whether or not there exists at least two or more air conditioners designated as the targets of the remote control;

causing the processor to, in a case where there exists the at least two or more air conditioners designated as the targets of the remote control, obtain first position information indicating a current position of the car and second position information indicating a position of the building, and judge whether or not the current position indicated by the first position information is within a certain region relative to the position indicated by the second position information;

causing the processor to, in a case where the current position indicated by the first position information is within the certain region relative to the position indicated by the second position information, output, via the display of the terminal apparatus, one common piece of display data prompting a certain remote operation for the at least two or more air conditioners, the one common piece of display data including one common instruction portion for starting the certain remote operation, the one common piece of display data not identifying any one of the at least two or more air conditioners, the display also not identifying and not being associated with any one of the at least two or more air conditioners; and causing the processor to, in a case where selection of the one common instruction portion is detected, output control data for executing the certain remote operation on each of the at least two or more air conditioners to the network, and individually output, via the display of the terminal apparatus, for the at least two or more air conditioners, pieces of notification data indicating that the control data has been output for each of the at least two or more air conditioners, each piece of the notification data identifying one of the at least two or more air conditioners, the pieces of notification data being sequentially and independently displayed for each of the two or more air conditioners.

2. The method according to claim 1, further comprising:
causing the processor to, in a case where the selection of the one common instruction portion is not detected within a certain period from when the one common piece of display data is output, stop detecting the selection of the one common instruction portion, start a re-notification timer, and prevent the one common piece of display data from being output before a timeout of the re-notification timer.

3. The method according to claim 1, further comprising:
causing the processor to obtain operation statuses from the at least two or more air conditioners after the control data for executing the certain remote operation on the at least two or more air conditioners has been output to the network, and individually output, via the display of the terminal apparatus, the operation statuses for the at least two or more air conditioners.

4. The method according to claim 1, wherein the setting information includes a priority order set for the plurality of air conditioners, and the method further comprises:
causing the processor to output the pieces of notification data for the at least two or more air conditioners in accordance with the priority order.

5. The method according to claim 1, further comprising:
causing the processor to, in the case where the current position indicated by the first position information is within the certain region relative to the position indicated by the second position information, judge whether the vehicle is running away from the building.

6. The method according to claim 5, further comprising:
causing the processor to, in a case where the vehicle is running away from the building, estimate that the destination of the vehicle is not the building.

7. The method according to claim 6, further comprising:
causing the processor to, in a case that the destination of the vehicle is not the building, output, via the display of the terminal apparatus, a map indicating a position where the vehicle is running.

8. The method according to claim 4, wherein the priority order is manually set for the plurality of air conditioners by a user.

9. The method according to claim 4, wherein the priority order is automatically set for the plurality of air conditioners by an application program.

10. The method according to claim 9, wherein the application program automatically sets the priority order for the plurality of air conditioners based on rooms in which the plurality of air conditioners are installed in the building.

11. The method for controlling a terminal apparatus according to claim 1, wherein the plurality of air-conditioners comprises at least one more air-conditioner than the at least two or more air-conditioners.

12. A non-transitory computer readable recording medium storing a program executed by a terminal apparatus that includes a display and that is used for an appliance control system for executing, from a car via a network, remote control on appliances installed in a building, the terminal apparatus including a processor and a memory, the memory storing setting information specifying a plurality of air conditioners designated as targets of the remote control, the program causing the processor of the terminal apparatus to:

judge, when a certain period has not elapsed since power-on of the car, by using the setting information, whether or not there exists at least two or more air conditioners designated as the targets of the remote control;

in a case where there exists the at least two or more air conditioners designated as the targets of the remote control, obtain first position information indicating a current position of the car and second position information indicating a position of the building, and judge whether or not the current position indicated by the first position information is within a certain region relative to the position indicated by the second position information;

in a case where the current position indicated by the first position information is within the certain region relative to the position indicated by the second position information, output, via the display of the terminal apparatus, one common piece of display data prompting a certain remote operation for the at least two or more air conditioners, the one common piece of display data including one common instruction portion for starting the certain remote operation, the one common piece of display data not identifying any one of the at least two or more air conditioners, the display also not identifying and not being associated with any one of the at least two or more air conditioners; and in a case where selection of the one common instruction portion is detected, output control data for executing the certain remote operation on each of the at least two or more air conditioners to the network, and individually output, via the display of the terminal apparatus, for the at least two or more air conditioners, pieces of notification data indicating that the control data has been output for each of the at least two or more air conditioners, each piece of the notification data identifying one of the at least two or more air conditioners, the pieces of notification data being sequentially and independently displayed for each of the two or more air conditioners.

13. A method in an appliance control system for executing, from a car via a network, remote control on appliances installed in a building, the method comprising:

judging, when a certain period has not elapsed since power-on of the car, by using a first memory storing setting information specifying a plurality of air conditioners designated as targets of the remote control, whether or not there exists at least two or more air conditioners designated as the targets of the remote control;

in a case where there exists the at least two or more air conditioners designated as the targets of the remote control, obtaining first position information indicating a current position of the car and second position information indicating a position of the building, and judging whether or not the current position indicated by the first position information is within a certain region relative to the position indicated by the second position information;

in a case where the current position indicated by the first position information is within the certain region relative to the position indicated by the second position information, outputting, via a display of the terminal apparatus, one common piece of display data prompting a certain remote operation for the at least two or more air conditioners, the one common piece of display data including one common instruction portion for starting the certain remote operation, the one common piece of display data not identifying any one of the at least two or more air conditioners, the display also not identifying and not being associated with any one of the at least two or more air conditioners; and in a case where selection of the one common instruction portion is detected, outputting control data for executing the certain remote operation on each of the at least two or more air conditioners to the network, and individually outputting, via the display of the terminal apparatus, for the at least two or more air conditioners, pieces of notification data indicating that the control data has been output for each of the at least two or more air conditioners, each piece of the notification data identifying one of the at least two or more air conditioners, the pieces of notification data being sequentially and independently displayed for each of the two or more air conditioners.

14. A terminal apparatus that is used for an appliance control system for executing, from a car via a network, remote control on appliances installed in a building, the terminal apparatus comprising:

a display;

a processor; and a memory storing setting information specifying a plurality of air conditioners designated as targets of the remote control, and storing instructions that, when executed by the processor, cause the processor to perform operations including:

judging, when a certain period has not elapsed since power-on of the car, by using the setting information, whether or not there exists at least two or more air conditioners designated as the targets of the remote control;

in a case where there exists the at least two or more air conditioners designated as the targets of the remote control, obtaining first position information indicating a current position of the car and second position information indicating a position of the building, and judging whether or not the current position indicated by the first position information is within a certain region relative to the position indicated by the second position information;

in a case where the current position indicated by the first position information is within the certain region relative to the position indicated by the second position information, outputting one common piece of display data prompting a certain remote operation for the at least two or more air conditioners via the display of the terminal apparatus, the one common piece of display data including one common instruction portion for starting the certain remote operation, the one common piece of display data not identifying any one of the at least two or more air conditioners, the display also not identifying and not being associated with any one of the at least two or more air conditioners; and in a case where selection of the one common instruction portion is detected, outputting control data for executing the certain remote operation on each of the at least two or more air conditioners to the network, and individually outputting, via the display and for the at least two or more air conditions, pieces of notification data indicating that the control data has been output for each of the at least two or more air conditioners, each piece of the notification data identifying one of the at least two or more air conditioners, the pieces of notification data being sequentially and independently displayed for each of the two or more air conditioners.

\* \* \* \* \*